(12) United States Patent
Inoue et al.

(10) Patent No.: US 7,191,087 B2
(45) Date of Patent: Mar. 13, 2007

(54) SENSOR CONTROLLER

(75) Inventors: Hiroyuki Inoue, Kyoto (JP); Masahiro Kawachi, Kyotanabe (JP); Hajime Takegawa, Fukuchiyama (JP); Koji Shimada, Fukuchiyama (JP); Hitoshi Oba, Fukuchiyama (JP); Kenji Horie, Ayabe (JP); Yoshinori Kawai, Ayabe (JP); Takeshi Yoshiura, Ayabe (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 11/078,661

(22) Filed: Mar. 14, 2005

(65) Prior Publication Data

US 2005/0222693 A1  Oct. 6, 2005

(30) Foreign Application Priority Data

Mar. 15, 2004 (JP) ............................. 2004-072186
Jun. 30, 2004 (JP) ............................. 2004-194006

(51) Int. Cl.
*G06F 15/00* (2006.01)
*G06F 19/00* (2006.01)

(52) U.S. Cl. ........................... 702/127; 702/84; 700/28

(58) Field of Classification Search ................. 702/84, 702/127, 182, 186, 189; 700/9, 19, 20, 28; 324/539, 543; 703/24, 25
See application file for complete search history.

(56) References Cited

U.S. PATENT DOCUMENTS 5,475,583 A   12/1995  Bock et al.
6,397,160 B1 *  5/2002  Craig et al. ................ 702/120
2005/0055136 A1 *  3/2005  Hofmann et al. ........... 700/273
2005/0143968 A9 *  6/2005  Odom et al. .................. 703/21
2005/0237068 A1 * 10/2005  Nakashita et al. ........... 324/539

FOREIGN PATENT DOCUMENTS

| JP | 2000-259975 | 9/2000 |
| JP | 2002-286413 | 10/2002 |
| JP | 2002-357408 | 12/2002 |
| JP | 2004-061251 | 2/2004 |

* cited by examiner

*Primary Examiner*—Bryan Bui
(74) *Attorney, Agent, or Firm*—Foley & Lardner LLP

(57) ABSTRACT

A sensor controller is disclosed which transmits large-capacity data such as waveform data and image data within a short time (in rapid cycles, for example) and makes possible various collaborative operations using the transmitted data. A control unit includes a programmable logic circuit and a CPU to control the operation of the sensor controller. A unit connector can be used to connect other sensor controllers. An inter-unit path constitutes a signal transmission path between the control unit and the unit connector and includes a sensing data transmission path between the programmable logic circuit and the unit connector. In the case where another sensor controller is connected to the unit connector, the sensing data can be transmitted between the programmable logic circuit of the local sensor controller and the programmable logic circuit of the particular another sensor controller.

32 Claims, 38 Drawing Sheets

SENSOR CONTROLLER

BACKGROUND OF THE INVENTION

1. Field of the Invention

The present invention relates to a sensor controller suitable to construct a sensing system for handling a large capacity of data including image data and waveform data.

2. Description of the Related Art

A displacement sensor using a two-dimensional image pickup device comprising a signal processing unit and a sensor head unit separated from each other as independent units is known (Japanese Unexamined Patent Publication No. 2002-357408, especially, with its FIG. 4). The sensor head includes a light projection laser diode and a CCD as a photodetector. The video signal generated based on the signal from the CCD is sent to the signal processing unit through an electrical cord. The signal processing unit includes a CPU mainly configured of a microprocessor and a FPGA (field programmable gate array) constituting a programmable logic circuit. The CPU mainly functions as a means of measurement processing and display control processing. The FPGA, on the other hand, mainly functions as a means of image processing.

A displacement sensor using a PSD (position sensing device) with a signal processing unit and a detector separated from each other as independent units is known (Japanese Unexamined Patent Publication No. 2002-286413). The detector includes a projection light source and a PSD as a photodetector. An analog detection signal is output from the PSD. This analog detection signal is sent to a signal processing unit through an electrical cord. The signal processing unit is mainly configured of a CPU with a microprocessor as a main component. The CPU calculates the distance based on the analog detection signal sent from the detector. The signal processing units are adjacently arranged and connected by a connector through a relay unit. Each signal processing unit transmits the distance data calculated by it to the adjacent signal processing unit through the connector. The adjacent signal processing unit calculates the differential distance, etc. using the distance data sent thereto and the distance data calculated by itself.

In the displacement sensor described in Japanese Unexamined Patent Publication No. 2002-357408, especially, with its FIG. 4, the signal processing unit includes the FPGA and therefore a sophisticated image processing can be carried out. In the absence of the function to transmit data between adjacent signal processing units, however, the collaborative operation between a plurality of sensor heads or signal processing units cannot be performed.

In the displacement sensor described in Japanese Unexamined Patent Publication No. 2002-286413, on the other hand, though having the data transmission function between adjacent signal processing units, this communication between CPUs is limited in transmission capacity. In the case where the data transmission in rapid cycles is desired to meet the detection period, for example, the value of the arithmetic operation result such as the calculated distance data can be sent, but not the waveform data or the image data having a large capacity.

SUMMARY OF THE INVENTION

This invention has been achieved in view of these problems of the prior art, and the object thereof is to provide a sensor controller (for example, a sensor signal processing unit) capable of transmitting the data of large capacity such as the waveform data and the image data between sensor controllers mutually in a short time (in rapid cycles, for example) to perform various collaborative operations using the transmitted data.

The sensor controller according to the invention is configured as a single unit. The sensor controller comprises a control unit having a programmable logic circuit and a CPU to control the operation of the sensor controller, a unit connector usable to connect other sensor controllers, and an inter-unit path including a sensing data transmission path between the programmable logic circuit and the unit connector and constituting a signal transmission path between the control unit and the unit connector.

In the case where a second sensor controller is connected to the unit connector, the sensing data can be transmitted between the programmable logic circuit of the principal sensor controller (hereinafter referred to as the local sensor controller) and the programmable logic circuit of the second sensor controller.

With this configuration, the sensing data can be transmitted at high speed easily to and from other sensor controllers. Also, in view of the fact that the control unit includes a programmable logic circuit, the hardware configuration change in the development stage is minimized, and the development (test production, design change, etc.) is facilitated by the sensor controller manufacturers. Also, the manufacturers are provided with a platform to facilitate preparation of an assortment of series products having different functions (especially, the functions depending on the hardware processing).

The term "programmable logic circuit" used herein is defined as an integrated circuit of which a hardware circuit can be programmed. In the case where an integrated circuit contains a portion of which the circuit can be programmed and a portion of which the circuit is fixedly formed, the portion of which the circuit can be programmed constitutes a programmable logic circuit. The programmable logic circuit may be configured of a plurality of integrated circuits. The integrated circuit of which the hardware circuit can be programmed is commercially available under such naming as PLD (programmable logic device), FPGA (field programmable gate array) or CPLD (complex PLD), any of which can be employed by this invention. As an example of this integrated circuit, a sum-of-products circuit, a lookup table, a flip-flop, a memory, a wiring line, an inter-wire switch or the like circuit elements are combined and programmed to execute substantially all the functions including the device connection, data communication, signal processing, data display, timing and control operation and other functions normally included in a system.

The term "sensing data" used herein generally include both the unprocessed data such as the video signal, the voltage value, the voltage waveform or the like output by the sensor head, and the processed data such as the feature amount or the determination result obtained by arithmetic operation of the unprocessed data.

The unit connector of the sensor controller according to the invention may include a first unit connector and a second unit connector. The inter-unit path, on the other hand, may include a first inter-unit path connected to the first unit connector and a second inter-unit path connected to the second unit connector. In this case, the sensing data transmission path included in the first inter-unit path and the sensing data transmission path included in the second inter-unit path can be separated from each other outside the programmable logic circuit.

With this configuration, the sensing data on the side of the first unit connector and the sensing data on the side of the second unit connector can be transmitted independently of each other as required.

The sensor controller according to the invention may comprise a means to change at least a part of the circuit data of the programmable logic circuit or a means to change the parameters set in the programmable logic circuit in order to change the contents of the process executed for the sensing data.

With this configuration, the specific process of the sensing data (in particular, the data transmission path and/or the contents of the arithmetic operation) dependent on the hardware processing of the sensor controller can be changed in accordance with the object of the sensing operation. Especially, in the case where a sensing system is constructed to operate a plurality of sensor controllers in cooperation with each other, a variety of sensing systems can be constructed with a smaller number of types of sensor controllers in accordance with the object of detection. The user thus is not required to ascertain the detailed functions of the sensor controller before purchase, and the functions of the sensing system can be optimized through. a trial and error process.

The sensor controller according to the invention may further comprise an oscillator to output a first clock signal, a clock path to transmit a second clock signal input from the unit connector, and a clock switching circuit to apply selected one of the first clock signal and the second clock signal to a programmable logic circuit.

With this configuration, the programmable logic circuit can be operated using either the clock signal output from the oscillator of the local unit or the clock signal obtained from another sensor controller connected. The sensor controller operated by the clock signal output from the oscillator of the local unit can be operated as an independent unit not connected with another sensor controller. In the case where the clock signal obtained from a second sensor controller is used, on the other hand, the sensing data can be transmitted more easily at high speed in view of the fact that the clock of the programmable logic circuit is synchronized with the clock of the second sensor controller. The clock switching circuit may be arranged in the programmable logic circuit, so that the selected clock signal may be applied to the required portion of the programmable logic circuit.

The sensor controller according to the invention having the first unit connector and the second unit connector may further comprise an oscillator to output a first clock signal, a first clock path to transmit a second clock signal input from the first unit connector, a clock switching circuit to apply selected one of the first clock signal and the second clock signal to the programmable logic circuit, and a second clock path to output the selected clock signal to the second unit connector.

By use of this sensor controller, a sensing system having three or more sensor controllers connected in series can be constructed in which a common clock signal is applied to the programmable logic circuits of all the sensor controllers.

The sensor controller according to the invention may further comprise a data transmission path connected with the CPU in the inter-unit path, whereby the data can be transmitted between the CPU and the CPU of another sensor controller which may be connected to the unit connector.

With this configuration, in addition to the data transmission path between the programmable logic circuits, a data transmission path is formed between the CPUs, so that the functions of data transmission can be distributed.

The sensor controller according to the invention may further comprise a sensor head connecting portion used to connect the sensor head and a sensor head path connecting the programmable logic circuit and the sensor head connecting portion to transmit the sensing data.

With this configuration, the data can be acquired directly from the sensor head connected to the local unit to perform various sensing operations. The sensor head connecting portion can be configured as a sensor head connector. The sensor head connector can be fixed on the sensor controller case or arranged at the forward end of the cable drawn from the sensor controller case. In the case where the sensor controller and the sensor head are connected directly to each other without the sensor head connector, a sensor head connecting portion is provided by a cable connecting the sensor controller and the sensor head. In the case where the sensor controller and the sensor head are connected to each other by radio communication, on the other hand, a sensor head connecting portion is provided by the radio communication transmitter/receiver arranged in the sensor controller.

In the process, the circuit programmed in the programmable logic circuit may include an arithmetic operation circuit to carry out the arithmetic operation for the sensing data acquired through the inter-unit path or the sensor head path, and a data path switching circuit to connect selected one of the inter-unit path and the sensor head path to the arithmetic operation circuit.

The "circuit programmed by the programmable logic circuit" is a concept including both a circuit maintaining the state programmed in the programmable logic circuit even in the case where the sensor controller is not activated and a circuit programmed by loading the circuit data in the programmable logic circuit from a storage means of the sensor controller after activation of the sensor controller.

The sensor controller according to the invention may further comprise an arithmetic operation circuit to conduct the arithmetic operation on the sensing data acquired through the inter-unit path as a circuit programmed in the programmable logic circuit. In the case where a second sensor controller is connected to the unit connector, therefore, the arithmetic operation can be conducted on the sensing data acquired from the particular second sensor controller.

In the sensor controller according to this invention, a storage means is connected to the programmable logic circuit, and the circuit programmed in the programmable logic circuit includes a data path to store the the sensing data acquired through the inter-unit path in the storage means. In the case where a second sensor controller is connected to the unit connector, therefore, the sensing data acquired from the second sensor controller can be stored.

A first sensing system according to the invention comprises a plurality of series-connected sensor controllers each configured as an independent unit. In this sensing system, each sensor controller includes a control unit having a programmable logic circuit and a CPU to control the operation of the sensor controller, a unit connector usable for connection with another sensor controller, and an inter-unit path including a sensing data transmission path between the programmable logic circuit and the unit connector and constituting a signal transmission path between the control unit and the unit connector. Once a second sensor controller is connected to the unit connector, the sensing data can be transmitted between the programmable logic circuit of the local sensor controller and the programmable logic circuit of the second sensor controller. In this sensing system, at least one sensor controller further comprises a sensor head connecting portion usable for connection with the sensor head and a sensor head path connecting the programmable logic circuit and the sensor head connecting portion to transmit the sensing data. This at least one of the sensor controllers is connected with the sensor head. In this sensing system, the sensing data is transmitted from the first sensor controller making up one of the sensor controllers connected with the sensor head to the second sensor controller making up one of the other sensor controllers.

In the first sensing system, the unit connector of each sensor controller may include a first unit connector and a second unit connector. Also, the inter-unit path of each sensor controller may include a first inter-unit path connected to the first unit connector and a second inter-unit path connected to the second unit connector. In this case, the sensing data transmission path included in the first inter-unit path and the sensing data transmission path included in the second inter-unit path can be separated from each other outside the programmable logic circuit.

In the first sensing system, the sensing data transmitted from the first sensor controller to the second sensor controller may be those output from the sensor head connected to the first sensor controller.

Further, the first sensor controller comprises a sensor head connecting portion usable for connection with the sensor head and a sensor head path connecting the programmable logic circuit and the sensor head connecting portion to transmit the sensing data, wherein the programmable logic circuit includes an arithmetic operation circuit to perform the arithmetic operation on the sensing data and a data path to branch the sensing data acquired through the sensor head path into the arithmetic operation circuit and the inter-unit path. The circuit programmed in the programmable logic circuit of the second sensor controller includes an arithmetic operation circuit to conduct the arithmetic operation on the sensing data acquired through the inter-unit path, so that the sensing system can conduct the arithmetic processing on the same sensing data in parallel.

In the first sensing system, the first sensor controller further comprises a sensor head connecting portion usable for connection with the sensor head and a sensor head path connecting the programmable logic circuit and the sensor head connecting portion to transmit the sensing data, wherein the programmable logic circuit includes an arithmetic operation circuit to conduct the arithmetic operation on the sensing data. The sensing data transmitted from the first sensor controller to the second sensor controller may be those output from the sensor head connected to the first sensor controller and arithmetically processed by the first sensor controller.

In the first sensing system, the circuit programmed in the programmable logic circuit of the second sensor controller may include an arithmetic operation circuit to conduct the arithmetic operation on the sensing data acquired through the inter-unit path.

In the first sensing system, the programmable logic circuit of the second sensor controller is connected with a storage means and the circuit programmed in the programmable logic circuit of the second sensor controller may include a data path to store the sensing data acquired through the inter-unit path in the storage means.

In the first sensing system, at least one of the sensor controllers includes an oscillator to output a clock signal and a clock signal transmission path in the inter-unit path, wherein the clock signal can be output to the programmable logic circuit and the clock signal transmission path in the inter-unit path at the same time. All the other sensor controllers each include a clock signal transmission path connectable to the programmable logic circuit in the inter-unit path. As a result, all the sensor controllers in the sensing system can drive the programmable logic circuit by a common clock signal.

In this configuration, the clock of the programmable logic circuit is synchronized between the sensor controller to transmit the sensing data and the sensor controller to receive the particular data, and therefore the sensing data can be transmitted at high speed more easily.

In the first sensing system with each sensor controller having a first unit connector and a second unit connector, all the sensor controllers each further comprise an oscillator to output a first clock signal, a first clock path to transmit a second clock signal input from the first unit connector, a clock switching circuit to select one of the first clock signal and the second clock signal and apply the selected clock signal to the programmable logic circuit, and a second clock path to output the selected clock signal to the second unit connector, wherein in the sensor controller located at the end of the sensor controller string while the other sensor controllers are connected only to the second unit connector, the clock switching circuit selects the first clock signal, and in all the other sensor controllers, the clock switching circuit selects the second clock signal, with the result that all the sensor controllers in the sensing system can drive the programmable logic circuit with a common clock signal.

With this configuration, a sensor controller capable of operation as an independent unit using the oscillator of the local unit can be built in the sensing system sharing the clock signal through the sensor controllers. In this way, the need of a sensor controller dedicated to the sensing system (having no oscillator of the local unit) is eliminated.

In the first sensing system, all the sensor controllers comprise a data transmission path connected to a CPU in the inter-unit path, whereby the data can be transmitted between the CPUs of the sensor controllers directly connected with each other.

A second sensing system according to the invention comprises a plurality of series-connected sensor controllers each making up an independent unit, wherein each sensor controller includes a control unit having a programmable logic circuit and a CPU to control the operation of the sensor controller, a unit connector usable for connection with another sensor controller, and an inter-unit path including a sensing data transmission path arranged between the programmable logic circuit and the unit connector and constituting a signal transmission path between the control unit and the unit connector. In the case where a second sensor controller is connected to the unit connector, the sensing data can be transmitted between the programmable logic circuit of the local sensor controller and the programmable logic circuit of the second sensor controller. At least one of the sensor controllers further includes a sensor head connecting portion usable for connection with a sensor head and a sensor head path connecting the programmable logic circuit and the sensor head connecting portion to transmit the sensing data. At least one of the sensor controllers is connected with the sensor head, and the control unit of each sensor controller conducts the sensing process on the sensing data output from any one of the sensor heads in response to a trigger signal applied thereto. Upon completion of the sensing process, the sensor controller enters a process completion state, while in the case where the result of determination on the object to be sensed is a specified one, a specified determination state is entered. Each sensor controller can transmit and receive a signal indicating whether the process completion state or the specified determination state is prevailing, to and from other sensor controllers. In this way, at least one specified sensor controller can detect whether all the sensor controllers are in the process completion state or all the sensor controllers are in the specified determination state. The specified sensor controller, upon detection of either state, outputs an overall determination signal.

With this configuration, after application of the trigger signal to each sensor controller and the determination results of all the sensor controllers are obtained, an overall determination signal is output from a specified sensor controller in the case where the determination results of all the sensor controllers are the specified result. In this way, an overall determination result can be obtained from the sensing system. In addition, even in the case where the determination result is output at different timings from different sensor controllers, the overall determination result is prevented from becoming unstable during the transition period before all the determination results are obtained. Typically, the determination result is a success or a failure, and the specified determination state indicates a success. In this case, the output of the overall determination signal indicates that the determination of all the sensor controllers is a success. The trigger signal may be applied either uniformly to all the sensor controllers or individually to each sensor controller. Upon completion of one sensing process, each sensor controller can be set in standby mode ready to receive the trigger signal for the next sensing process. In this case, the standby mode can be handled as the process completion state.

In the second sensing system, the trigger signal is input to one sensor controller from outside the sensing system, and through the unit connector, may be input to each of the other sensor controllers.

With this configuration, only one trigger signal line is connected to the sensing system. In the case where the sensor controller supplied with the trigger signal is coincident with the sensor controller outputting the overall determination signal, the wiring work is further facilitated.

The second sensing system comprises a sensor controller located at a first end of the sensor controller string and a specified sensor controller located at a second end to output the overall determination signal. In the process completion state, the sensor controller located at the first end outputs a completion signal to the sensor controller connected at the second end, and outputs a specified determination signal in the specified determination state. The specified sensor controller located at the second end of the sensor controller string may output an overall determination signal on condition that the completion signal is received from the sensor controller connected at the first end, the local unit is in the process completion state, the specified determination signal is input from the sensor controller connected at the first end and that the local unit is in the specified determination state.

This sensing system further comprises a sensor controller located at other than the first and second ends of the sensor controller string. The sensor controller located at other than the first and second ends may output a completion signal to the sensor controller located at the second end in the case where the completion signal is received from the sensor controller connected at the first end and the local unit is in the process completion state on the one hand, and may output a specified determination signal to the sensor controller connected at the second end in the case where the specified determination signal is received from the sensor controller connected at the first end and the local unit is in the specified determination state on the other hand.

With this configuration, the specified sensor controller, upon receipt of the completion signal from the sensor controller connected to the local unit, can be informed that all the other sensor controllers are in the process completion state. Further, in the case where the local unit is also in the process completion state, it can be determined that all the sensor controllers are in the process completion state. Also, the specified sensor controller, upon receipt of the specified determination signal from the sensor controller connected to the local unit, can be informed that all the other sensor controllers are in the specified determination state, and further in the case where the local unit is also in the specified determination state, can determine that all the sensor controllers are in the specified determination state. The specified sensor controller outputs an overall determination signal in the case where all the sensor controllers are in the process completion state and the specified determination state at the same time.

The second sensing system comprises a sensor controller located at the first end of the sensor controller string, a specified sensor controller located at the second end to output the overall determination signal, and a sensor controller located at other than the first and second ends. In the specified determination state, the sensor controller located at the first end outputs the specified determination signal to the sensor controller connected at the second end, and in the process completion state, outputs the completion signal to the sensor controller connected at the second end. The sensor controller located at other than the first and second ends of the sensor controller string, on the other hand, outputs the completion signal to the sensor controller connected at the second end upon receipt of the completion signal from the sensor controller connected at the first end and in the case where the local unit is in the process completion state. At the same time, one or a plurality of specified determination signals input from the sensor controller connected at the first end are relayed and output to the sensor controller connected at the second end. In parallel with this, in the case where the local unit is in the specified determination state, the specified determination signal is output to the sensor controller connected at the second end of the sensor controller string. The specified sensor controller located at the second end of the sensor controller string may output the overall determination signal on condition that the completion signal is input from the sensor controller connected at the first end, the local unit is in the process completion state, the specified determination signal is input for all the sensor controllers other than the local unit from the sensor controller connected at the first end and that the local unit is in the specified determination state.

With this configuration, the specified sensor controller, upon receipt of the completion signal from the sensor controller connected to the local unit, can be informed that all the other sensor controllers are in the process completion state, and in the case where the local unit is also in the process completion state, can determine that all the sensor controllers are in the process completion state. Also, the specified sensor controller, upon receipt of the specified determination signals of each sensor controller other than the local unit from the sensor controller connected to the local unit, can be informed of the determination result of all the sensor controllers other than the local unit, and further, together with the determination result of the local unit, can determine whether all the sensor controllers are in the specified determination state or not. The specified sensor controller outputs an overall determination signal in the case where all the sensor controllers are in the process completion state and in the specified determination state at the same time.

The sensor controller making up the second sensing system according to the invention may include a first unit connector and a second unit connector and have the features described below.

The feature shared by the sensor controllers, regardless of the position at which they are located in the sensing system, is that the control unit of each sensor controller conducts the sensing process upon receipt of a trigger signal, enters the process completion state upon completion of the sensing process and assumes the specified determination state in the case where the determination result for the object to be sensed is a specified result.

Further, a sensor controller having the following feature can be located at an end of the sensing system and used as a specified sensor controller to output the overall determination signal. Specifically, the control unit of the sensor controller executes the process of outputting an overall determination signal on condition that a completion signal indicating that the other sensor controllers are in the process completion state is input thereto through the first unit connector, the local unit is in the process completion state, a specified determination signal indicating that the other sensor controllers are in the specified determination state is input thereto through the first unit. connector and that the local unit is in the specified determination state. As an alternative, the sensor controller has a means to set the control unit to execute the particular process.

A sensor controller having the following feature can be used at a position other than the ends of the sensing system. Specifically, the control unit of the sensor controller executes the process of outputting a second completion signal through the second unit connector on condition that the first completion signal is input thereto through the first unit connector and that the local unit is in the process completion state on the one hand, and executes the process of outputting a second specified determination signal through the second unit connector on condition that the first specified determination signal input thereto through the first unit connector and the local unit is in the specified determination state on the other hand. As an alternative, the sensor controller has a means to set the control unit to execute the particular process.

A sensor controller having the following feature can be used at the end far from the specified controller of the sensing system. Specifically, the control unit of the sensor controller executes the process of outputting a completion signal through the second unit connector on condition that the local unit is in the process completion state on the one hand, and executes the process of outputting a specified determination signal through the second unit connector on condition that the local unit is in the specified determination state on the other hand. As an alternative, the sensor controller includes a means to set the control unit to execute the particular process.

A sensor controller, regardless of where it is located, can be supplied with an external trigger signal from an external source without the intermediary of the unit connector and an inter-unit trigger signal through the unit connector. The sensor controller thus may further comprise a trigger control circuit to select the external trigger signal or the inter-unit trigger signal and output an internal trigger signal to the control unit based on the selected trigger signal.

Further, the sensor controller may have an internal signal path to transmit the inter-unit trigger signal input to one of the unit connectors to the other unit connector.

The trigger control circuit may further output an inter-unit trigger signal based on an external trigger signal which may be selected.

The sensor controller making up the second sensing system according to the invention may have the first unit connector and the second unit connector and further have the following feature. Specifically, the control unit of the sensor controller conducts the sensing process in response to a trigger signal applied thereto and assumes a specified determination state when the determination result for the object to be sensed is a specified result. Further, the sensor controller may execute the process of outputting a second specified determination signal through the second unit connector on condition that the first specified determination signal is input thereto through the first unit connector and the local unit is in the specified determination state. As an alternative, the sensor controller may include a means to set the control unit to execute the particular process.

In the foregoing description, the wording "to set the control unit to execute the particular process" includes the case in which the circuit in the programmable logic circuit is set to execute the particular process, the case in which a program to execute the particular process is selected and the case in which a parameter is set for the program to execute the particular process. The "means to set" includes an operating switch arranged in the sensor controller to give a setting instruction, a menu presented by the sensor controller for setting and a means to receive the signal to give a setting instruction from a source external to the sensor controller.

According to this invention, there is provided a sensor controller (such as a sensor signal processing unit) which can. transmit and receive a large-capacity data such as the waveform data and the image data within a short time (in rapid cycles, for example) to and from other sensor controllers, and which can perform various collaborative operations using the data thus transmitted.

DESCRIPTION OF THE PREFERRED EMBODIMENTS

A preferred embodiment of the invention is explained in detail below with reference to the accompanying drawings. The scope of the invention is of course not limited to the description of the embodiments below and defined by the appended claims.

Figure 1:
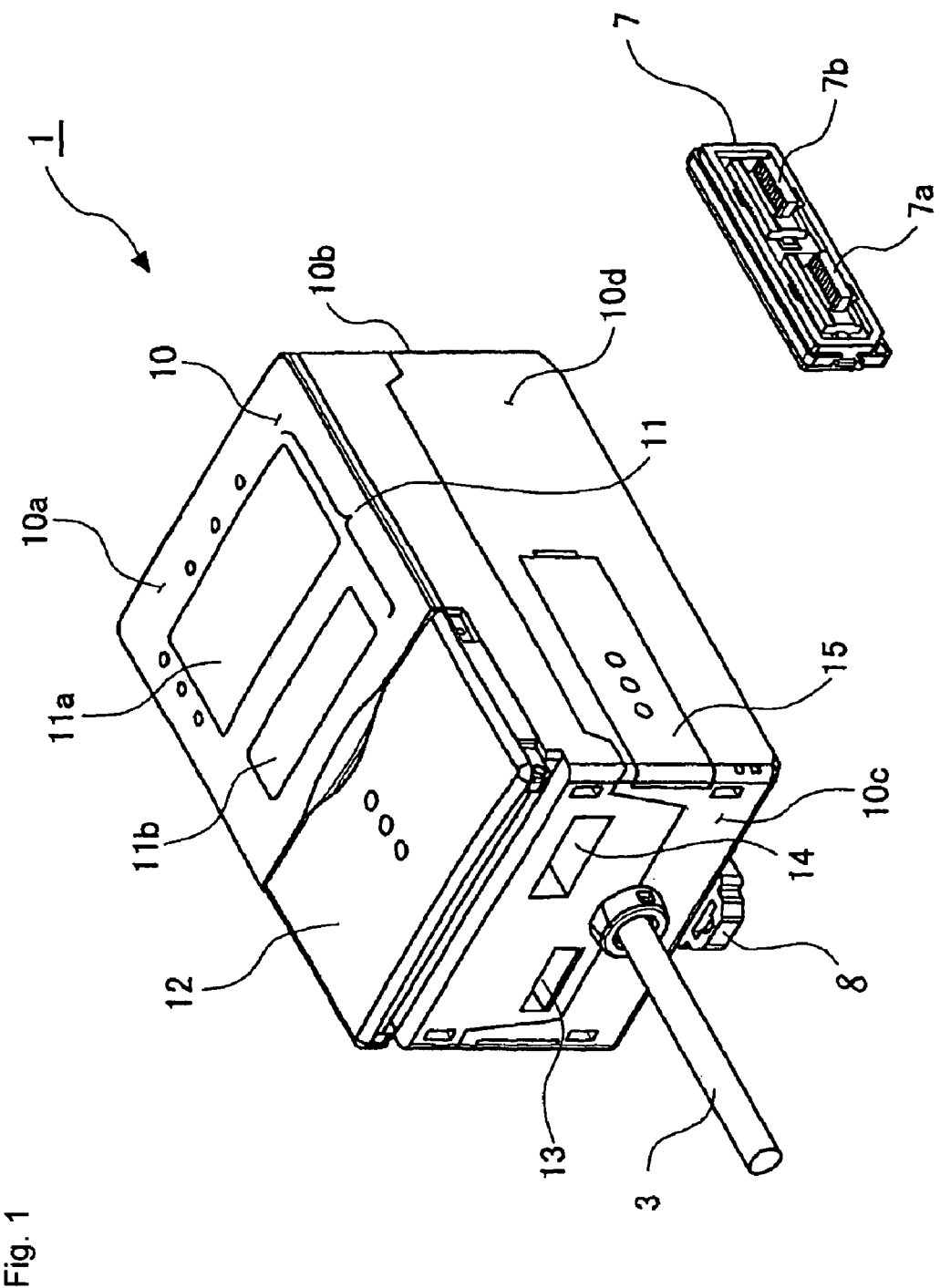
FIG. 1 shows a perspective view showing the appearance of a sensor controller.

A perspective view of the appearance of a sensor controller is shown in FIG. 1. As shown in FIG. 1, the sensor controller 1 is configured as a unit having the case 10. The front surface 10a of the case 10 is divided substantially into upper and lower parts, in which the upper part includes a display unit 11. In this example, the display unit 11 includes a segment display 11a and a liquid crystal character display 11b.

An operating unit is arranged in the lower part of the front surface 10a of the case 10. This operating unit includes an operating unit cover 12 adapted to open to this side with the lower edge as a supporting point. Various operating means including numerical keys, function keys and a slide switch are arranged behind the operating unit cover 12.

A unit connector is arranged on each of the right and left sides (only the right side 10d is shown) of the case 10. Each of the right and left unit connectors has a unit connector cover (only the right cover 15 is shown). The unit connector cover (right) 15, which is closed in FIG. 1 and adapted to slide open, encases a first port and a second port. As described later, the first and second ports correspond to a first port 7a and a second port 7b, respectively, of a relay connector member 7.

A USB connector 13 and a RS-232C connector 14 are arranged on the lower surface 10c of the case 10. The connectors 13, 14 are used for communication between the sensor controller 1 and a personal computer (PC) or the like. An external connection cord 3 is extended from the lower surface 10c of the case 10. This external connection cord 3 contains therein a power line, an external input line and an external output line. The external input and output lines are connected to, for example, a programmable controller (PLC). As described later, the case 10 is mountable on a DIN rail 5, and a DIN rail damper 8 is used for that purpose.

Figure 2:
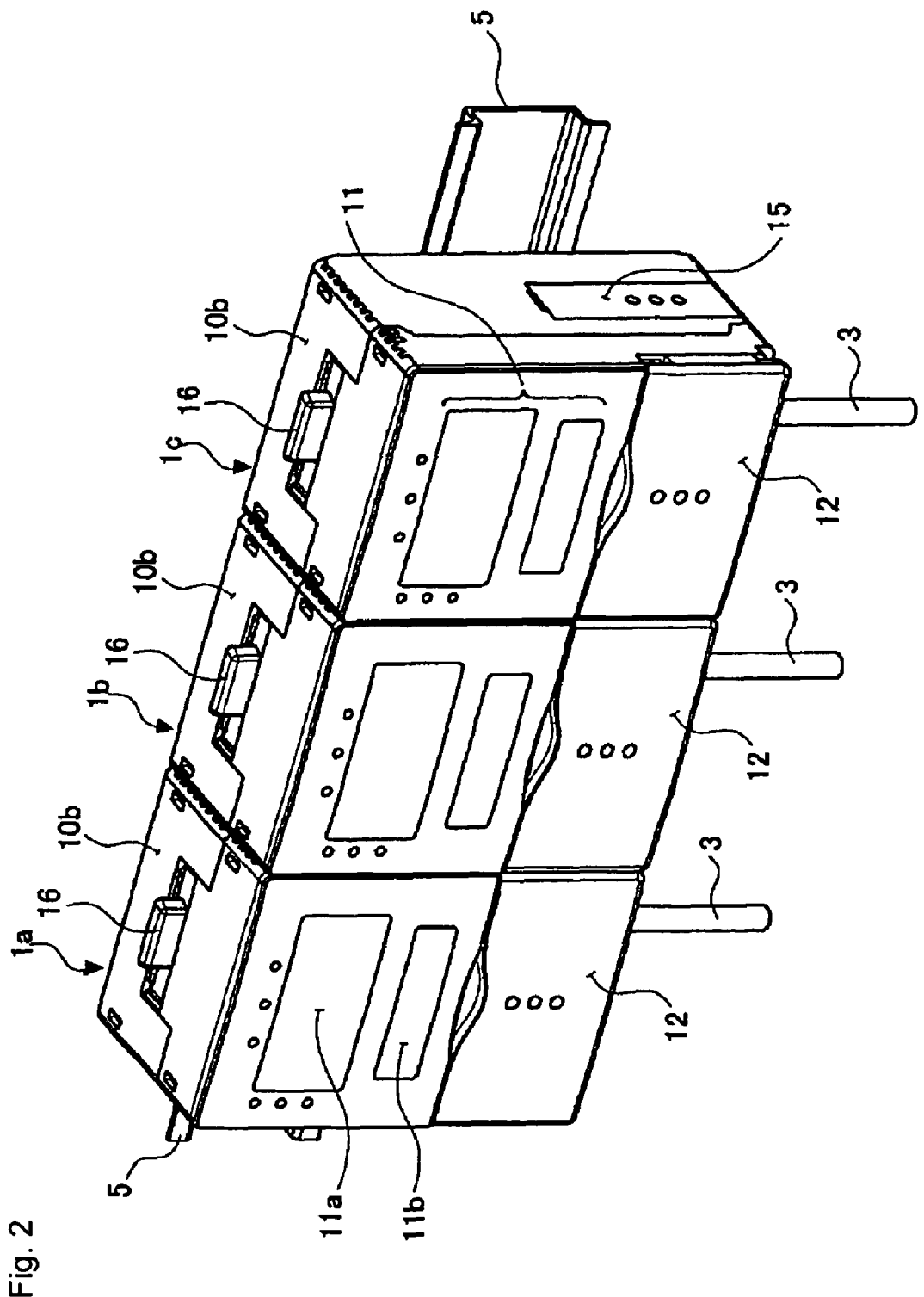
FIG. 2 shows a perspective view showing the appearance of a string of sensor controllers coupled to each other.

A perspective view of the appearance of sensor controllers connected in a string is shown in FIG. 2. As shown in FIG. 2, three sensor controllers 1a, 1b, 1c are horizontally aligned and mounted on a mounting plate, etc. in the control panel through the DIN rail 5. With the sensor controllers thus mounted, a sensor head connector 16 is arranged on the upper surface 10b of each case. The sensor head connector 16, as described later, has mounted thereon a sensor head connector 4a attached at the forward end of the cable 4 led out of the sensor head 2.

Figure 3:
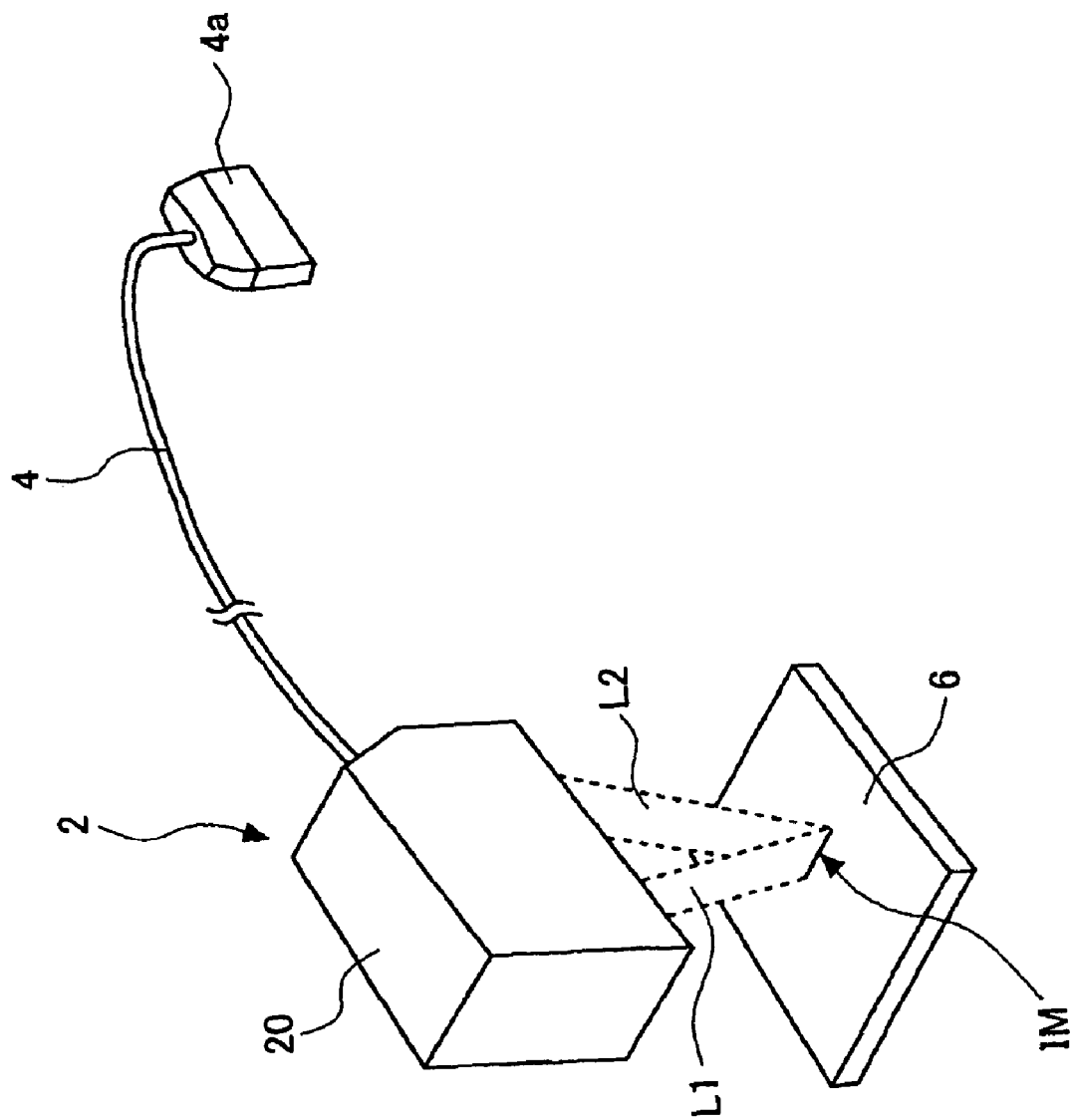
FIG. 3 shows a perspective view showing the appearance of a sensor head in sensing operation.

A perspective view of the appearance of the sensor head in sensing operation is shown in FIG. 3. As shown in FIG. 3, a sensor cable 4 is led out of the case 20 of the sensor head 2, and a sensor head connector 4a is mounted at the forward end of the sensor cable 4. This sensor head connector 4a is coupled to the sensor head connector 16 of the case 10 of the sensor controller 1.

The case 20 of the sensor head 2 contains therein a semiconductor laser diode (LD) to project light and a two-dimensional image pickup device (such as a CCD image sensor or a CMOS image sensor) to receive the light. The laser light emitted from the semiconductor laser diode (LD) is radiated by the sensor head 2 on an object 6 in a slit beam. In FIG. 3, reference numeral L1 designates the radiated slit light. The radiated light image IM on the object 6 is focused on the light receiving surface of the two-dimensional image pickup device by a lens arranged in the sensor head 2. In FIG. 3, numeral L2 designates the reflected slit light. The optical axis of the projected light and the optical axis of the received light form a predetermined angle with each other. The longitudinal direction of the cross section of the slit light in a plane perpendicular to the direction in which the slit light proceeds is at right angles to the plane formed by the optical axis of the projected light and the optical axis of the received light. With the change in the distance from the sensor head 2 to the object 6, the slit light image on the light receiving surface of the two-dimensional image pickup device moves in the direction perpendicular to the length of the slit light. The horizontal scanning direction of the two-dimensional image pickup device is set in the direction in which the slit light image moves. The peak point of light strength on the horizontal scanning line of the two-dimensional image pickup device represents the distance to the object. The use of the slit light makes it possible to measure the distance distribution along the length of the slit light at a time.

Figure 4:
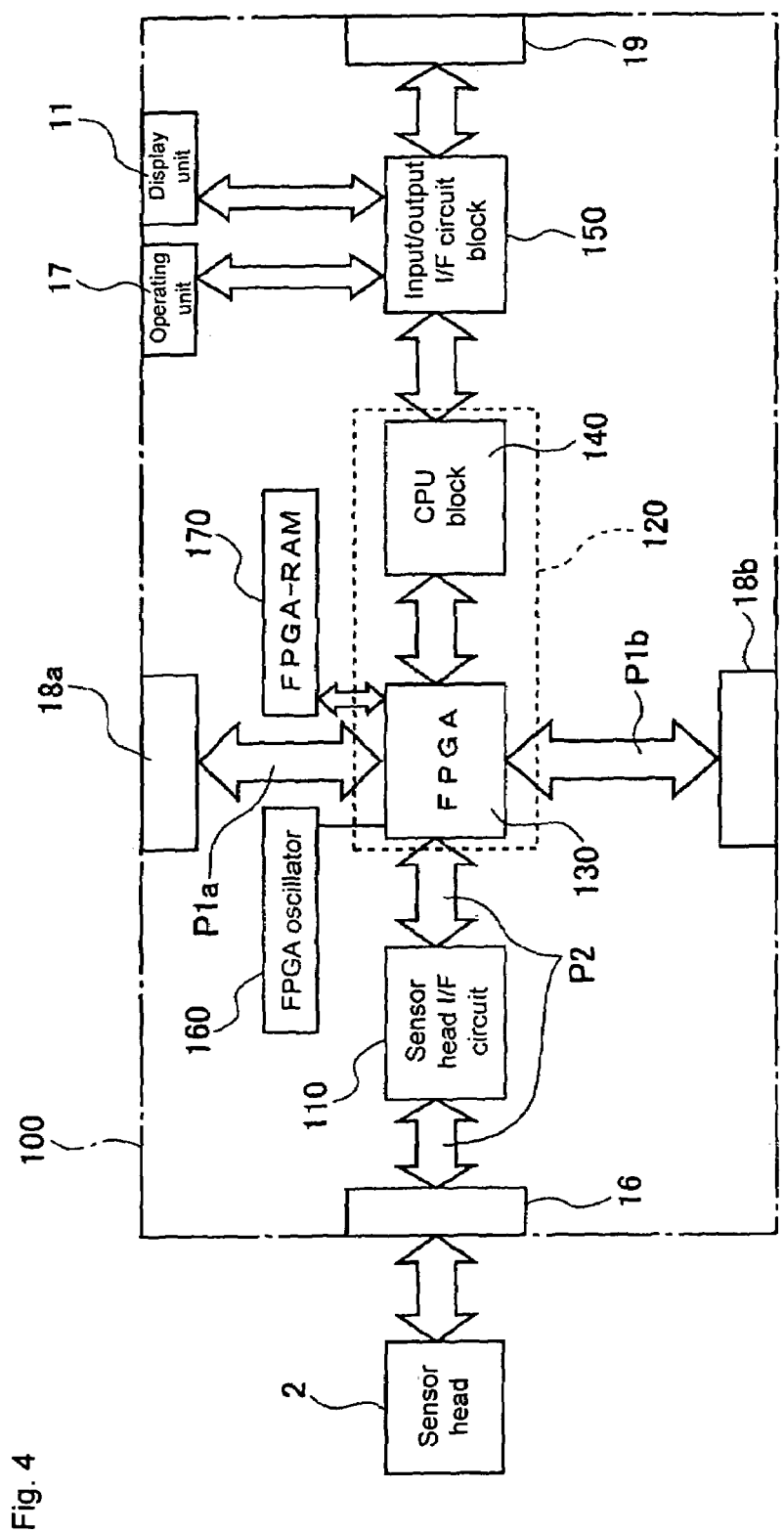
FIG. 4 shows a block diagram showing an internal configuration of a sensor controller circuit.

The internal configuration of the sensor controller circuit is shown in the block diagram of FIG. 4. As shown in FIG. 4, the sensor controller circuit 100 include four types of connectors including a sensor head connector 16, a first unit connector (right) 18a, a second unit connector (left) 18b and an external I/F connector 19. The sensor head connector 16, as explained in FIG. 3 earlier, is connected with the sensor head connector 4a mounted at the forward end of the sensor cable 4 led out of the sensor head 2. The first unit connector (right) 18a and the second unit connector (left) 18b are connected with adjacent other units on the right and left sides, respectively, through a relay connector member 7 shown in FIG. 1. The external I/F connector 19 is a general term for the USB connector 13, the RS-232C connector 14 and the external connection cord 3 shown in FIG. 1. The personal computer (PC) and the programmable controller (PLC) are connected through the external I/F connector 19.

The sensor controller 100 contains therein a sensor head I/F circuit 110, a control unit 120, an input/output I/F circuit block 150, a FPGA oscillator 160 and a FPGA-RAM 170.

A first inter-unit path P1a including the sensing data transmission path between the FPGA 130 and the first unit connector (right) 18a is laid between the control unit 120 and the first unit connector (right) 18a. Similarly, a second inter-unit path P1b including the sensing data transmission path between the FPGA 130 and the second unit connector (left) 18b is inserted between the control unit 120 and the second unit connector (left) 18b. Also, a sensor head path P2 to transmit the sensing data is formed between the sensor head connector 16 and the FPGA 130. The sensor head I/F circuit 110 is arranged midway in the sensor head path P2.

The control unit 120 includes the FPGA 130 providing a programmable logic circuit and the CPU block 140 to control the operation of the sensor controller. The CPU block 140, in turn, includes a microprocessor (CPU) and the peripheral circuits thereof. The FPGA 130 is a LSI (large scale integration) capable of programming (configuring) a circuit configuration by downloading the circuit data.

The FPGA 130 implements an arbitrary pseudo-logic circuit by combining a logic block, a switch matrix and a cross point switch. The logic block realizes various logics by a LUT (lookup table) including a combination of a memory and a multiplexer. The switch matrix and the cross point switch connect the logic blocks thereof under the control of the memory. Also, the FPGA 130 uses an I/O block to exchange data with external devices.

The FPGA is any of anti-fuse type, EEPROM type, flash ROM type and SRAM type. In the FPGA of anti-fuse type, an internal connecting point of the circuit is formed of a fuse to burn off the unrequired parts to constitute the circuit. The other types of FPGA are such that the on/off data of the semiconductor switch is determined by the memory data.

The FPGA 130 according to this embodiment is of SRAM type, in which the circuit data is required to be downloaded to the FPGA chip each time power is switched on. The use of the EEPROM type or the flash ROM type instead of the SRAM type can maintain a programmed circuit configuration until the circuit data is erased or another circuit data is downloaded even after power is switched off.

The FPGA-RAM 170 corresponds to the "storage means" connected to the programmable logic circuit. According to this embodiment, the SRAM is used taking into consideration the importance of the high speed as a working memory of the arithmetic operation circuit in the FPGA 130. In the case where emphasis is placed on the large capacity rather than the high speed, on the other hand, a rewritable semiconductor memory such as a flash memory or a hard disk device may be used as this storage means.

In this example, the unit connectors (18a, 18b) and the inter-unit paths (P1a, P1b), though arranged on both the right and left sides, may be arranged only on one of the right and left sides. Especially in the case of a design with a fixed direction in which the sensing data is transmitted, the unit connector and the inter-unit path for the types of devices functionally adapted to be installed on the most upstream or downstream side of data transmission may be arranged only on the side requiring connection.

The internal components of the sensor head circuit 200 and the sensor controller circuit 100 are explained below in detail with the following-described fact as a matter of course. The signal or data transmission path shown, even when designated by a single line, may be composed of a plurality of lines. The term "control signal" is used to mean a signal to control the circuit operation in the broad sense of the words, and includes an enable signal, read/write signal, address signal, interrupt signal, switching signal and a timing instruction signal.

Figure 5:
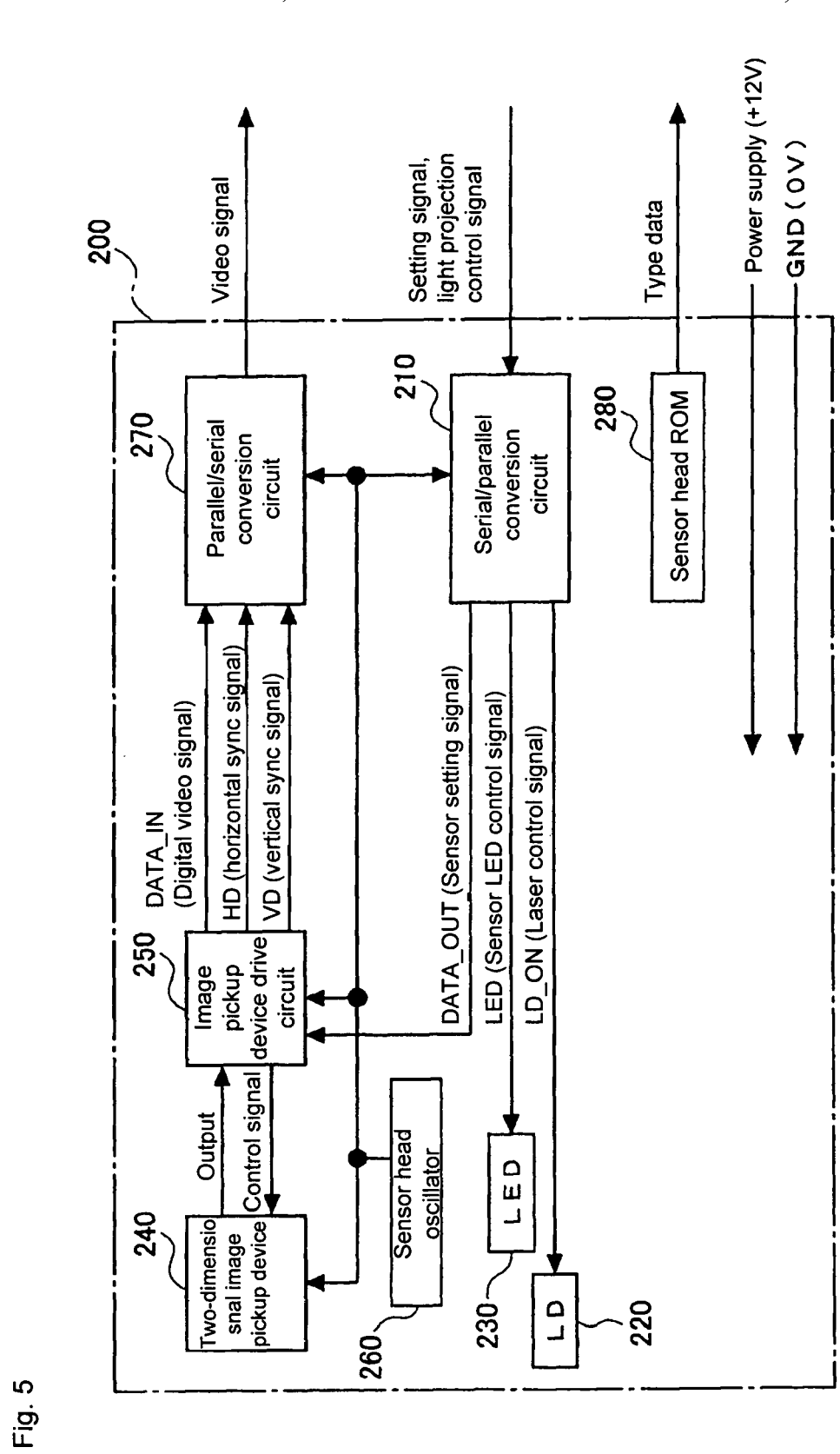
FIG. 5 shows a detailed block diagram showing the sensor head circuit.

The sensor head circuit is shown in detail in the block diagram of FIG. 5. The sensor head circuit 200 is an electrical circuit contained in the sensor head 2 shown in FIG. 3. As shown in FIG. 3, the sensor head circuit 200 includes a serial/parallel conversion circuit 210, a semiconductor laser diode (LD) 220, a light-emitting diode (LED) 230, a two-dimensional image pickup device 240, an image pickup device drive circuit 250, a sensor head oscillator 260, a parallel/serial conversion circuit 270 and a sensor head ROM 280. Also, the sensor head circuit 200 is operated by the power (+12 V, 0 V) supplied from the sensor controller 1 through a sensor cable 4.

The serial/parallel conversion circuit 210 generates and outputs LD_ON (laser control signal), LED (sensor LED control signal) and DATA_OUT (sensor setting signal) by serial/parallel conversion of the setting signal and the light projection control signal sent from the sensor controller.

In response to LD_ON (laser control signal), the LD 220 providing a light source used to project the light for the sensing operation is driven. In response to LED (sensor LED control signal), the LED 230 providing a display, not shown, in the sensor head 2 is driven. The DATA_OUT (sensor setting signal) is sent to the image pickup device drive circuit 2.50.

The sensor setting signal is used to designate the pixel area read by the CMOS two-dimensional image pickup device, the shutter speed (charge accumulation time) and the image pickup mode as to whether the image is picked up continuously at predetermined time intervals or in response to the trigger signal from the sensor controller.

The two-dimensional image pickup device 240 is of CMOS type in this example. The two-dimensional image pickup device 240 of CCD type can alternatively be employed. As explained earlier with reference to FIG. 3, the light from the LD 220 is converted into the slit light and radiated on the object 6. The radiated light image IM on the object 6 is focused on the two-dimensional image pickup device 240 by a lens (not shown) arranged in the sensor head. The optical axis of the projected light and the optical axis of received light form a predetermined angle with each other.

The longitudinal direction of the cross section of the slit light in a plane perpendicular to the direction in which the slit light proceeds is at right angles to the plane formed by the optical axis of the projected light and the optical axis of the received light. With the change in distance from the sensor head to the object, the image of slit light on the two-dimensional image pickup device 240 moves in the direction perpendicular to the length of the slit light. The horizontal scanning direction of the two-dimensional image pickup device 240 is aligned with the direction in which the slit light image moves. The peak point of light strength on the horizontal scanning line of the two-dimensional image pickup device 240 indicates the distance to the object. The use of the slit light makes it possible to measure the distance distribution along the length of the slit light at a time.

The image pickup operation of the two-dimensional image pickup device 240 is performed based on the control signal supplied from the image pickup device drive circuit 250, and the output produced by the image pickup operation is sent to the image pickup device drive circuit 250.

The image pickup device drive circuit 250 produces DATA_IN (digital video signal), HD (horizontal sync signal) and VD (vertical sync signal) based on the output obtained from the two-dimensional image pickup device 240. These three signals, after parallel/serial conversion through the parallel/serial conversion circuit 270, are sent as video signals to the sensor controller 1.

The above-mentioned operation of the serial/parallel conversion circuit 210, the two-dimensional image pickup device 240, the image pickup device drive circuit 250 and the parallel/serial conversion circuit 270 are performed in synchronism with the clock supplied from the sensor head oscillator 260. Also, the type data of the sensor head is stored in the sensor head ROM 280.

Figure 6:
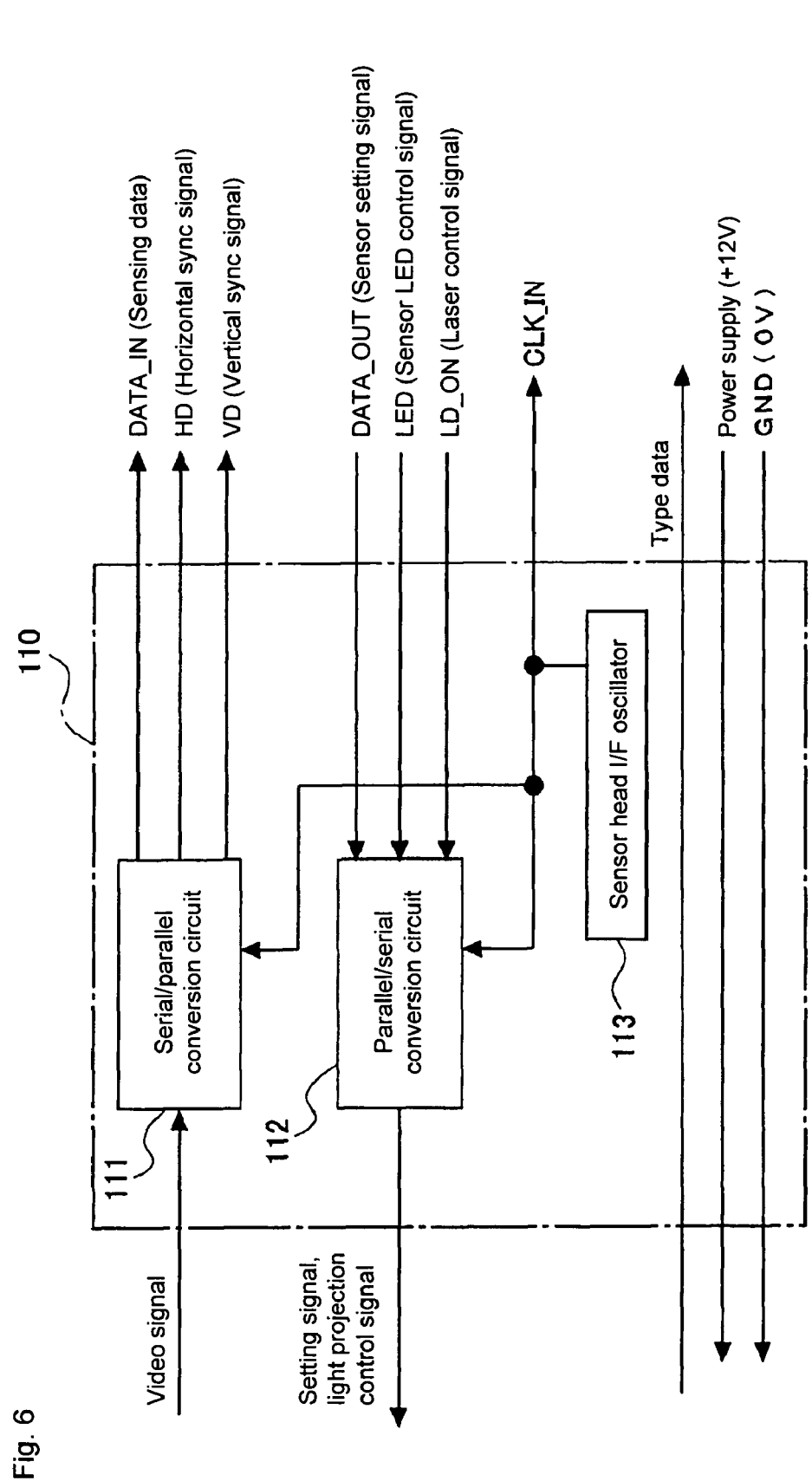
FIG. 6 shows a detailed block diagram showing a sensor head interface circuit.

Next, the sensor controller circuit 100 is explained in detail. The sensor head I/F circuit 110 is shown in detail in the block diagram of FIG. 6. As shown in FIG. 6, the sensor head I/F circuit 110 includes a serial/parallel conversion circuit 111, a parallel/serial conversion circuit 112 and a sensor head I/F oscillator 113.

In the serial/parallel conversion circuit 111, the video signal sent from the sensor head 2 through the sensor cable 4 is subjected to serial/parallel conversion thereby to generate and output DATA_IN (sensing data), HD (horizontal sync signal) and VD (vertical sync signal).

The parallel/serial conversion circuit 112, on the other hand, generates a setting signal and a light projection control signal by parallel/serial conversion of the DATA_OUT (sensor setting signal), LED (sensor LED control signal) and LD_ON (laser control signal) sent from the control unit 120. The setting signal and the light projection control signal thus generated are sent to the sensor head 2 through the sensor cable 4.

The power supply (+12 V, 0 V) is sent to the sensor head circuit 200 through the sensor head I/F circuit 110. The type data read from the sensor head ROM 280 of the sensor head circuit 200 is sent to the control unit 120 through the sensor head I/F circuit 110.

Figure 7:
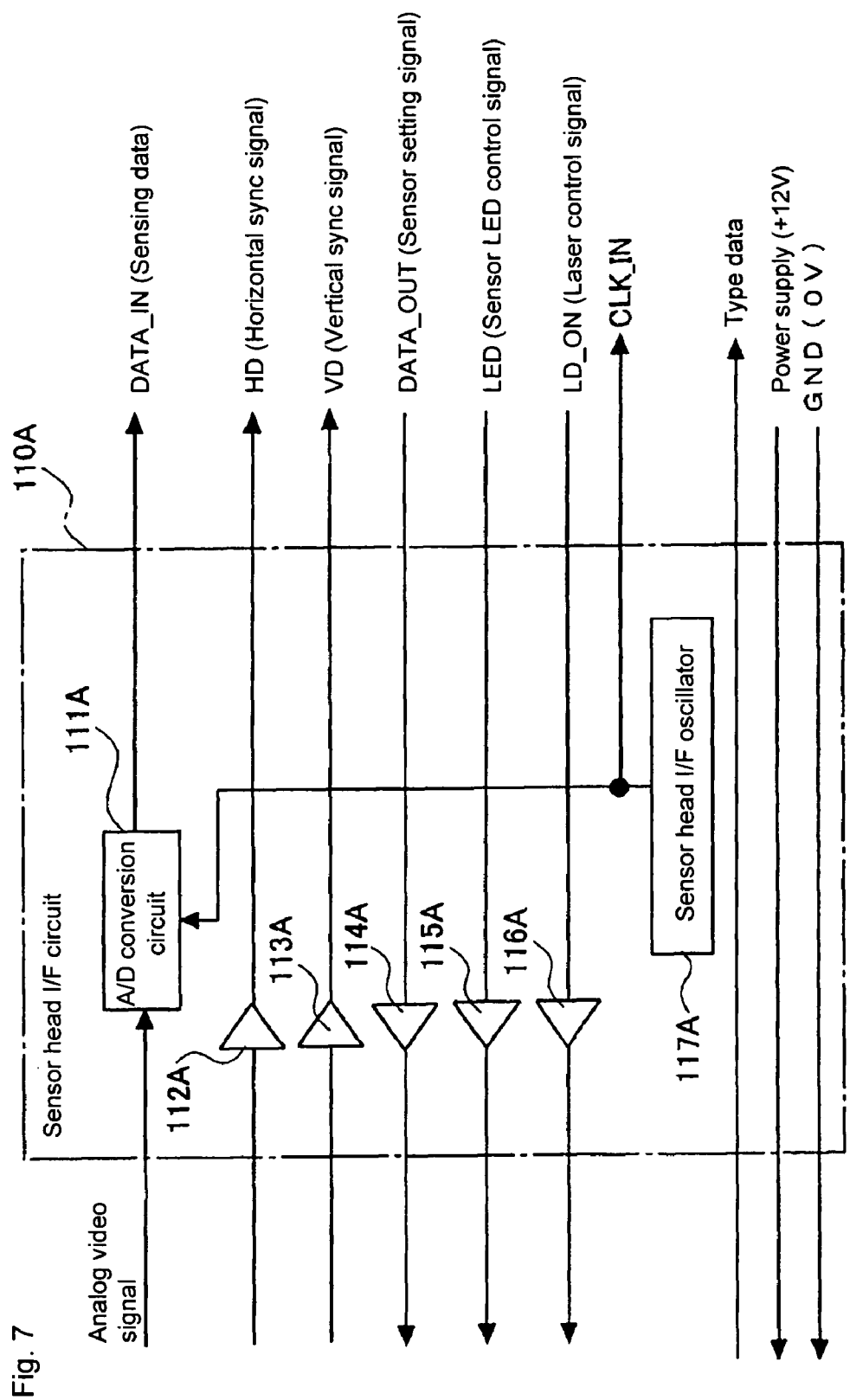
FIG. 7 shows a detailed block diagram showing another sensor head interface circuit.

Another sensor head I/F circuit is shown in detail in the block diagram of FIG. 7. This sensor head I/F circuit 110A is employed in the case where the sensor head outputs an analog video signal. In FIG. 7, the A/D conversion circuit 111A generates DATA_IN (sensing data) by A/D conversion of the analog video signal sent from the sensor head 2 through the sensor cable 4.

The HD (horizontal sync signal) and the VD (vertical sync signal) sent from the sensor head 2 through the sensor cable 4 are relayed by buffers 112A, 113A to the control unit 120 in the sensor controller circuit 100.

The DATA_OUT (sensor setting signal), LED (sensor LED control signal) and LD_ON (laser control signal) sent from the control unit 120 of the sensor controller circuit 100 are relayed to the sensor head 2 by the buffers 114A, 115A, 116A.

The sensor head I/F circuit 110A, like the digital control sensor head I/F circuit 110, relays the type data and the power supply (+12 V, 0 V).

Figure 8:
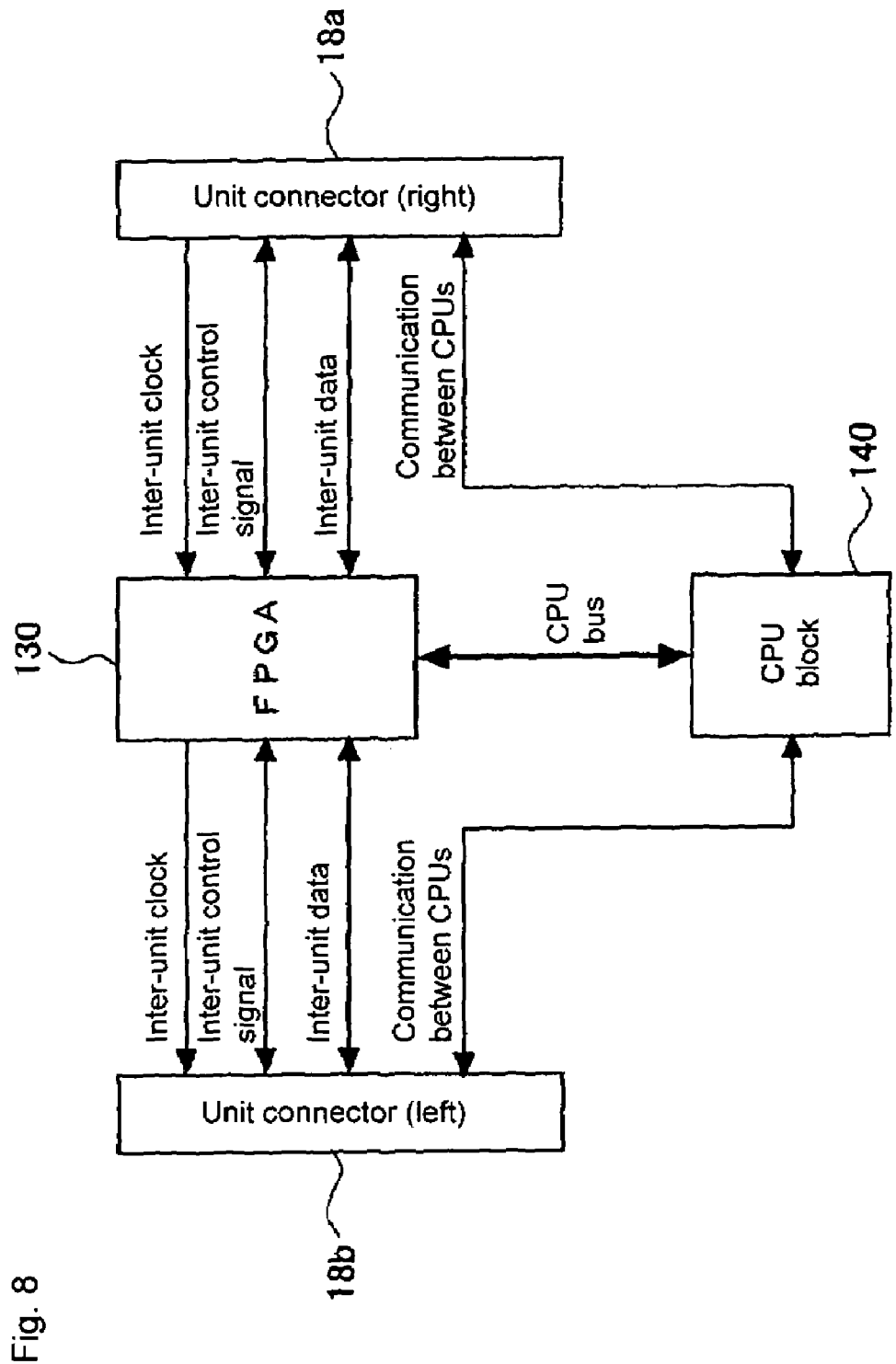
FIG. 8 shows a signal flow diagram showing the connection between a FPGA, a CPU and a unit connector.

The signal flow diagram of FIG. 8 shows the connection between FPGA, CPU and the unit connector. The inter-unit data transmission path (sensing data transmission path) is constituted of eight parallel data lines. This realizes a high-speed data transmission.

The inter-unit control signal includes a signal indicating the unit number to specify the unit at the other end of communication (for example, the party requesting the data output). By providing a plurality of inter-unit data transmission paths and inter-unit control signal transmission paths, the data can be transmitted at a higher speed or different data can be transmitted in parallel.

According to this embodiment, the inter-unit data are transmitted bidirectionally, and the direction of transmission may be fixed in such a manner that the right side is exclusive to input and the left side to output (or vice versa). Once the direction of transmission is determined this way, the transmission can be set easily for a plurality of sensor controllers connected with each other. Also, the internal circuits of the sensor controller can be simplified.

The communication between CPUs is a serial communication, and the communication rate is lower than the data transmission between units. This communication is suitable, therefore, for the transmission of the sensing data having a small data amount such as the result of arithmetic operation obtained by the arithmetic operation of the image data, the initialization of the unit number of the sensor controller or the communication for various setting changes during operation. Though the communication rate is low, the contents of communication can be freely determined by software, and therefore a highly versatile communication is realized. This communication can be carried out without interfering the high-speed data transmission between units. The communication between CPUs may be carried out through the FPGA 130.

Figure 9:
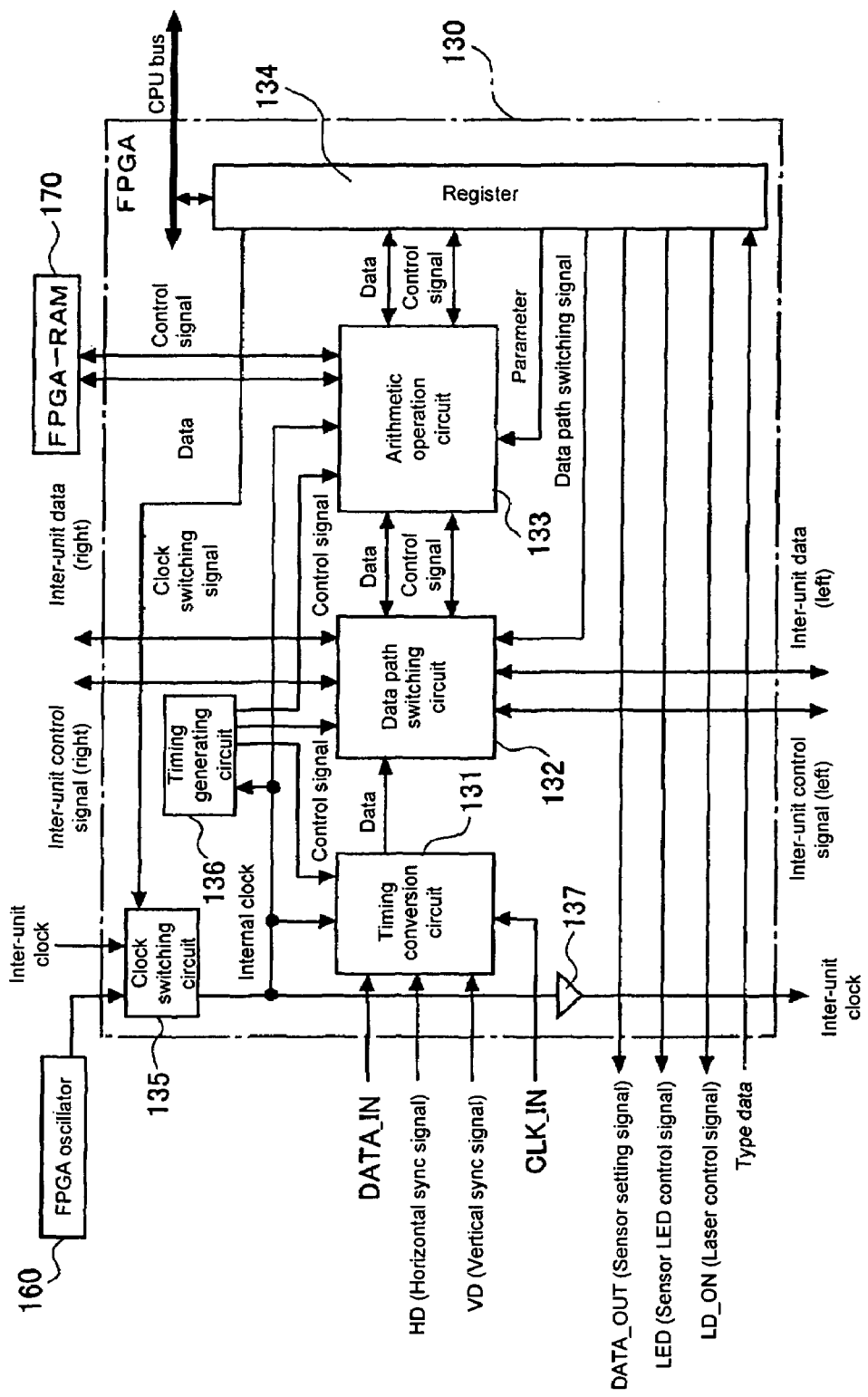
FIG. 9 shows a detailed block diagram showing the internal circuit of the FPGA.

The internal circuits of FPGA are shown in detail in the block diagram of FIG. 9. As shown in FIG. 9, the FPGA 130 includes a timing conversion circuit 131, a data path switching circuit 132, an arithmetic operation circuit 133, a register 134, a clock switching circuit 135, a timing generating circuit 136 and a buffer 137.

The register 134 is a memory used for data transmission between the internal circuits of the FPGA 130 or the input/output lines of the FPGA 130 and the CPU bus.

In the clock switching circuit 135, the clock signal (first clock signal) output from the FPGA oscillator 160 or the inter-unit clock signal (second clock signal) input from another sensor controller through the first unit connector 18a is selected in accordance with an instruction based on the clock switching signal from the CPU block 140, and supplied as an internal clock signal into the FPGA 130. Further, the clock signal thus selected is output to the second unit connector 18b.

The timing generating circuit 136 outputs a control signal to each of the timing conversion circuit 131, the data path switching circuit 132 and the arithmetic operation circuit 133, and thus adjusts the operation of each of these circuits to assure the operation thereof at a coordinated timing.

The arithmetic operation circuit 133 is designed in accordance with a particular object of sensing. In the case where the sensing data is an image data, the arithmetic operation circuit blocks are combined to remove noises, emphasize the edges, change the gradation, binarize the data, calculate an average value, extract a peak position, extract an area or extract the gravity center position. The sensing data to be arithmetically processed is not limited to the image data but may be a multi-valued data acquired in time series. The output of a displacement sensor using a PSD (position sensitive device), for example, is obtained as analog signal changing with time. This signal may be converted into a digital signal (sampled) at regular time intervals and the resulting data processed by an arithmetic operation circuit including a combination of arithmetic circuit blocks to remove noises or extract the feature amount.

Also in this case, the FPGA 130 executes the arithmetic operation by the hardware wired in accordance with the specific arithmetic operation, and therefore as compared with the arithmetic operation executed by a CPU and a program, a high-speed arithmetic operation is made possible. Thus, the sampling period can be reduced, so that a phenomenon generated within a short time can be sensed.

The arithmetic operation in the arithmetic operation circuit may be carried out by use of the FPGA-RAM 170 connected to the FPGA 130 as a working memory. The arithmetic operation in the arithmetic operation circuit 133 may be executed for each sizable amount of data such as one frame of image or sequentially or continuously acquired data using a line buffer of several scanning lines and outputting the result thereof continuously in a pipeline.

Figure 10:
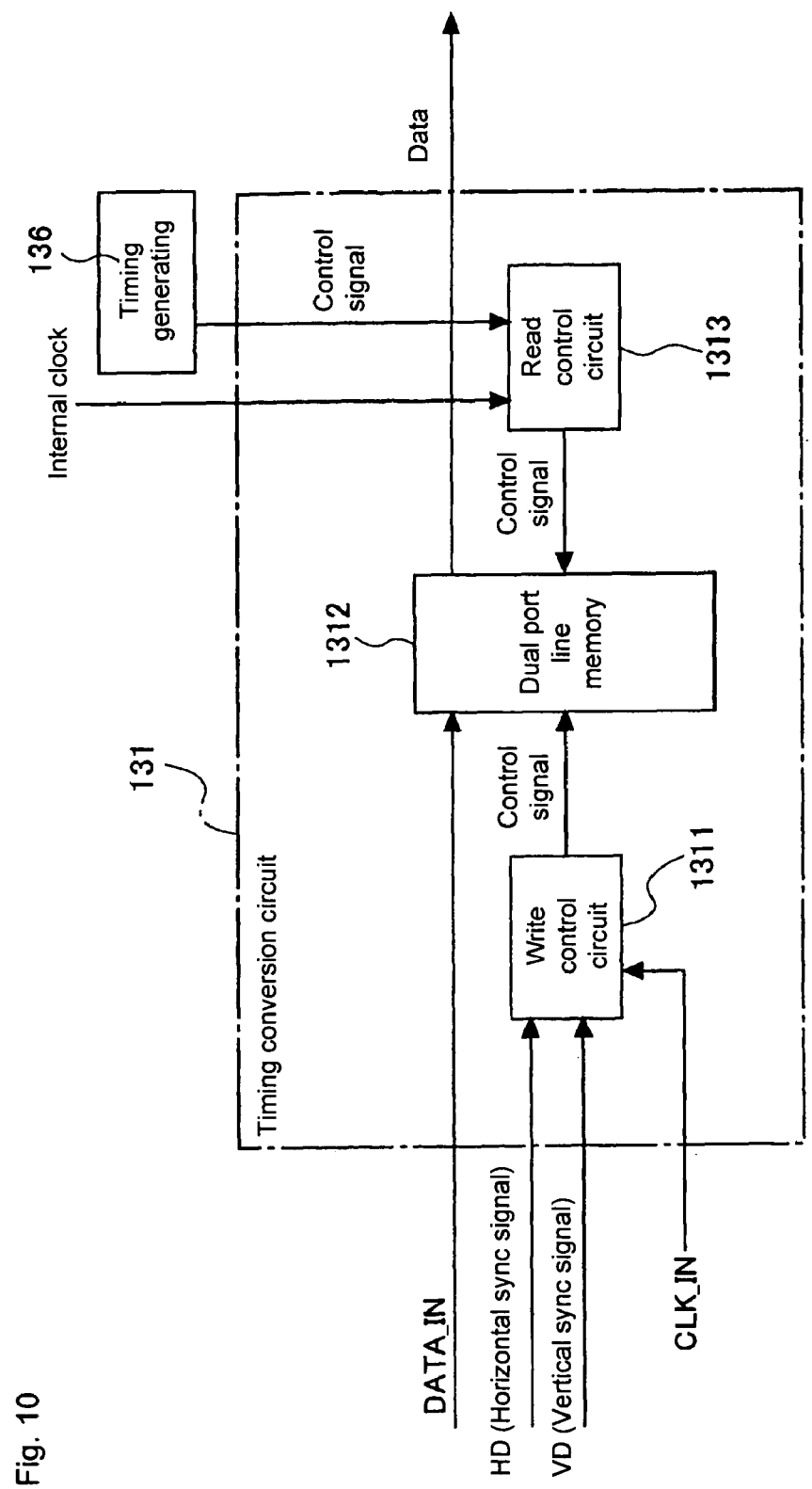
FIG. 10 shows a detailed block diagram showing a timing conversion circuit.

The timing conversion circuit included in the internal circuit of FPGA is shown in detail in the block diagram of FIG. 10. As shown in FIG. 10, the timing conversion circuit 131 includes a write control circuit 1311, a dual port line memory 1312 and a read control circuit 1313. The timing conversion circuit 131 functions to enable the sensor controller 1 to read the data at the optimum timing while allowing for the clock rate difference between the sensor head 2 and the sensor controller 1. Specifically, in the timing conversion circuit 131, the write operation into the dual port line memory 1312 is controlled by the clock signal (CLK_IN) shared by the sensor head I/F circuit 110, while the read operation from the dual port line memory 1312 is controlled by the internal clock signal of the FPGA 130.

Figure 11:
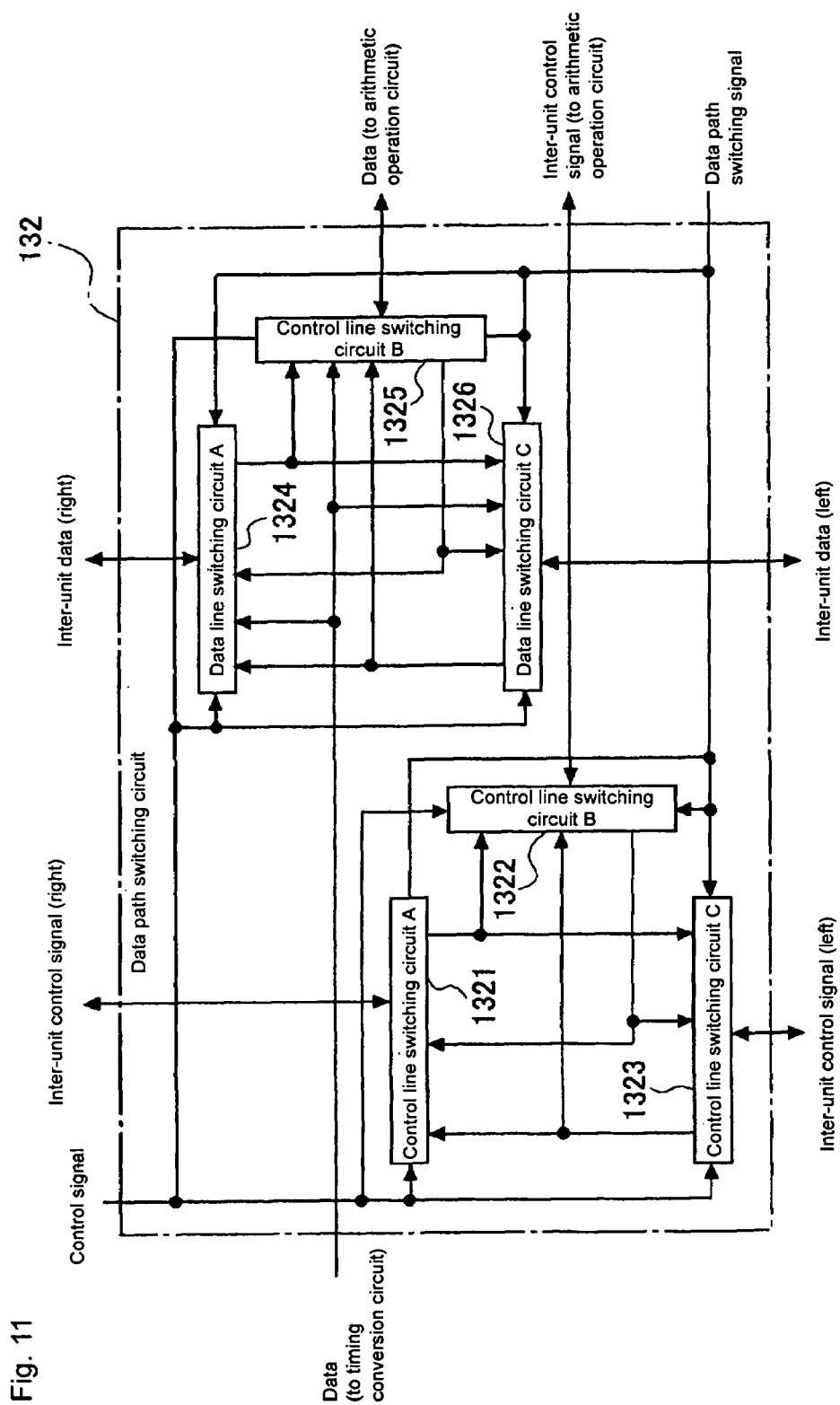
FIG. 11 shows a detailed block diagram showing a data path switching circuit.

The data path switching circuit is shown in detail in the block diagram of FIG. 11. As shown in FIG. 11, the data path switching circuit 132 includes a control line switching circuit (A) 1321, a control line switching circuit (B) 1322, a control line switching circuit (C) 1323, a data line switching circuit (A) 1324, a data line switching circuit (B) 1325 and a data line switching circuit (C) 1326.

The connection between the input and output of each of the data line switching circuits 1324 to 1326 and the control line switching circuits 1321 to 1323 is determined by a data path switching signal from the CPU block 140.

The data line switching circuit (A) 1324, for example, can connect the line of the inter-unit data (right) (eight parallel data line in this embodiment) to the line connected to the data line switching circuits (B) 1325 and (C) 1326 (the line at the rightmost end under the data line switching circuit (A), which is also actually an eight parallel data line) As an alternative, nothing can be connected. Further, any one of the three lines (actually, each an eight parallel data line) input from under the data line switching circuit (A) 1324 can be connected to the inter-unit data line (right).

By appropriately controlling the data line switching circuits (A), (B), (C) 1324 to 1326, the data input from the timing conversion circuit 131, i.e. the sensor head 2 can be output to one, two or all of the inter-unit data (right), the inter-unit data (left) and the arithmetic operation circuit 133, or the data can be output to none of them.

The data input from the inter-unit data (right) can be output to one or both of the inter-unit data (left) and the arithmetic operation circuit 133, or the data can be output to none of them. The data input from the inter-unit data (left) can be output to one or both of the inter-unit data (right) and the arithmetic operation circuit 133, or the data can be output to none of them. The data input from the arithmetic operation circuit 133 can be output to one or both of the inter-unit data (right) and the inter-unit data (left), or the data can be output to none of them.

The same applies also to the control line switching circuits (A), (B), (C) 1321 to 1323. With regard to the control line switching circuits 1321 to 1323, however, no path exists to input the data from the timing conversion circuit 131, i.e. from the sensor head 2.

Figure 12:
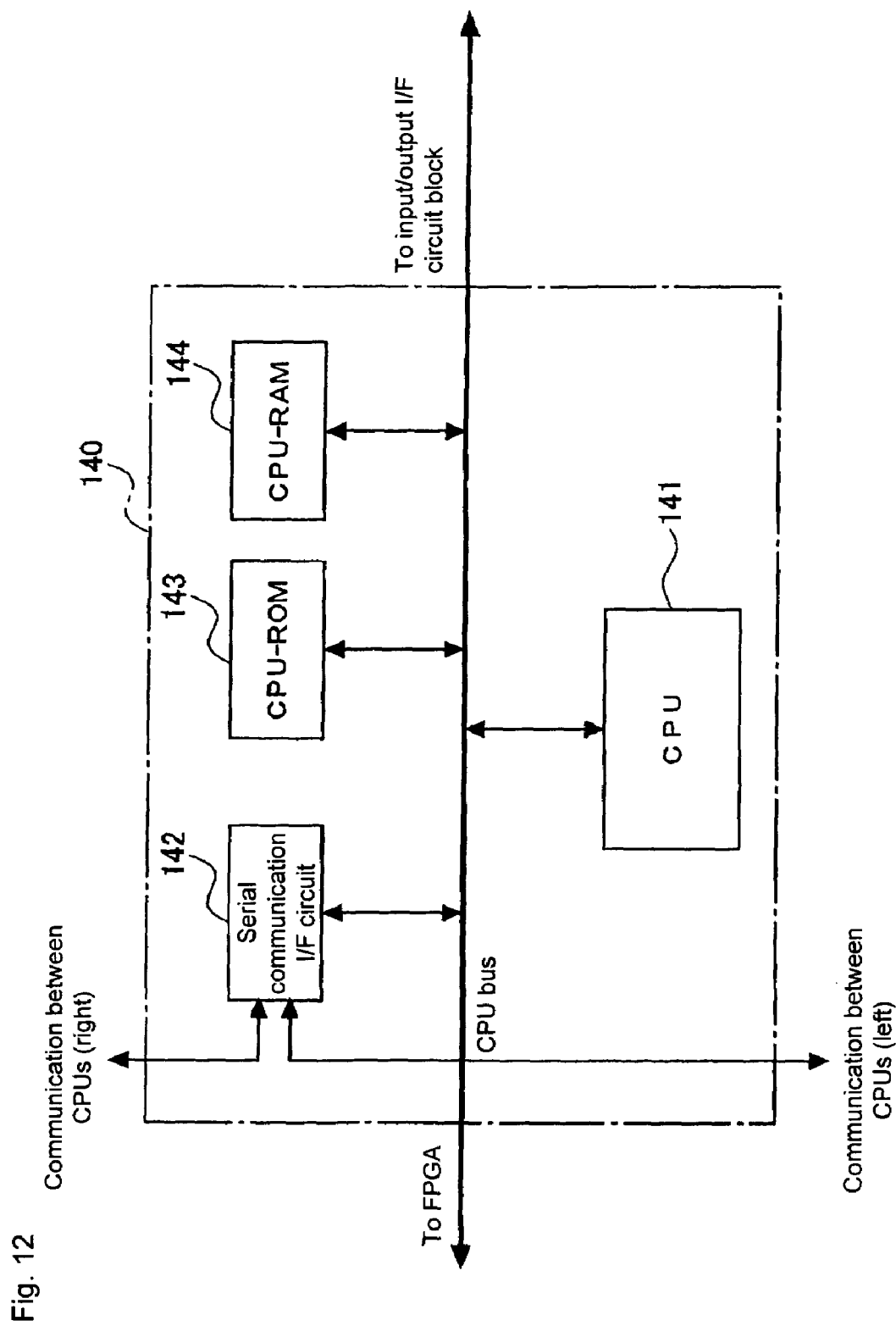
FIG. 12 shows a detailed block diagram showing a CPU block.

The CPU block is shown in detail in the block diagram of FIG. 12. As shown in FIG. 12, the CPU block 140 includes a CPU 141 mainly configured of a microprocessor, a serial communication I/F circuit 142, a CPU-ROM 143 and a CPU-RAM 144.

The CPU-ROM 143 has stored therein the program for the CPU to control the operation of the sensor controller and the circuit data to be loaded to the FPGA 130 immediately after power is switched on.

The CPU 141, the serial communication I/F circuit 142, the CPU-ROM 143 and the CPU-RAM 144 are connected to each other through a CPU bus. The CPU bus is connected to both the FPGA and the input/output I/F circuit block. The serial communication I/F circuit 142 is connected, through a unit connector, to each of the CPU block of the right adjacent sensor controller and the CPU block of the left adjacent sensor controller.

Figure 13:
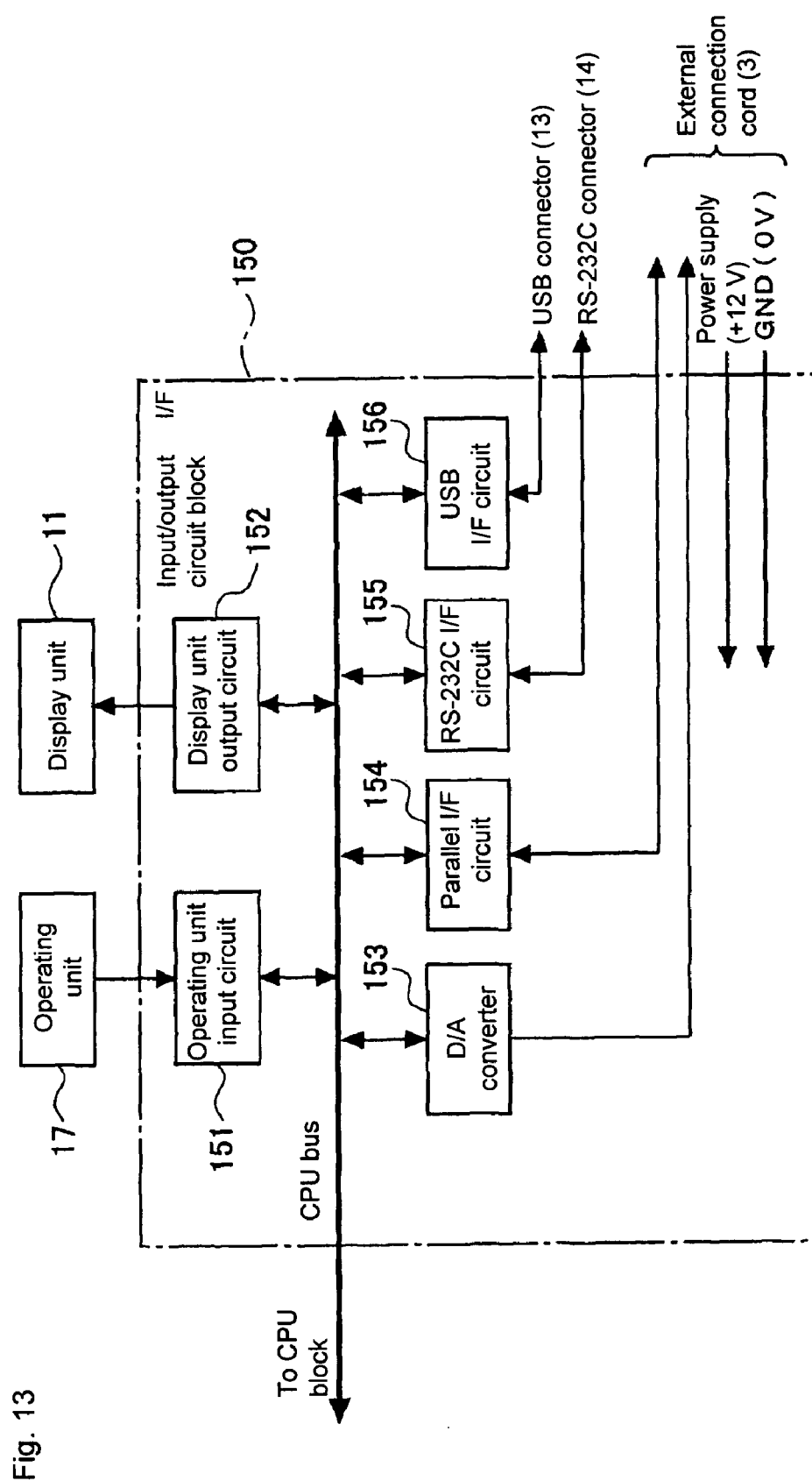
FIG. 13 shows a detailed block diagram showing an input/output interface circuit block.

The input/output I/F circuit block is shown in detail in the block diagram of FIG. 13. As shown in FIG. 13, the input/output I/F circuit block 150 includes an operating unit input circuit 151, a display unit output circuit 152, a D/A converter 153, a parallel I/F circuit 154, a RS-232C interface circuit 155 and a USB interface circuit 156.

The operating unit input circuit 151 functions as an interface to input the outputs from the numerical keys, the function keys and the slide switch making up the operating unit 17. The display unit output circuit 152 functions as an interface to output the display data of the display unit 11. The D/A converter 153 functions as an interface to output an analog signal on the output line included in an external connection cord 3. The parallel interface circuit 154 functions as an interface to exchange parallel data with the signal lines included in the external connection cord 3. The RS-232C interface circuit 155 functions as an interface to exchange the data with the RS-232C connector 14. The USB interface circuit 156 functions as an interface to exchange the data with the USB connector 13.

The operating unit input circuit 151, the display unit output circuit 152, the D/A converter 153, the parallel interface circuit 154, the RS-232C interface circuit 155 and the USB interface circuit 156 are connected to the CPU bus leading to the CPU block 140. The input/output interface circuit block 150 may include an interface to connect a memory card.

Figure 14:
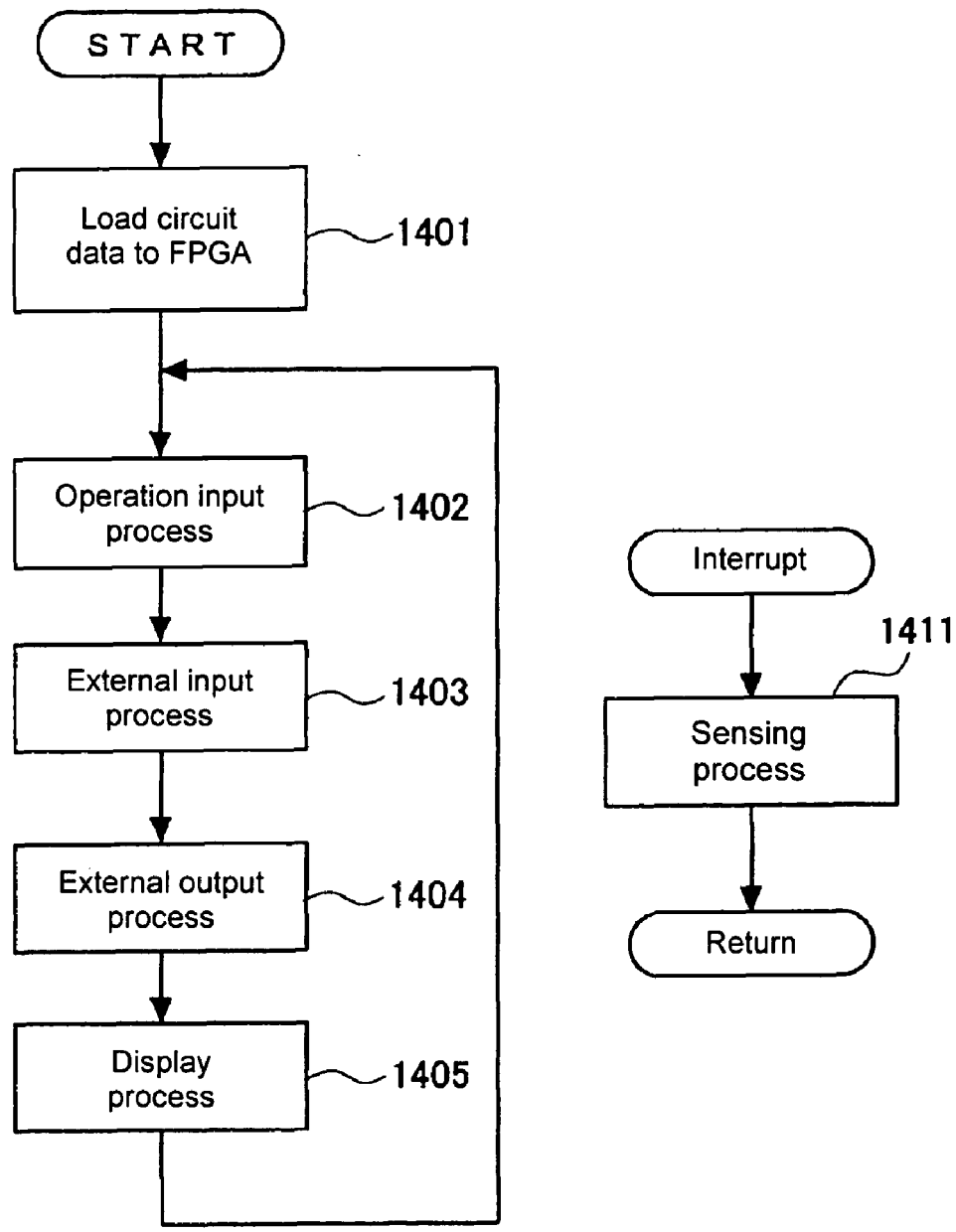
FIG. 14 shows a general flowchart of the CPU (operating as a unit).

A general flowchart (for operation as an independent unit) of the CPU 141 is shown in FIG. 14. As shown in FIG. 14, the whole process shown in this general flowchart is configured of a routine process and an interrupt process. The routine process includes a process to load the circuit data to the FPGA 130 (step 1401), an operation input. process (step 1402), an external input process (step 1403), an external output process (step 1404) and a display process (step 1405). The interrupt process, on the other hand, includes a sensing process (step 1411).

The routine process is started by switching on power. Once the process is started, the circuit data is loaded onto the FPGA 130 (step 1401), after which the operation input process (step 1402), the external input process (step 1403), the external output process (step 1404) and the display process (step 1405) are repeatedly executed, while entering an endless loop.

After the process is started by power on and the circuit data is loaded onto the FPGA 130 (step 1401), the CPU repeats the endless loop until power turns off (steps 1402 to 1405). Upon interruption from the FPGA 130 or from an external input, the CPU acquires the result of arithmetic operation on the sensing data from the FPGA 130 and executes a predetermined sensing process (step 1411).

In loading the circuit data onto the FPGA 130, the circuit data compressed and stored in the CPU-ROM 143 is defrozen and developed into the CPU-RAM 144, from which the circuit data is transferred to the FPGA 130.

In addition, the circuit data are input from an external source through the interfaces such as RS-232C and USB or from other sensor controllers by communication with them. These data are stored in the CPU-RAM 144 and transferred to the FPGA 130. In this way, the circuit data can be changed during operation as well as when power is switched on.

The parameter set in the FPGA 130 can be changed by an external instruction through the interfaces such as RS-232C and USB, by key input from the operating unit 17 or by an instruction from other sensor controllers by communication with them.

The setting parameters and the circuit data from an external source can be input and reflected in the FPGA 130 with the change in the situation or the detection environment of the object 6 to be detected.

A plurality of the setting parameters or the circuit data of the FPGA 130 may be prepared, and in accordance with the situation, the setting parameters or the circuit data to be loaded onto the FPGA 130 may be selected. This selection can also be carried out with the change in the detection environment or the situation of the object 6. The change can be notified from an external source or determined by the sensor controller itself based on the sensing data.

As another example of selecting the circuit data and the setting parameters, the type data specifying the model of the sensor head 2 is acquired from the sensor head 2 and in accordance with the type data thus acquired, the circuit data can be changed. By doing so, a plurality of models having different type data can be prepared (while the other configuration of the sensor head may remain the same), the arithmetic operation circuit can be configured with a measurement accuracy specially higher in accordance with the type data, the arithmetic operation circuit can be configured especially with a shorter required measurement time, or the arithmetic operation circuit can be configured with different specific processes (for example, the distance is measured only for the obverse surface of a transparent plate providing an object, or the distance measured for both the obverse and reverse surfaces thereof).

Then, the user can manage the system in accordance with the intended purpose of sensing with a corresponding type of the sensor head (the object may be indicated on the sensor head) or, for example, in such a way that once the sensor head meeting the purpose is connected, the circuit of the sensor controller changes in keeping with the purpose. Also, the circuit data and the setting parameters are stored in the sensor head, and may be transferred to the sensor controller from the sensor head.

Figure 15:
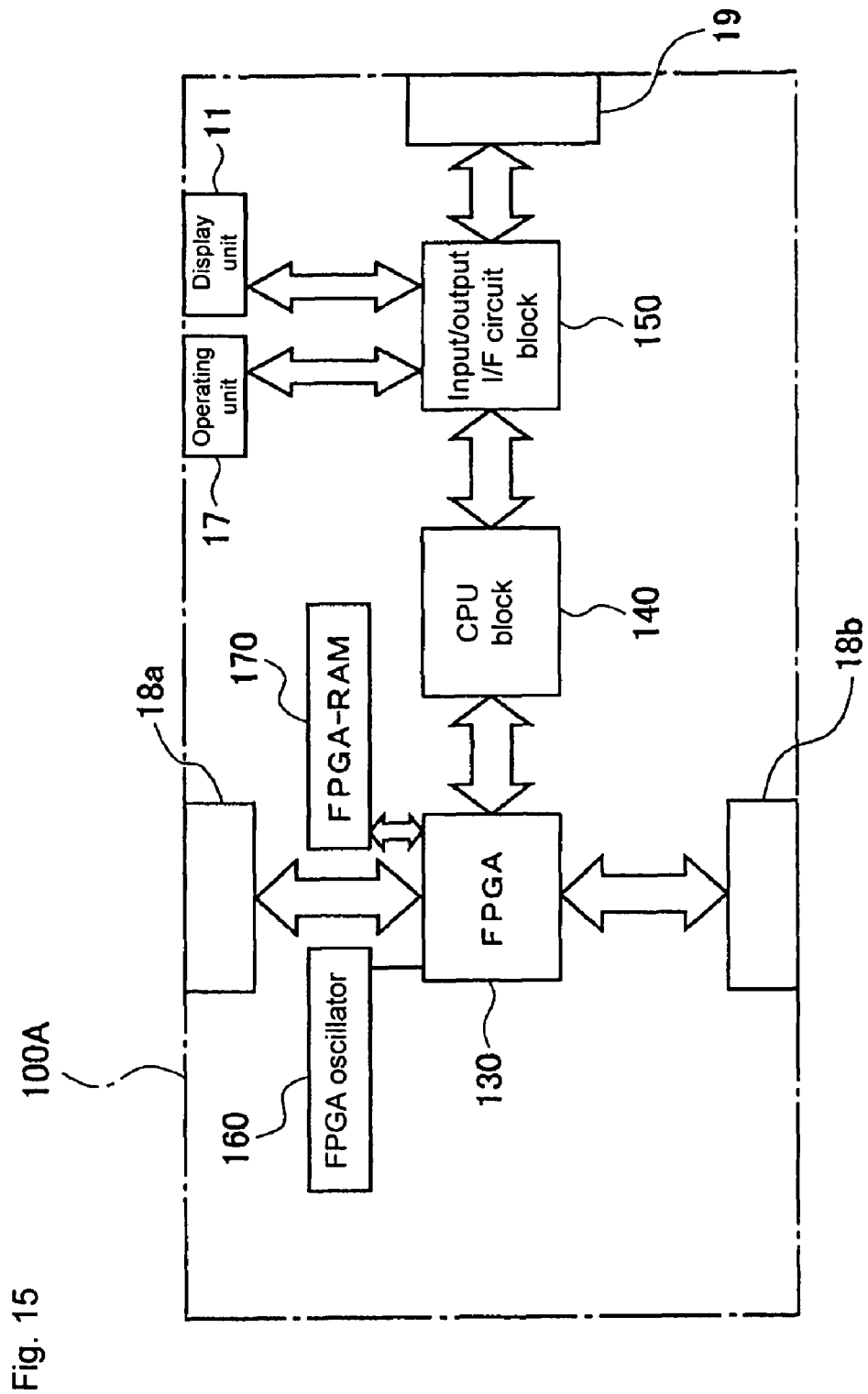
FIG. 15 shows a block diagram showing the internal configuration of a sensor controller circuit (arithmetic operation unit).

The internal configuration of the sensor controller circuit (arithmetic operation unit) is shown in the block diagram of FIG. 15. As shown in FIG. 15, the sensor controller circuit 100A, as compared with the sensor controller circuit 100 described earlier in FIG. 4, lacks the sensor head connector 16, the sensor head interface circuit 110 and the sensor head path P2. This sensor controller circuit 100A (arithmetic operation unit) is used, for example, in the case where the sensing data are acquired from other sensor controllers and arithmetically processed in a sensing system comprising a plurality of sensor controllers connected.

Figure 16:
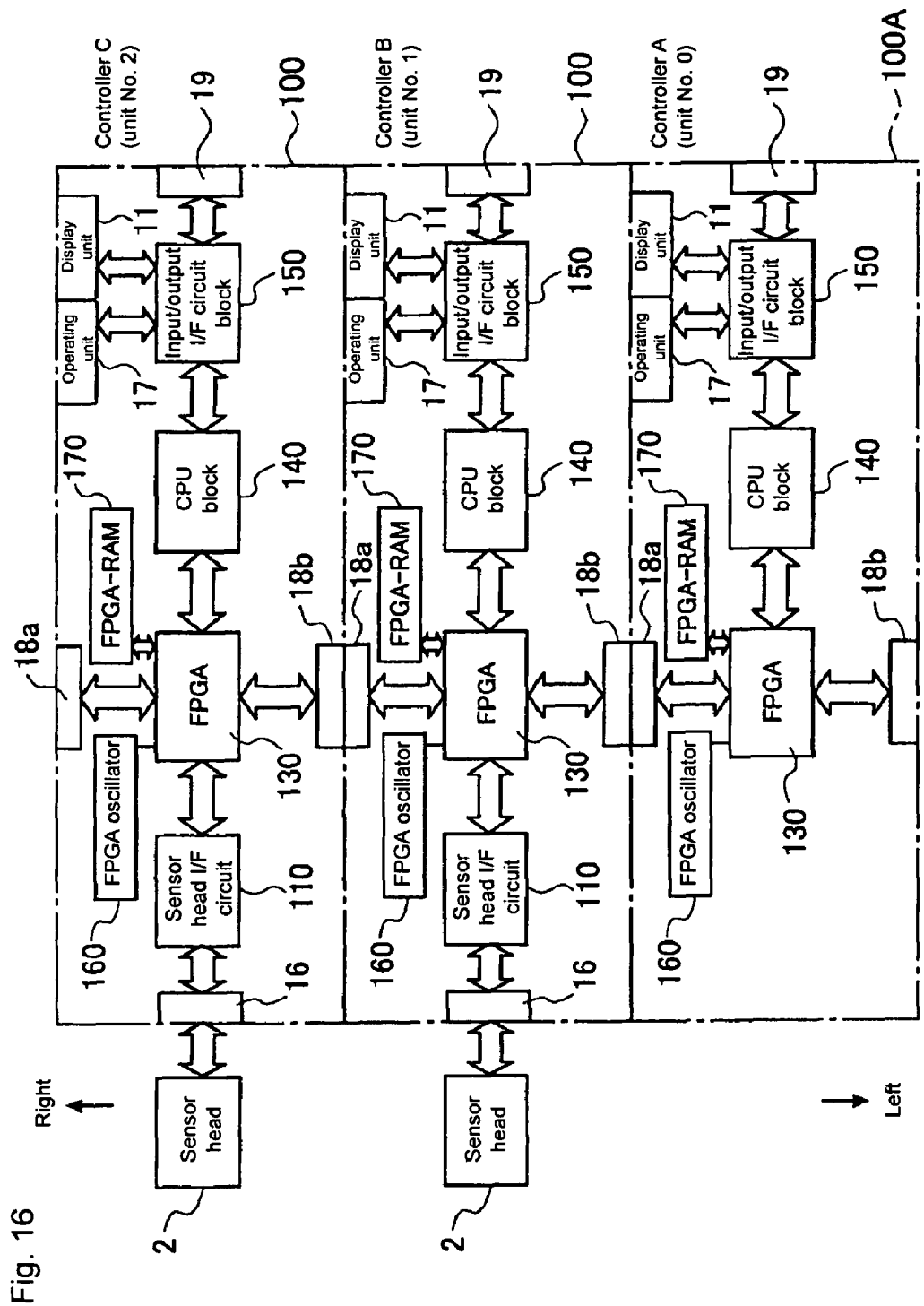
FIG. 16 shows a diagram showing a configuration of a sensing system A.

Next, the configuration of the sensing system A having the sensor controllers 100, 100A according to the invention is shown in FIG. 16. In FIG. 16, the controller A is the same as shown in FIG. 15 and the controllers B, C the same as those shown in FIG. 4. The controllers B, C are connected to the sensor head 2. The configuration of the sensor head 2 is shown in FIGS. 3 and 5 already. The controllers A to C are assigned the unit numbers "0" to "2" shown by executing the process of FIGS. 18 to 20.

Figure 17:
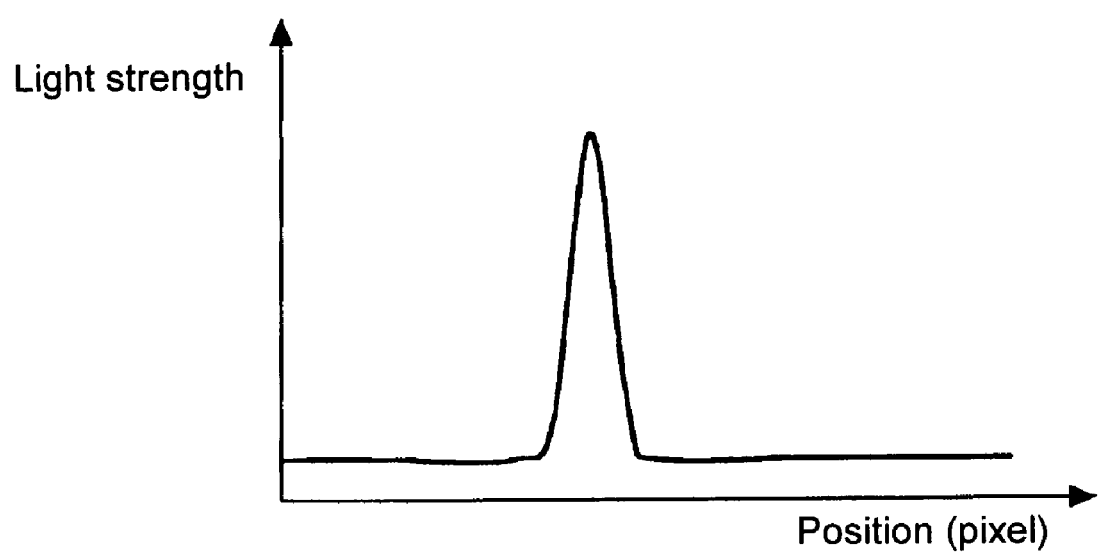
FIG. 17 shows a graph showing the light strength distribution obtained on the horizontal scanning line of an image pickup device.

Next, the light strength distribution obtained on the horizontal scanning line of an image pickup device is shown in FIG. 17. In FIG. 17, the position of the pixel associated with the peak light strength corresponds to the distance to the object. The sensor head 2 connected to the controller C shown in FIG. 16 is arranged above a horizontally positioned tabular object and measures the distance up to the upper surface (obverse surface) thereof. The sensor head 2 connected to the controller B, on the other hand, is arranged under the same object to measure the distance to the lower surface (reverse surface). The distance data (sensing data) obtained from the measurement by the controllers B, C are sent to the controller A. The controller A has set therein the distance between the two sensor heads, and using this information and the distance data obtained from the controllers A, B, calculates the thickness of the object. The result of calculation is output outside by the interface desired by the user through the input/output interface circuit block 150 of the controller C. Alternatively, it is determined whether the thickness meets a specified range and the result of determination is output.

In the sensing system A shown in FIG. 16, the sensor head 2 is arranged in juxtaposition with the object 6 on the side thereof so that the height difference (step) of the measurement positions thereof can be used for the measurement.

Figure 18:
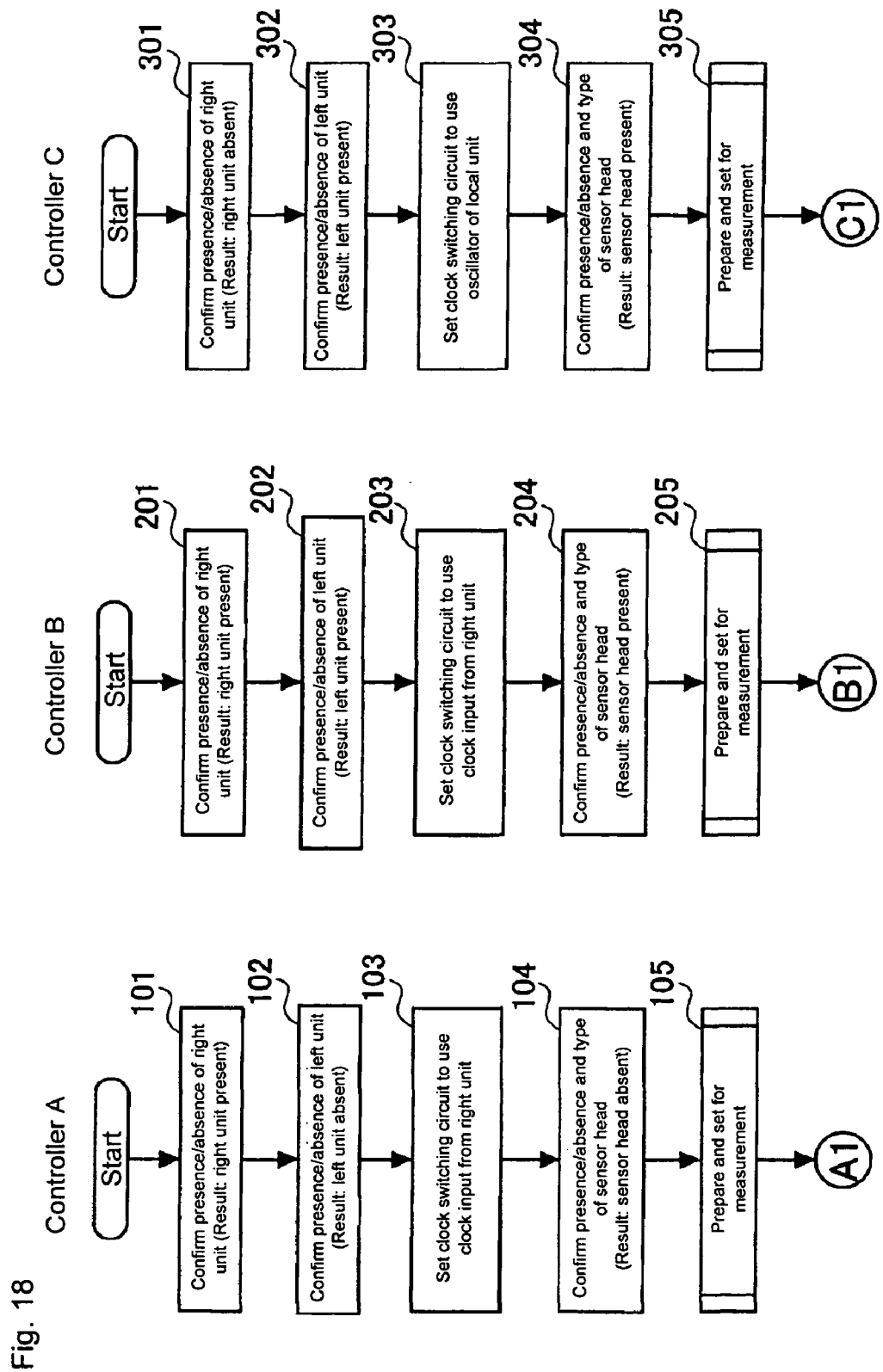
FIG. 18 shows an operation flowchart of the sensing system A (No. 1).
Figure 19:
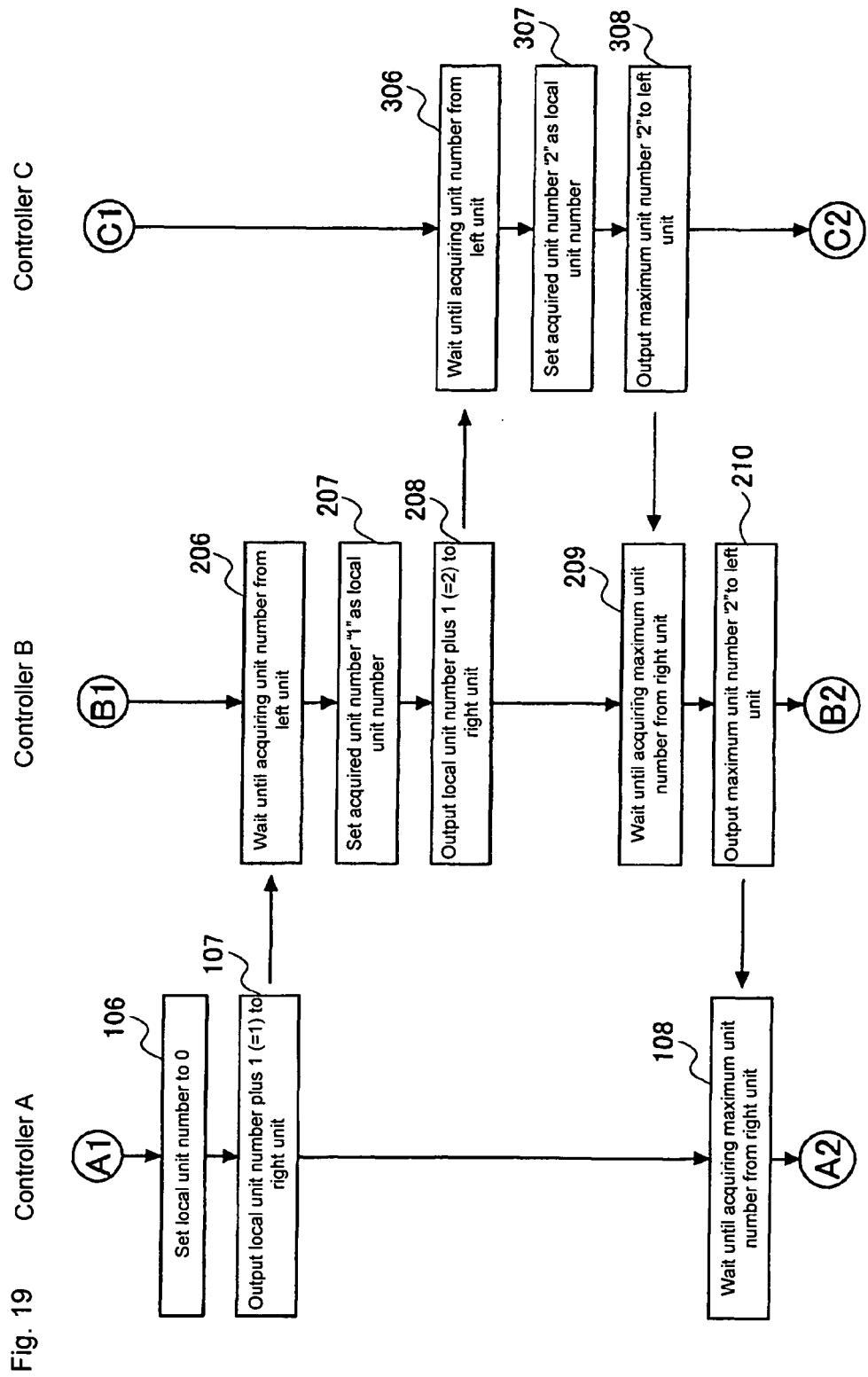
FIG. 19 shows an operation flowchart of the sensing system A (No. 2).
Figure 20:
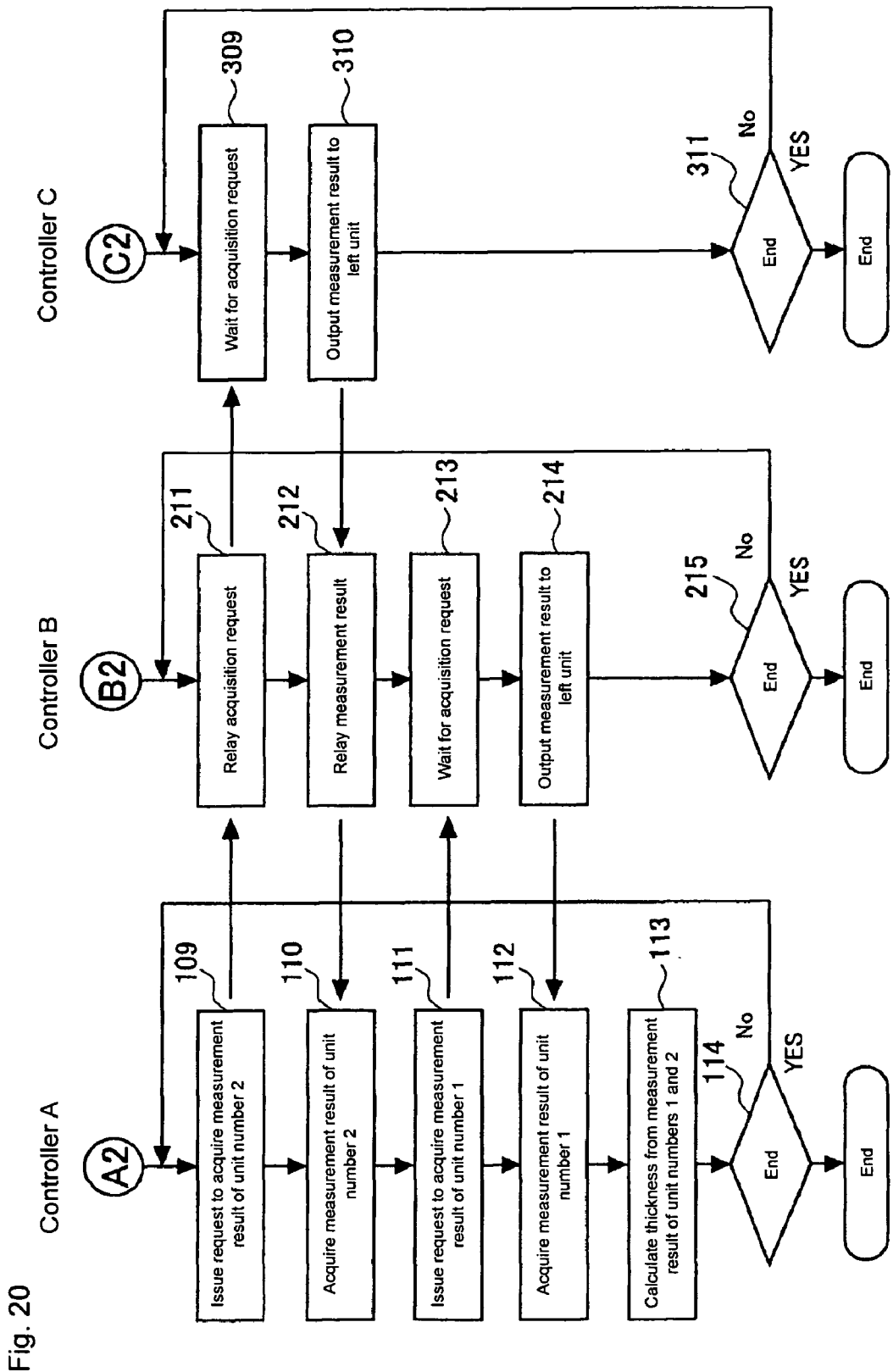
FIG. 20 shows an operation flowchart of the sensing system A (No. 3).

Next, the operation flowcharts (Nos. 1 to 3) of the sensing system A are shown in FIGS. 18 to 20, respectively. Once the process is started in FIG. 18, the controllers A to C confirm the presence or absence of the right unit (steps 101, 201, 301). Assuming that the sensing system A has the configuration shown in FIG. 16, the result of confirmation by both the controller A and the controller B is "right unit is present", while the confirmation result by the controller C is "right unit is absent".

Then, the presence or absence of the left unit is confirmed (steps 102, 202, 302). In similar fashion, assuming that the sensing system A has the configuration shown in FIG. 16, the confirmation result by the controller A is "left unit is absent", the confirmation result by the controller B is "left unit is present", and the confirmation result by the controller C is "left unit is present".

Then, the clock switching circuit is set (steps 103, 203, 303). In the process, the controller A sets the clock switching circuit to use the clock input from the right unit, and the controller B also sets the clock switching circuit to use the clock input from the right unit. The controller C, on the other hand, sets the clock switching circuit to use the oscillator of the local unit.

After that, the presence or absence and the type of the sensor head are confirmed (steps 104, 204, 304). In the process, the confirmation result by the controller A is "sensor head is absent", while the confirmation result by the controllers B and C is "sensor head is present".

Then, the measurement preparation setting process of is executed (steps 105, 205, 305). The measurement preparation setting process executed by the controller A is divided into (1) the process of setting the CPU program parameter for arithmetic operation using the two measurement results, and (2) the process of setting the data path switching circuit to send out the measurement result input from the right unit to the CPU. The measurement preparation setting process executed by the controller B, on the other hand, is divided into (1) the process of setting the CPU program parameter and the arithmetic operation circuit parameter in accordance with the type of the sensor head, (2) the process of setting the distance measurement, and (3) the process of setting the data path switching circuit into (a) the arithmetic operation circuit for the data input from the sensor head, (b) the left unit for the measurement result output from the CPU, and (c) the left unit for the measurement result input from the right unit. The measurement preparation setting process executed by the controller C, on the other hand, is divided into (1) the process of setting the CPU program parameter and the arithmetic operation circuit parameter in accordance with the type of the sensor head, (2) the process of setting the distance measurement, and (3) the process of setting the data path switching circuit into (a) the arithmetic operation circuit for the data input from the sensor head and (b) the left unit for the measurement result output from the CPU.

Turning to FIG. 19, upon completion of the measurement preparation setting process (steps 105, 205, 305) for the controllers A to C, the process of assigning the unit number to each of the controllers A to C by appropriate communication between the controllers A, B, C.

First, in the controller A, the unit number of itself is set to 0 (step 106). Then, the number equal to the unit number of itself plus 1 (=1) is output to the right unit (step 107). The controller A waits until the unit number is acquired from the left unit (step 206). In the case where the unit number is acquired from the left unit while waiting, the acquired unit number "1" is set as unit number of itself in this case (step 207). Then, the number equal to the unit number of itself plus 1 (=2) is output to the right unit (step 208). The controller C waits until the unit number is acquired from the left unit (step 306). In the case where the unit number is acquired from the left unit while waiting, the acquired unit number "2" is set as the unit number of itself in this case (step 307).

Then, the maximum unit number "2" is output to the left unit (step 308). The controller B waits until the maximum unit number is acquired from the right unit (step 209). In the case where the maximum unit number is acquired from the right unit while waiting, the maximum unit number "2" is output to the left unit (step 210). The controller A waits until the maximum unit number is acquired from the right unit (step 108).

As the result of execution of the aforementioned process, the unit numbers of the controllers A, B, C themselves are set in the controllers A, B, C, respectively. At the same time, the controllers A, B, C can be informed of the maximum unit number making up the system.

Turning to FIG. 20, assume that the controllers A, B, C complete the execution of the process of setting the clock switching circuit, the process of confirming the type and the presence or absence of the sensor head, the process of setting the measurement preparation and the process of determining the unit number as described above. Then, the measurement operation is performed by mutual collaboration between the three controllers A to C.

Specifically, the controller A requests the controller B to acquire the measurement result of the unit number "2" (step 109). The controller B relays the acquisition request from the controller A to the controller C (step 211). The controller C, after receipt of the acquisition request (step 309), outputs the measurement result of the local unit to the controller B providing the left unit (step 310). Then, the controller B relays the measurement result from the controller C to the controller A (step 212). The controller A acquires the measurement result of the unit number "2" (step 110).

Then, the controller A issues a request to the controller B to acquire the measurement result of the unit number "1" (step 111). The controller B, upon receipt of the acquisition request (step 213), outputs the measurement result to the controller A providing the left unit (step 214). The controller A then acquires the measurement result of the unit number 1 (step 112). The controller A further calculates the thickness from the measurement result of the unit numbers "1" and "2" (step 113). This series of process is repeated until a predetermined completion command is issued (steps 114, 215, 311).

By executing the flowchart of FIG. 19 as described above, the controller C sets the clock switching circuit to use the oscillator of the local unit, and the controllers A, B set the clock switching circuit to use the clock input from the right unit. Specifically, the FPGA of all the controllers operate using the clock signal output from the oscillator of the controller C. As a result, the synchronous communication between the FPGA of each controller is facilitated. In addition, in view of the fact that the clock signal for communication is synchronized also with the clock signal of the internal circuits such as the arithmetic operation circuit programmed in the FPGA, the sensing data can be efficiently input to and output from the internal circuits of the FPGA.

In this sensing system, by changing the oscillation frequency of the oscillator of the controller supplying the clock signal to all the controllers, the clock frequency of the FPGA of the whole system can be changed. Specifically, the clock frequency of the system can be changed by making adjustable the frequency of the oscillator of the controller supplying the clock signal. As an alternative, the controller supplying the clock signal is replaced by a controller having an oscillator of a different oscillation frequency. For example, the controller C of the sensing system A is replaced with a controller having an oscillator of higher oscillation frequency. In this way, the processing speed of the whole system can be improved.

Figure 21:
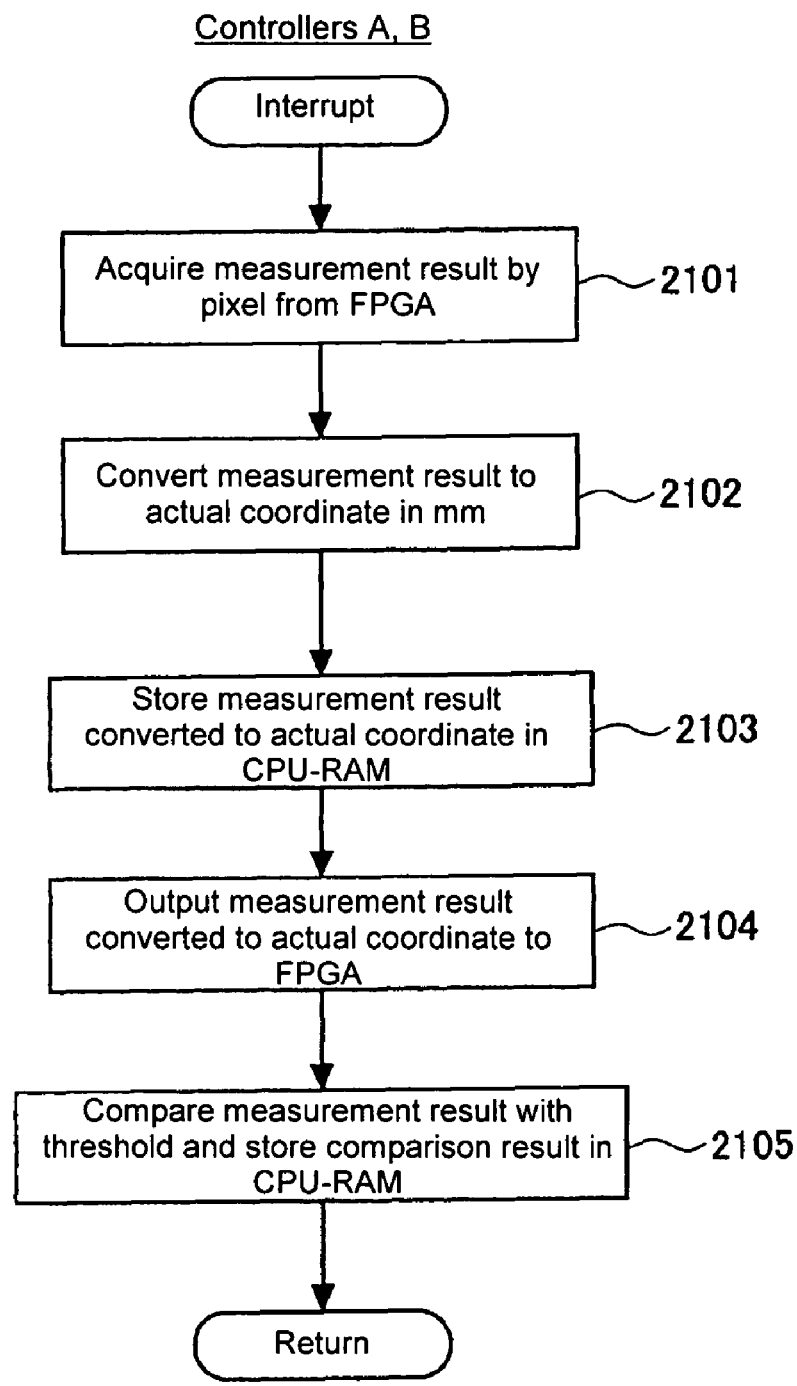
FIG. 21 shows a flowchart of the sensing process of the CPU.

The flowchart of the sensing process by the CPU is shown in FIG. 21. The FPGA 130 acquires the image data periodically from the sensor head 2 and performs the arithmetic operation. The FPGA 130, upon complete arithmetic operation for one screen, stores the result thereof in a register and interrupts the CPU 141. In response to this interrupt, the CPU 141 starts the operation shown in the flowchart of FIG. 21.

Once the process of FIG. 21 is started, the CPU 141 acquires the measurement result expressed for each pixel from the FPGA 130 (step 2101). The CPU 141 converts the measurement result to an actual coordinate on the order of mm (step 2102). The CPU 141 then stores the measurement result converted into the actual coordinate in the CPU-RAM 144 (step 2103). Then, the CPU 141 outputs the measurement result converted to the actual coordinate to the FPGA 130 (step 2104). In the step of outputting the measurement result converted to the actual coordinate to the FPGA 130, an instruction is given, if necessary, to the data path switching circuit 132 so that the measurement result converted to the actual coordinate may be transmitted toward an appropriate unit connector, i.e. other sensor controllers connected. Then, the CPU 141 compares the measurement result stored in the CPU-RAM 144 with a threshold value, and stores the result of comparison in the CPU-RAM 144 (step 2105).

The measurement result and the comparison result stored in the CPU-RAM 144, if requested from an external device, are output from any one of the interfaces through the input/output interface circuit block 150. Even in the absence of a request from an external device, the measurement result and the comparison result may be output periodically or constantly.

FIGS. 22 to 27 show the data flow (Nos. 1 to 6). To realize this data flow, the data path switching circuit 132 is set in response to an instruction from the CPU 141. This setting is changed with time, if required.

Figure 22:
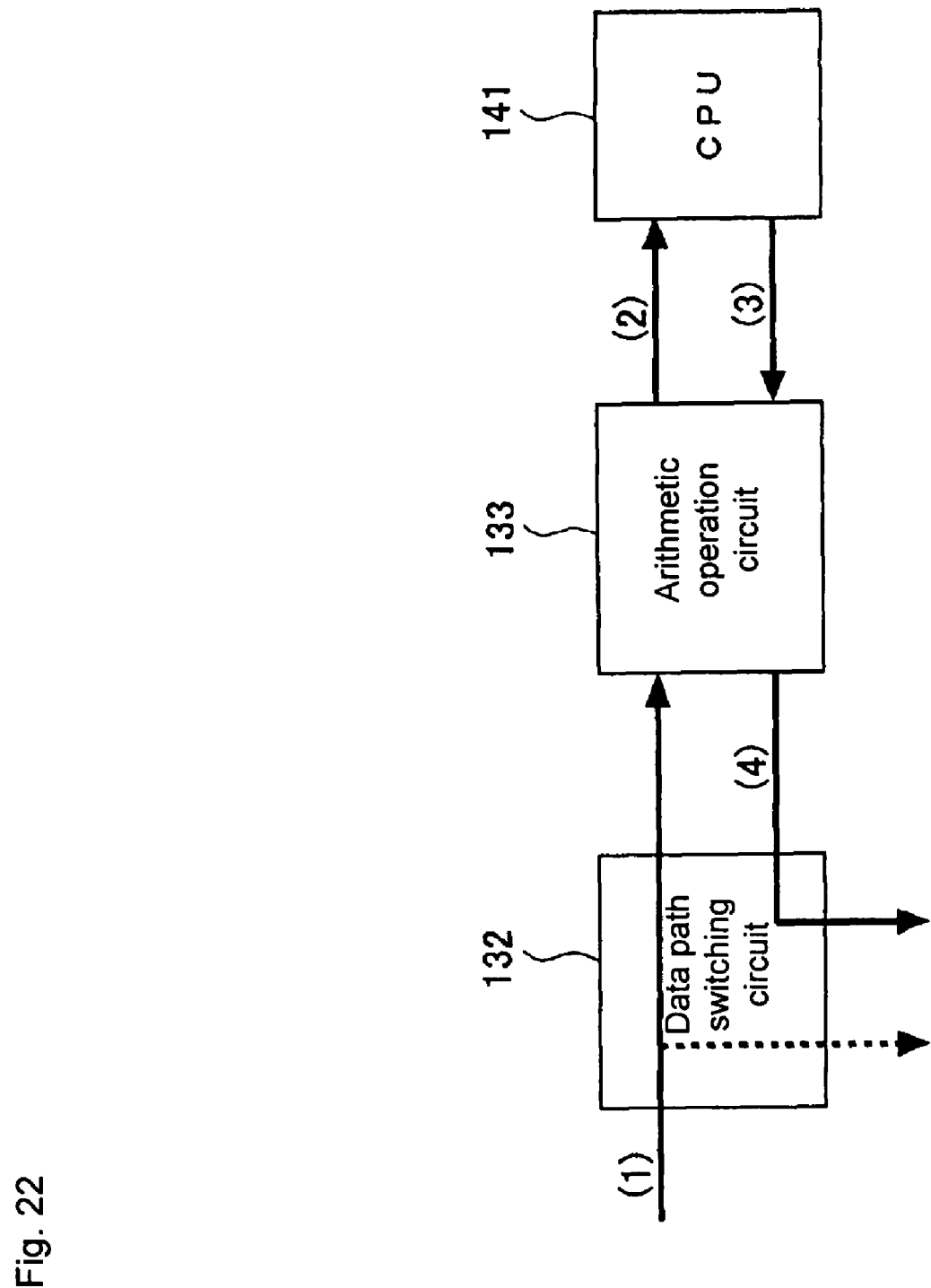
FIG. 22 shows the data flow (No. 1).

The data flow (No. 1) is shown in FIG. 22. In FIG. 22, the Arabic numerals in parentheses indicate the order in which the data is sent. In FIG. 22, the data (2) is the result of the arithmetic operation performed by the arithmetic operation circuit 133 on the data (1) input from the sensor head I/F circuit 110. The data (3) is the result of the arithmetic operation performed by the CPU 141 on the data (2). The data (4), on the other hand, is the result of the data (3) being passed through the arithmetic operation circuit 133 and output to the unit connector (left) 18b.

The data flow (No. 1) shown in FIG. 22 corresponds to the data flow, in the controller C of the sensing system A, of the sensing data output from the sensor head connected to the controller C. This is also the case with the controller B. As indicated by dashed line in FIG. 22, the sensing data output from the sensor head can be branched and sent simultaneously to other controllers. This corresponds to the data flow in the controller A of the sensing system B shown in FIG. 29 described later. Incidentally, the communication between CPUs can be utilized in place of the data (3) and data (4).

Figure 23:
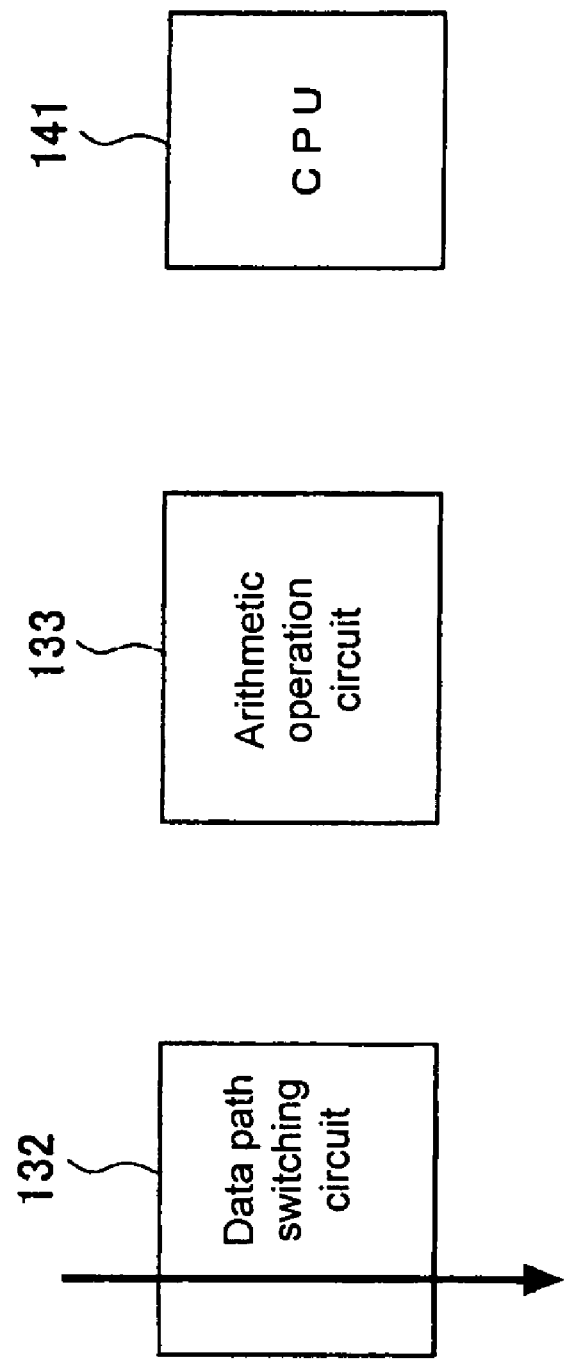
FIG. 23 shows the data flow (No. 2).

The data flow (No. 2) is shown in FIG. 23. The data flow (No. 2) shown in FIG. 23 corresponds to the case in which the controller B. of the sensing system A relays the sensing data representing the result of the arithmetic operation output from the controller C to the controller A.

Figure 24:
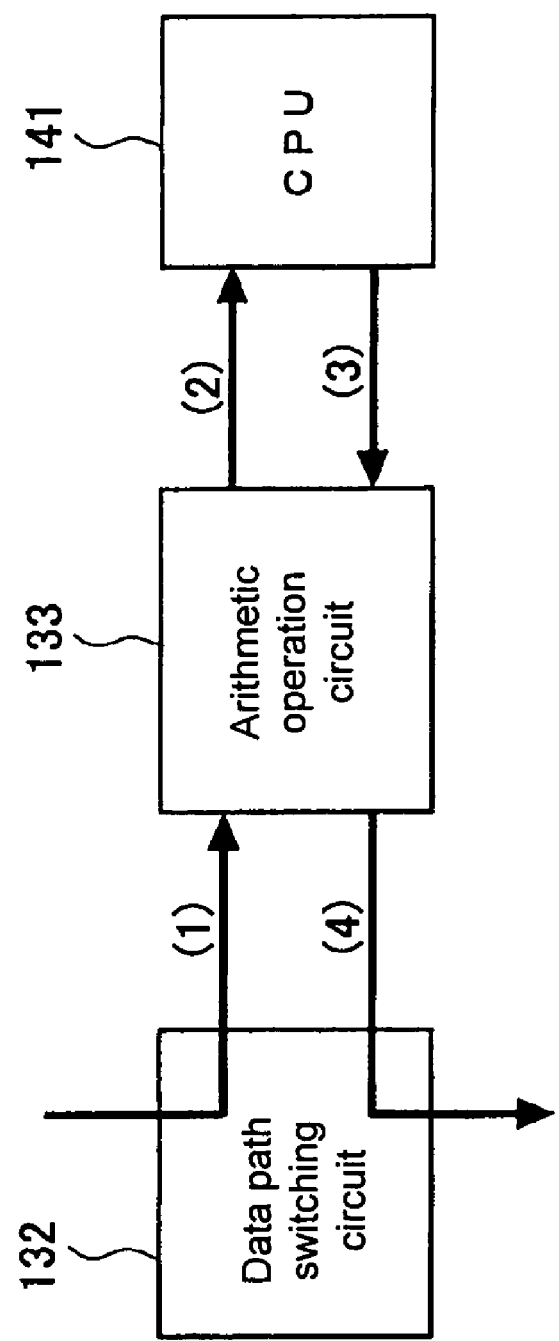
FIG. 24 shows the data flow (No. 3).

The data flow (No. 3) is shown in FIG. 24. This data flow (No. 3) corresponds to the data flow in the controller B of the sensing system B in FIG. 29 described later. The data (1) is the sensing data from other sensor controllers connected thereto. In the case of the controller B shown in FIG. 29, for example, the data (1) is the sensing data output from the sensor head connected to the controller C. The subsequent data flow is similar to that shown in FIG. 22.

Figure 25:
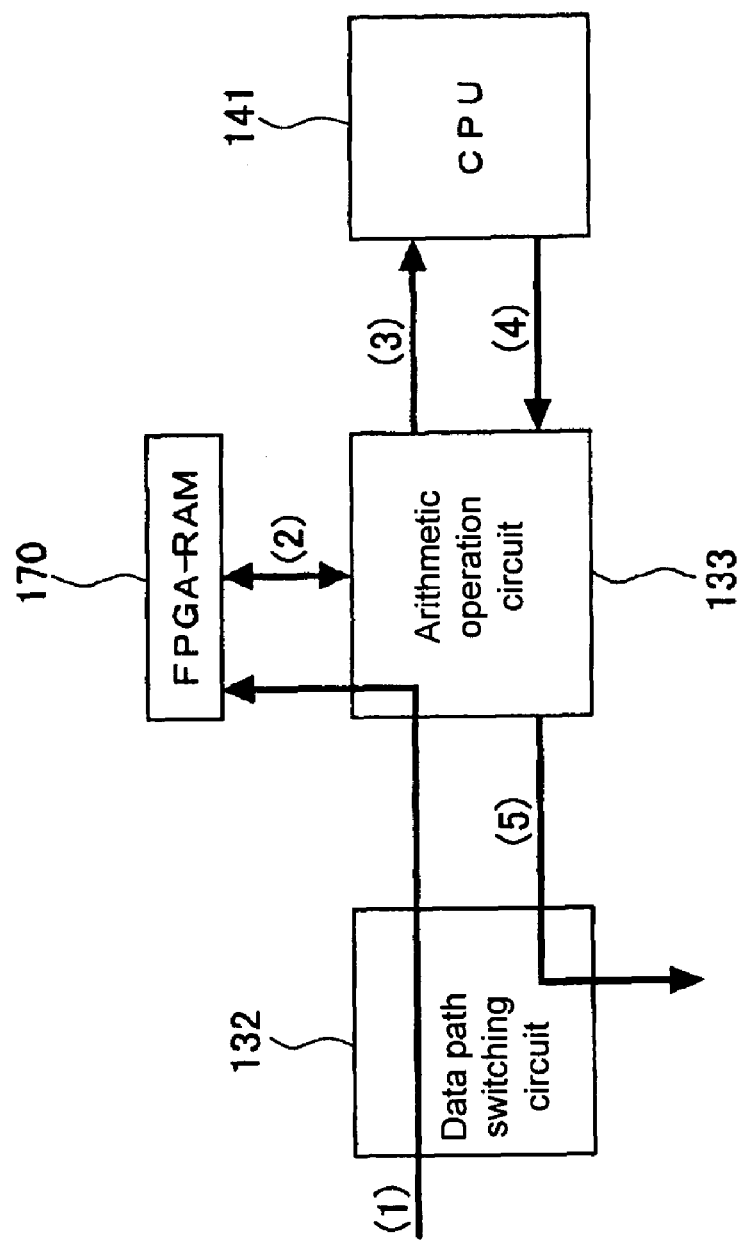
FIG. 25 shows the data flow (No. 4).

The data flow (No. 4) is shown in FIG. 25. In this data flow (4), the sensing data input to the arithmetic operation circuit 133 is temporarily stored in the FPGA-RAM 170, and the arithmetic operation is performed in the arithmetic operation circuit 133 using the data thus stored. The other configuration is similar to that shown in FIG. 22.

Figure 26:
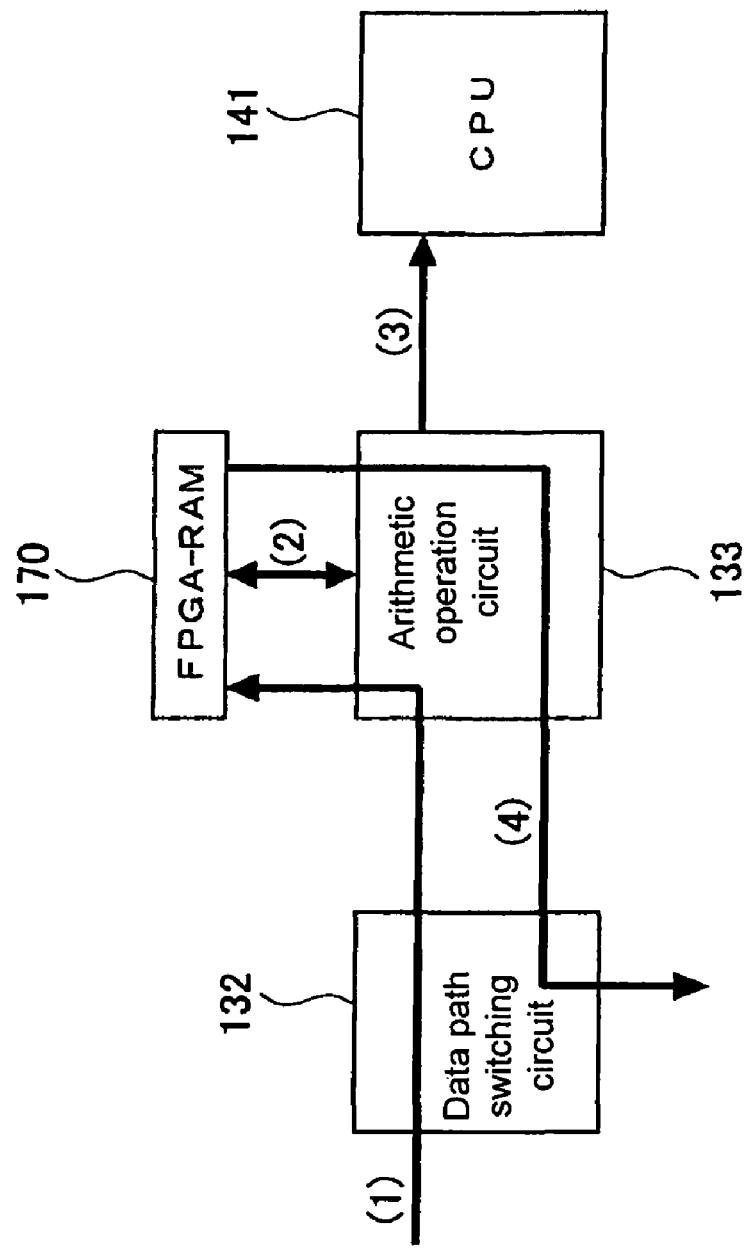
FIG. 26 shows the data flow (No. 5).

The data flow (No. 5) is shown in FIG. 26. This data flow (5), like in FIG. 25, is such that the arithmetic operation is executed using the data stored in the FPGA-RAM 170, after which the result of the arithmetic operation is stored in the FPGA-RAM 170. The result of the arithmetic operation is also sent to the CPU 141. The result of the arithmetic operation stored in the FPGA-RAM 170 is the image data, for example, and the result of the arithmetic operation sent to the CPU 141 the feature amount. In this way, the result of the two arithmetic operations may be different from each other. The result of the arithmetic operation stored in the FPGA-RAM 170 is sent out toward other sensor controllers.

Figure 27:
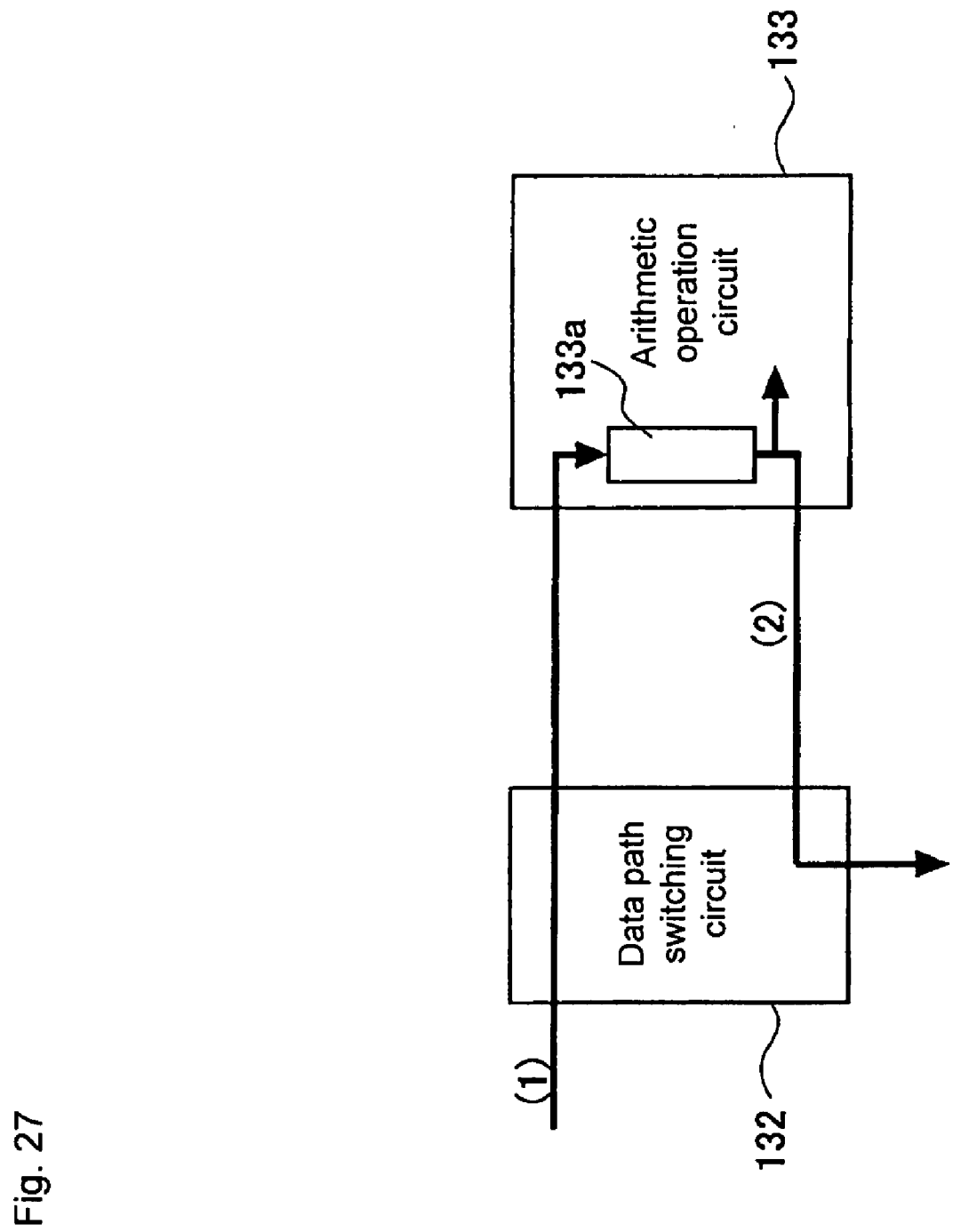
FIG. 27 shows the data flow (No. 6).

The data flow (No. 6) is shown in FIG. 27. This data flow (No. 6) is such that the sensing data input to the arithmetic operation circuit 133 (though from the sensor head in FIG. 27, may be from other sensor controllers) are output after being processed in pipeline by a pipeline processing circuit 133a. The result of the pipeline processing may be used also in other processes executed by the arithmetic operation circuit 133. By pipeline processing of different contents by a plurality of sensor controllers, for example, a complicated image processing can be executed in real time. The input to and output from the arithmetic operation circuit 133 are realized at the same time through the data path switching circuit 132, and therefore another data path switching circuit 132 shown in FIG. 11 is required. In the case of the sensor controller exclusively used for pipeline operation, however, one data path switching circuit is used exclusively for input to the arithmetic operation circuit, and the other data path switching circuit is used exclusively for the output from the arithmetic operation circuit. Thus, each data path switching circuit can be simplified to the required wiring alone.

Figure 28:
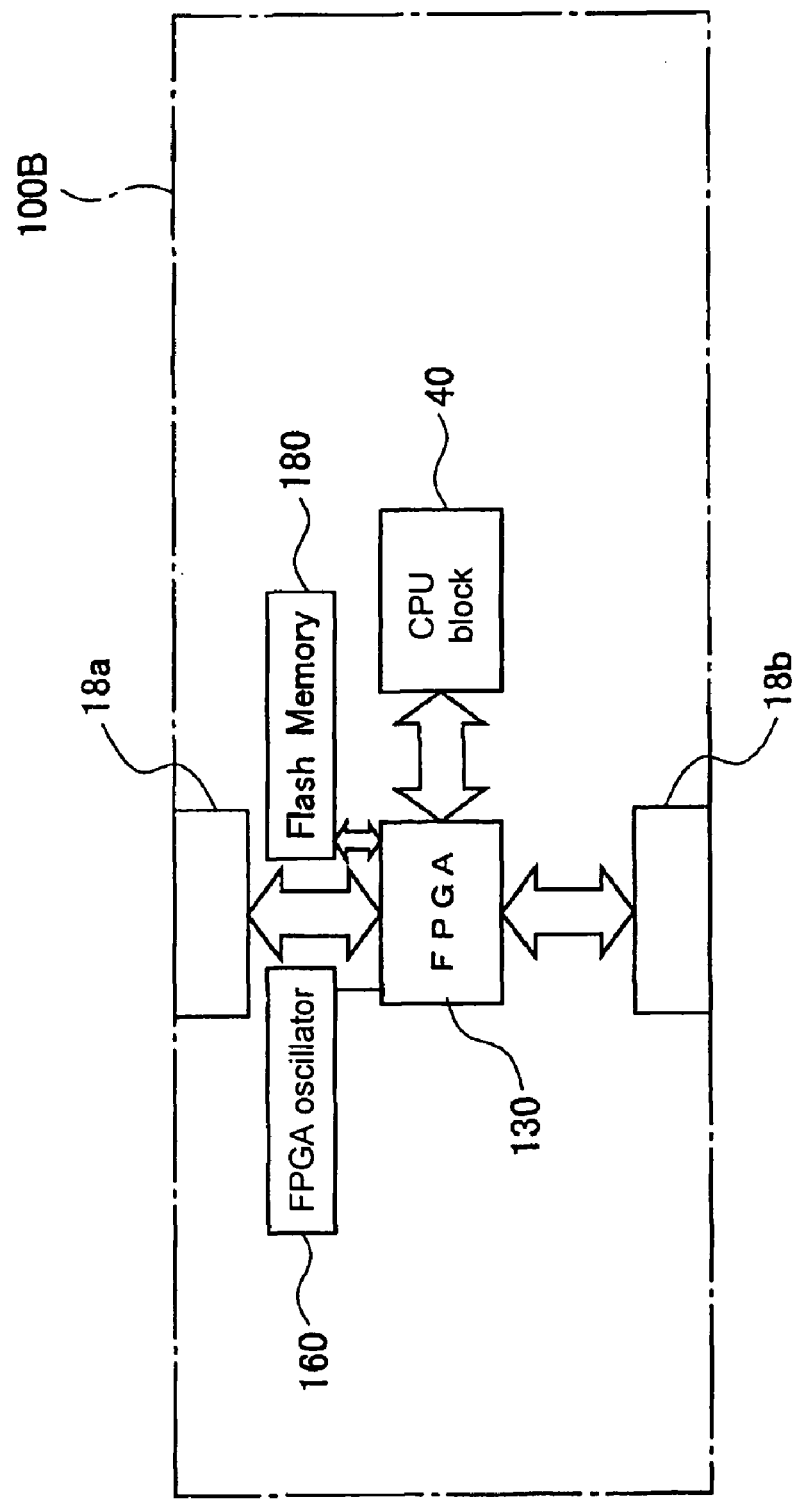
FIG. 28 shows a block diagram showing the internal configuration of a sensor controller (extension memory unit).

Next, the internal configuration of the sensor controller (extension memory unit) is shown in the block diagram of FIG. 28. As shown in FIG. 28, the sensor controller (extension memory unit) 100B includes a flash memory 180 connected to the FPGA 130. The sensor head interface circuit or the input/output interface circuit block is not included in this sensor controller. In this sensor controller 100B, the sensing data input from other sensor controllers is stored in the flash memory 170, and the data thus stored are adapted to be output to other sensor controllers. In other words, this sensor controller can be used as a data logger.

Figure 29:
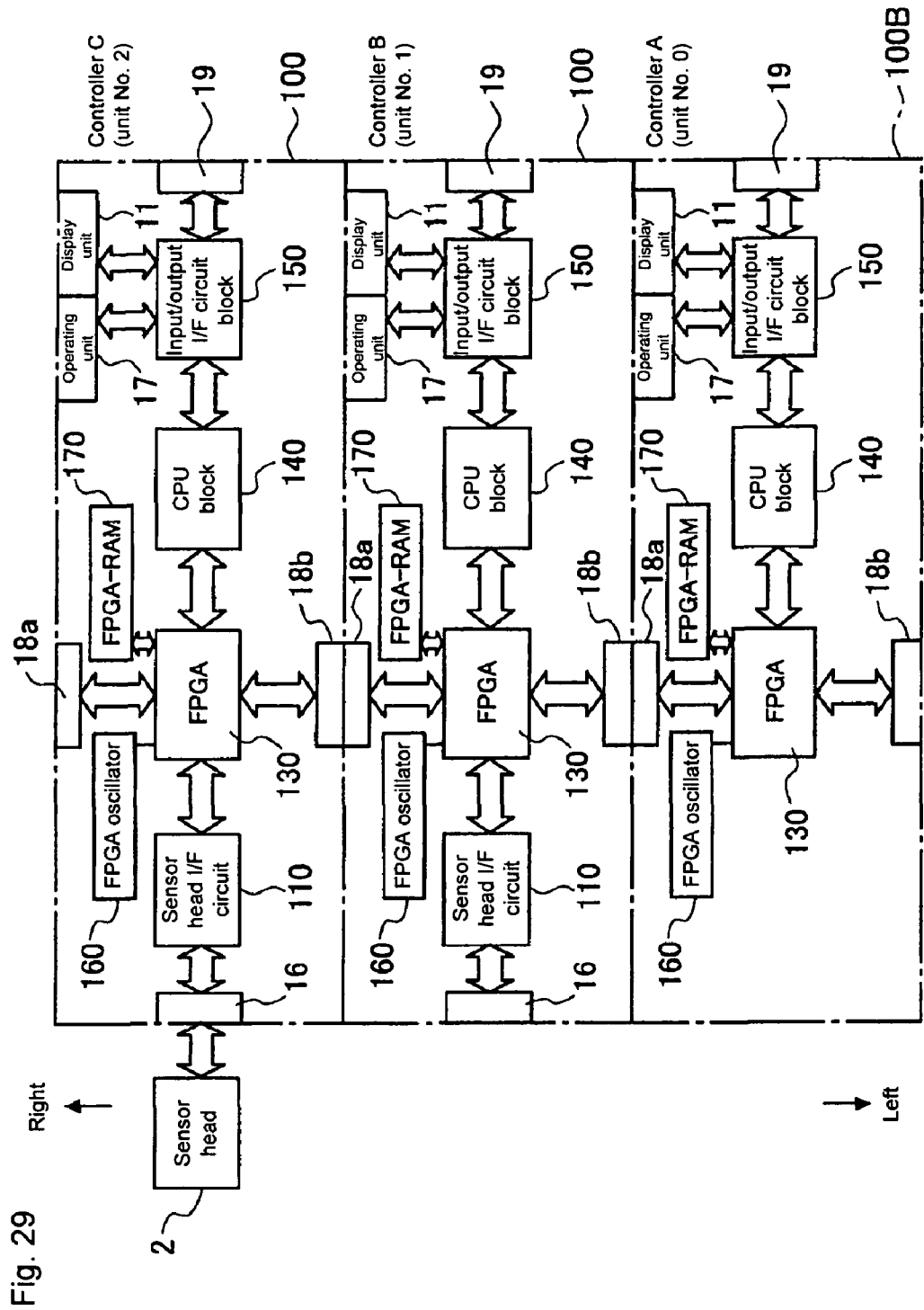
FIG. 29 shows a diagram showing the configuration of a sensing system B.

The configuration of the sensing system B according to another embodiment is shown in FIG. 29. The sensing system B is intended to measure the thickness of a transparent plate, and like in the sensing system A, the sensor head 2 is connected only to the controller C.

Figure 30:
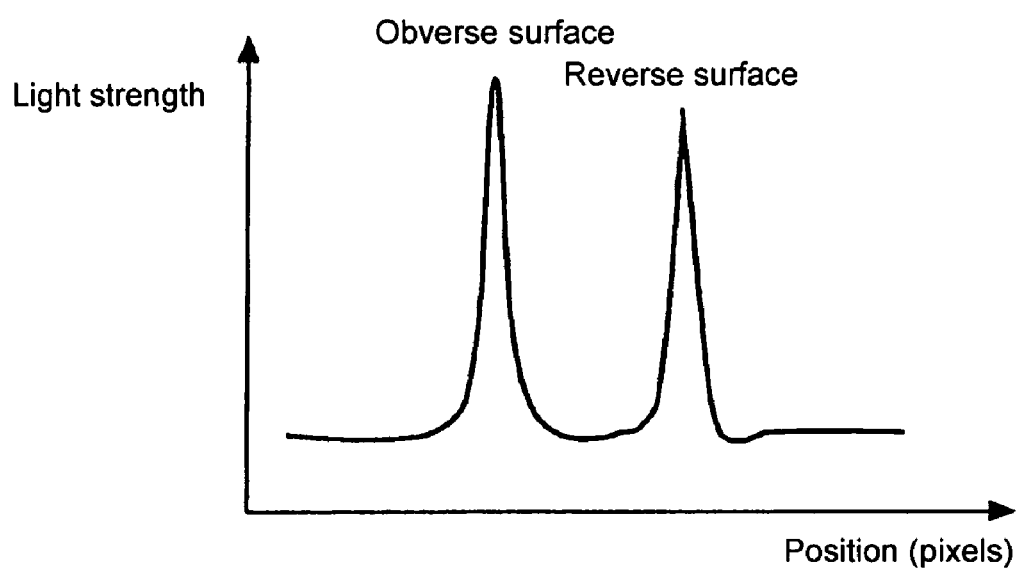
FIG. 30 shows a graph showing the light strength distribution obtained on the horizontal scanning line of an image pickup device.

The light strength distribution obtained on the horizontal scanning line of an image pickup device is shown in FIG. 30. The image pickup device of the sensor head can produce the peak of the light strength distribution of the light reflected from the obverse surface (the surface having the sensor head) of the transparent plate and the peak of the light strength distribution of the light reflected from the reverse surface of the transparent plate.

In the sensing system B, the data path switching circuit 132 of the controller C branches the sensing data from the sensor head 2 and sends them to the arithmetic operation circuit of the controller C on the one hand and the controller B on the other hand. The controller C measures the distance of the first peak in the ascending order of distance, i.e. the peak corresponding to the obverse surface. The controller B measures the distance of the second peak in the ascending order of distance, i.e. the peak corresponding to the reverse surface. The controller A acquires the measurement result from the controllers B, C, and determines the thickness of the transparent plate from the difference between the measurement values. The correcting operation taking the refractive index of the transparent plate into consideration is also performed.

Figure 31:
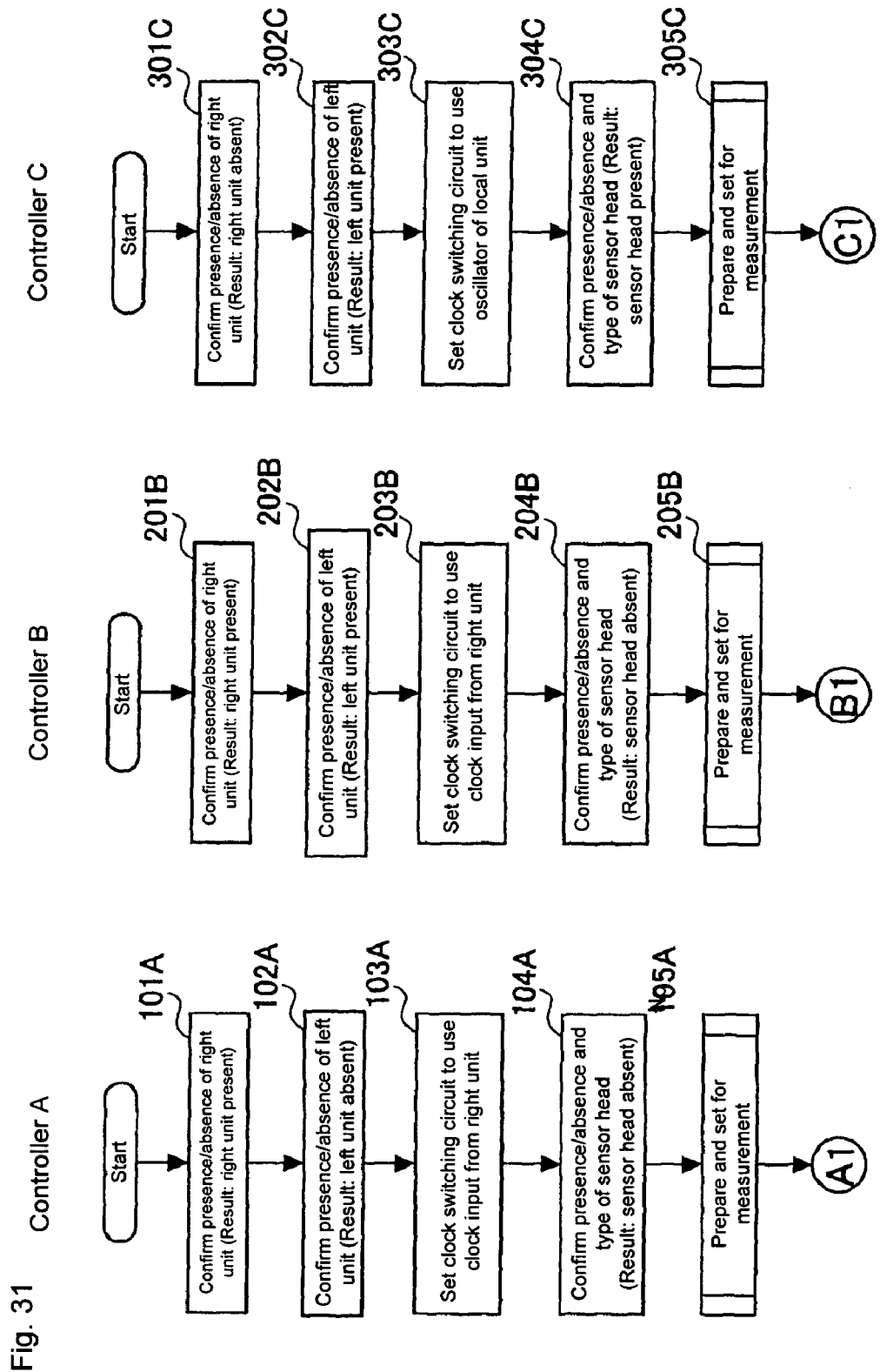
FIG. 31 shows an operation flowchart (No. 1) of the sensing system B.

The operation flowchart (No. 1) of the sensing system B is shown in FIG. 31. The flowcharts (Nos. 2, 3) are similar to the flowcharts shown in FIGS. 19, 20. The difference from FIG. 18 is only in the measurement preparation setting process in the controllers B, C (steps 205B, 305C).

Specifically, the measurement preparation setting process of the controller B (step 205B) includes (1) the process of setting the CPU program parameter and the arithmetic operation circuit parameter in accordance with the type of the sensor head connected to the controller C, (2) the process of setting the distance measurement to the reverse surface, and (3) the process of setting the data path switching circuit to transfer (a) the data input from the right unit to the arithmetic operation circuit, (b) the measurement result output from the CPU to the left unit, and (c) the measurement result input from the right unit to the left unit.

Also, the measurement preparation setting process of the controller C (step 305C) includes (1) the process of setting the CPU program parameter and the arithmetic operation circuit parameter in accordance with the type of the sensor head, (2) the process of setting the distance measurement to the obverse surface, and (3) the process of setting the data path switching circuit to transfer (a) the data input from the sensor head to the arithmetic operation circuit and the left unit, and (b) the measurement result output from the CPU to the left unit.

Figure 32:
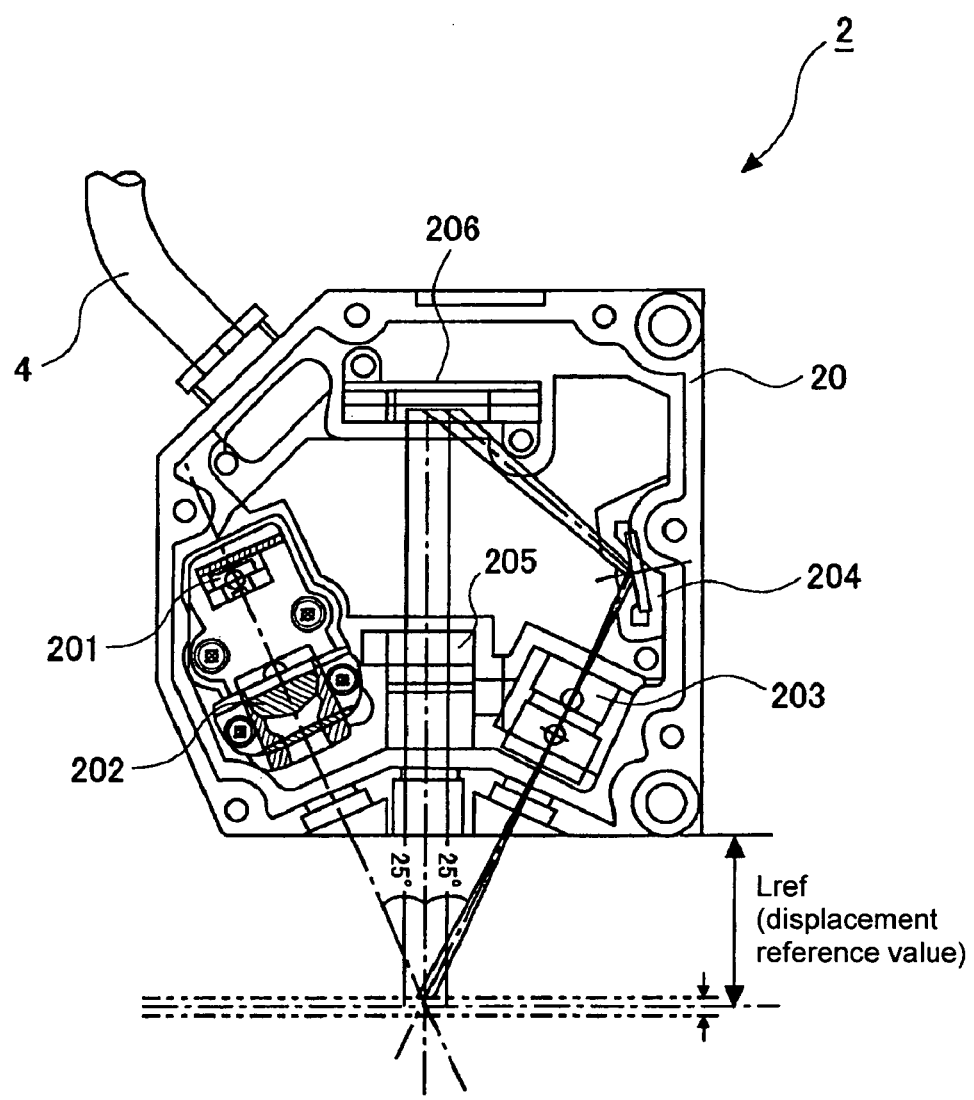
FIG. 32 shows a diagram showing the structure of the sensor head having both the functions of a displacement sensor and a visual sensor.

Next, the structure of the sensor head having the functions of both the displacement sensor and the visual sensor at the same time is shown in FIG. 32. This sensor head can be used for the sensing system B. FIG. 32 shows the interior of the sensor head unit with the side of the case thereof open. In FIG. 32, numeral 201 designates a red laser diode device making up a measurement light source, numeral 202 a lens assembly making up a measurement projection light optical system, numeral 203 a lens assembly making up a perspective image acquisition optical system to acquire an image as viewed diagonally of the measurement position including the peripheral areas on the measurement object, numeral 204 a mirror to bend the optical axis of the lens assembly 203, numeral 205 a lens assembly making up a normal image acquisition optical system to acquire an image, as viewed from the front side, of the measurement position with the peripheral area on the measurement object, and numeral 206 a two-dimensional CCD device making up an image pickup means to generate a video signal corresponding to each image by electrooptic conversion of a diagonal image acquired through the perspective image acquisition optical system and a front image acquired through the normal image acquisition optical system.

In the sensor head 2, the laser light radiation image for length measurement along a light path through the lens assembly 203 is obtained when the laser is turned on and a normal image of the peripheral area of the measurement point along a light path through the lens assembly 205 when the laser is turned off. The normal image is obtained by the same image processing as the image taken by an ordinary camera in which the mark positions on the object are specified. This sensor head outputs the length measurement image and the normal image alternately. The length measurement image data is arithmetically processed in the controller C of the sensing system B, while the normal image for specifying the mark position is arithmetically processed in the controller B. Assuming that the surface of the object is substantially flat, the controller A can specify the three-dimensional coordinate of the mark position.

In the sensing system A, the three-dimensional coordinate of the mark position can be measured similarly by connecting the displacement sensor to the controller C and the camera to the controller B.

As another application of the sensing system B, the camera is connected as a sensing head to conduct different image processing between the controllers B and C. In the case where the picked-up image includes both a character and a bar code, for example, the character is identified by the controller C and the bar code decoded by the controller B.

As still another application of the sensing system B, the controller B can execute the arithmetic process using both the sensing data from the sensor head and the sensing data resulting from the process in the controller C. In this case, the result of the arithmetic operation of the controller C is not simply relayed by the controller B but input to the arithmetic operation circuit of the controller B. In the case where a camera is connected as a sensor head and a bar code is included in the image picked up, for example, the bar code position and the rotational angle are calculated as soon as the image is completely input using the pipeline process. in the controller C, and the result of this process is immediately sent to the controller B. The controller B acquires the information including the bar code position and the rotational angle immediately after complete image input, and therefore can immediately start decoding the bar code using this information.

In the sensing system A, the controller B can be added to increase the points of object to be sensed. For example, the distances of five points including the four corners and the center of a rectangular tabular object are measured at the same time, and from the result of measurement, the flatness of the object can be calculated in the controller A.

The sensor head connected to the sensor controller is not limited to a two-dimensional image pickup device, but a sensor having a one-dimensional image pickup device or a sensor to output an analog signal (or an analog signal converted to a digital signal) can be employed widely.

The sensor controller according to an embodiment is explained above on the assumption that the contents of the circuit programmed in the FPGA are determined. For using the sensor controller in the sensing operation actually, however, the contents of the FPGA circuit are required to be determined as in this case.

Also, a unit having the internal configuration as shown in FIGS. 4, 15 or 28 of which the circuit contents programmed in the FPGA have yet to be determined constitutes an embodiment of the invention. This unit is what may be called a platform product of a sensor controller. The platform product can be used by the maker thereof to produce a sensor controller in which the circuit contents programmed in the FPGA are determined on the one hand and can be distributed as it is on the other hand. In this case, the circuit contents programmed in the FPGA are determined by the user conducting the sensing operation, a provider to construct a sensing system for the user, or a manufacturer of the device in which the sensor controller is built in. The FPGA circuit data determined or selected by these parties other than the maker of the platform product can be supplied by the maker or developed by a third party.

The inter-unit path of the sensor controller according to the invention can be configured as a through bus line connecting the left and right unit connectors directly to each other, and a programmable logic circuit may be connected to this bus line. As explained as an embodiment above, the advantages described below are obtained by dividing the inter-unit path into a path between a programmable logic circuit and one unit connector and a path between a programmable logic circuit and the other unit connector.

Specifically, in the case where the inter-unit path is configured as a through bus line, a single common bus line is formed for the whole sensing system connected with a plurality of sensor controllers. In the case where the inter-unit path is divided by a programmable logic circuit, on the other hand, two sides of a sensor controller can transmit the data of different contents. For example, a plurality of sensor controllers can be connected for multiple stages of pipeline processing. Not only that, by connecting the inter-unit paths on both sides in the programmable logic circuit as required, a through bus line can be formed to transmit data without time delay between sensor controllers not adjacent to each other. In this way, the configuration in which the inter-unit path is divided by a programmable logic circuit in the sensor controller brings about the versatility of the sensing system.

The versatility of the sensing system is derived also from the fact that a CPU as well as the programmable logic circuit is built in the sensor controller. The built-in CPU makes it easy to change the functions of the sensing system and each sensor controller in accordance with specific operating conditions. Especially, the sensor controller according to the embodiment shown in FIG. 4 which can be connected with a sensor head and has an electrical interface (external connection cord, external I/F connector) with an external device and an interface (operating unit, display unit) with the human being has so high a versatility as to be usable as an independent sensor unit without connecting to the other sensor controllers.

The platform product according to an embodiment of the invention has another feature that it can be used in combination with the sensor head of various configurations. Specific examples include an application in which the image data are processed with a sensor head having an image pickup device as a data source and an application in which the waveform data are processed using, as a data source, a sensor head having a physical quantity converter (a device such as a photodiode, PSD or detection coil with or without an amplifier or an oscillation circuit) for analog output. This platform product has the ability to transmit image data between units. In the case where multi-valued data digitized from an analog data is handled, therefore, the waveform data constituting a time series mass of multi-valued data over a given time range can be transmitted collectively between the units.

Figure 33:
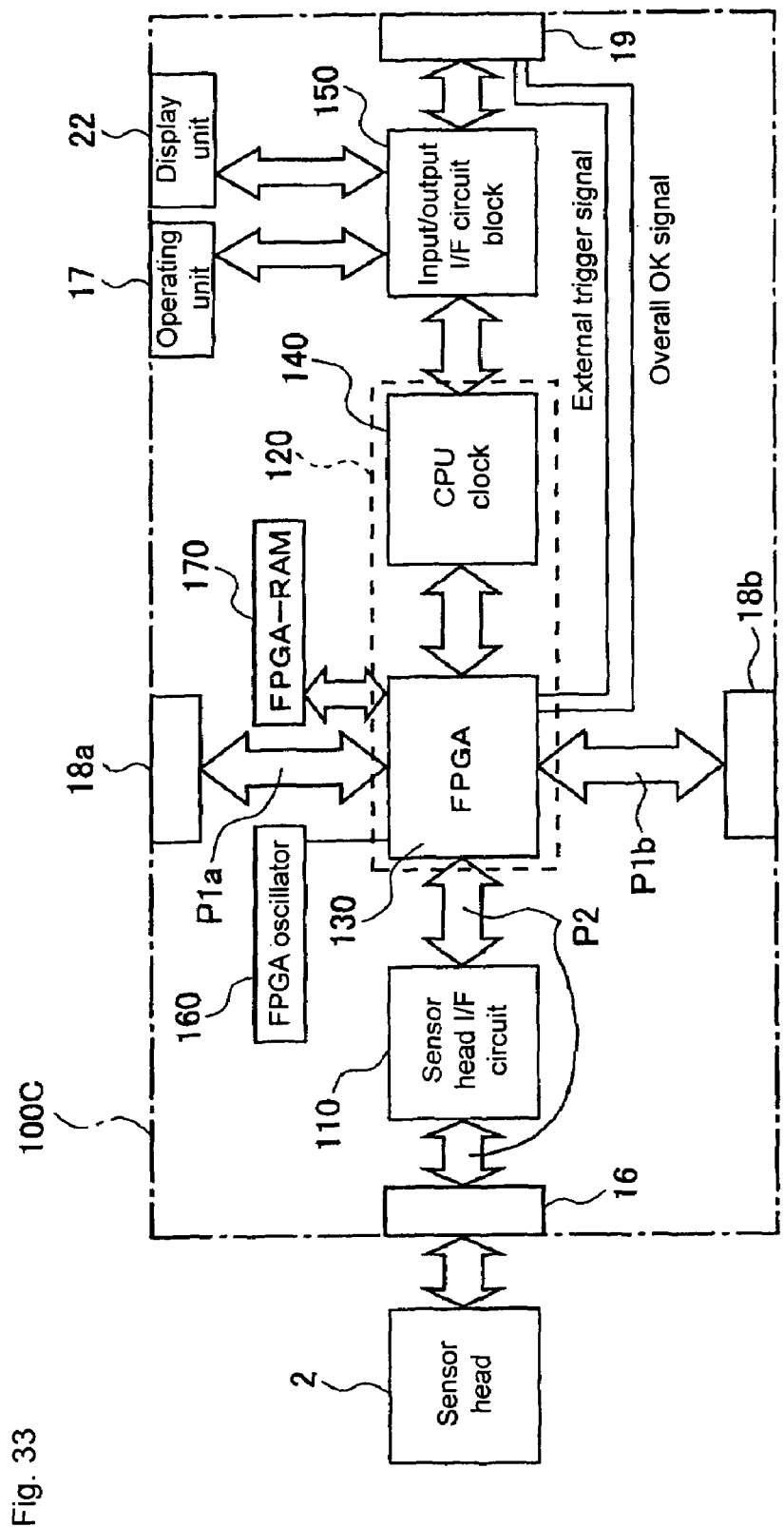
FIG. 33 shows a block diagram showing the internal configuration of a sensor controller circuit.

Next, the internal configuration of the sensor controller circuit according to another embodiment is shown in the block diagram of FIG. 33. This sensor controller circuit 100C, in addition to the component parts of the sensor controller circuit 100 shown in FIG. 4, includes an external trigger signal line to transmit an external trigger signal from the external I/F connector 19 to the FPGA 130 and an overall OK signal line to transmit an overall OK signal (overall determination signal) to the external I/F connector 19 from the FPGA 130. Two of the parallel signal lines included in the external connection cord 3 are used to transmit and receive the external trigger signal and the overall OK signal to and from an external device. The sensor head 2 connected to the sensor controller is a camera having a two-dimensional image pickup device built therein. The display unit 11 includes a high-definition color liquid crystal display screen, and can display an image picked up by the sensor head 2 and an image processed appropriately. Also, the operation of setting the measurement conditions is facilitated by displaying the pattern or figure indicating the measurement range, etc. on the same screen.

Figure 34:
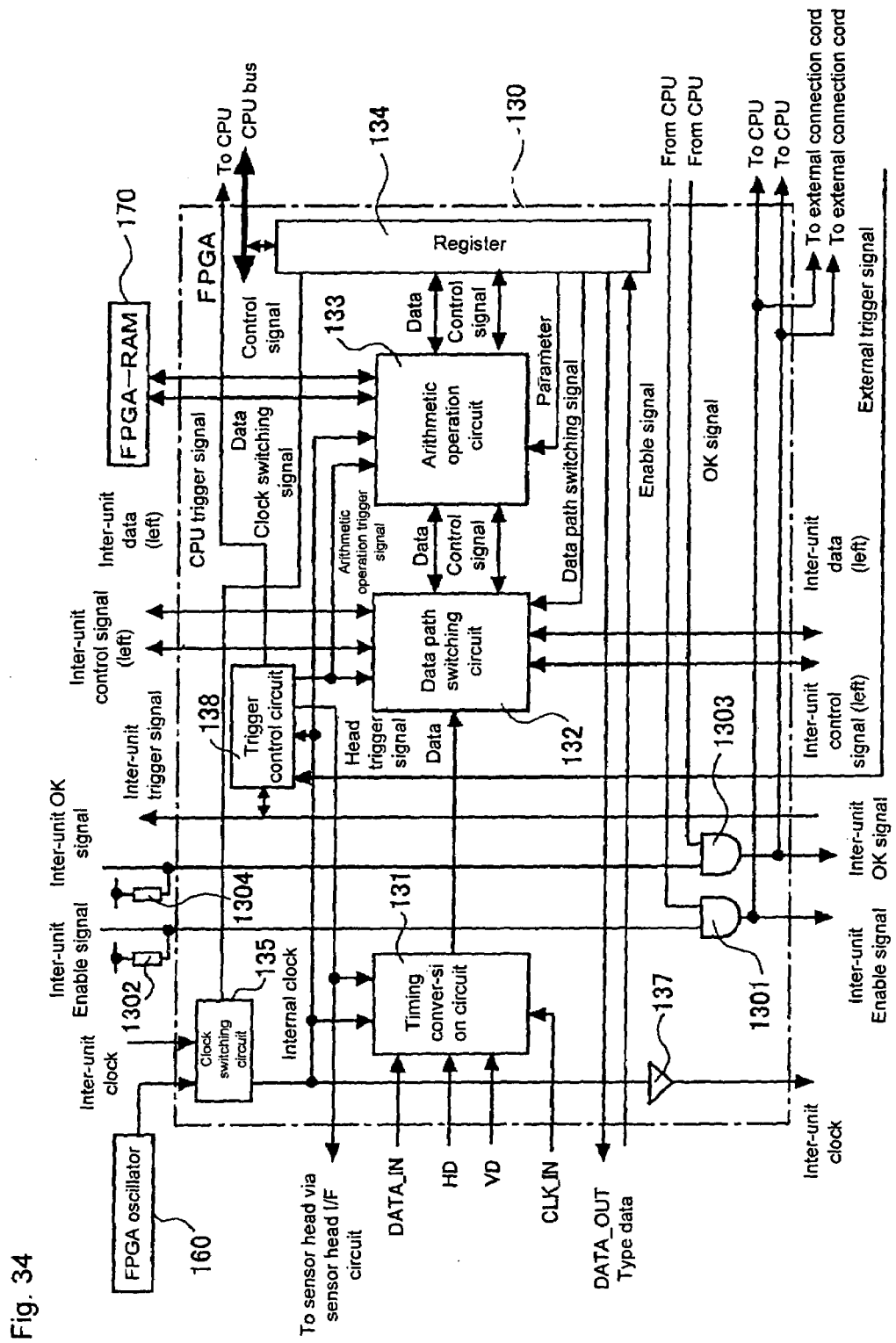
FIG. 34 shows a detailed block diagram showing the internal circuit of the FPGA.

The internal circuits of the FPGA 130 included in the sensor controller circuit 100C are shown in detail in the block diagram of FIG. 34. The internal circuits of the FPGA shown in FIG. 34 are different from the internal circuits of the FPGA shown in FIG. 9 in the following points.

The outputs of the LED (sensor LED control signal) and the LD_ON (laser control signal) to the sensor head are not included.

The timing generating circuit 136 is replaced with a trigger control circuit 138. Unlike the FPGA shown in FIG. 9 which performs the periodic sensing operation voluntarily, the FPGA shown in FIG. 34 performs the sensing operation based on the input of the trigger signal. The trigger signal input to the trigger control circuit 138 is of two types, an external trigger signal and an inter-unit trigger signal. The external trigger signal is applied from a source external to the sensor controller through the external connection cord 3. The inter-unit trigger signal line connects the first unit connector 18a and the second unit connector 18b. The inter-unit trigger signal is supplied from another sensor controller connected to one of the unit connectors. The trigger control circuit 138 selects one of the external trigger signal and the inter-unit trigger signal based on the setting (not shown) by the CPU through the register 134. The trigger control circuit 138 outputs several internal trigger signals based on the input of the selected trigger signal. The destinations of the internal trigger signals include the sensor head 2 (through the sensor head I/F circuit 110), the timing conversion circuit 131, the data path switching circuit 132, the arithmetic operation circuit 133 and the CPU 141. The internal trigger signal acts as an interrupt signal against the CPU 141. The timing at which these internal trigger signals are output is appropriately adjusted in such a manner as to make the sensing operation possible by the mutual cooperation of the circuit blocks. Also, a delay time can be set to start the sensing operation upon lapse of a predetermined delay time following the receipt of the external trigger signal.

The CPU 141, upon entering the process completion state after completion of the first sensing process, outputs an enable signal and an OK signal to the FPGA 130. For these signals, a through path is formed bypassing the register 134 to avoid the transmission time delay. The enable signal indicates a standby mode for the next sensing process upon completion of the preceding sensing process. The standby mode (enable mode) is indicated when the voltage level is high, while the in-process mode (busy mode) is indicated when the voltage level is low. The OK signal indicates that the determination result is in a specified state, i.e. in this embodiment, the determination result is a success. A success (OK) is indicated when the voltage level is high, while a failure (NG) is indicated when the voltage level is low. The state of the OK signal is maintained until the next sensing process is complete.

The AND gate circuit 1301 is supplied with the enable signal input to the FPGA 130 from the CPU 141 and the inter-unit enable signal (first completion signal) input to the FPGA 130 from the first unit connector 18a, and outputs the inter-unit enable signal (second completion signal) representing the result of the logic operation to the second unit connector 18b. The signal line of the inter-unit enable signal input from the first unit connector 18a is pulled up by a pull-up resistor 1302 in such a manner that the input to the AND gate circuit 1301 comes to assume a high level in the case where another sensor controller is not connected to the first unit connector 18a. The inter-unit enable signal output from the AND gate circuit 1301 is branched and connected to the CPU 141 and also one of the parallel signal lines in the external connection cord. As a result, the CPU 141 and an external party receiving the signal are informed that a local unit and all the units connected to the portions nearer to the first unit connector 18a than the local unit in the sensing system including a plurality of sensor controllers connected in series are in the process completion state.

The AND gate circuit 1303 is supplied with the OK signal input to the FPGA 130 from the CPU 141 and the inter-unit OK signal (first specified determination signal) input to the FPGA 130 from the first unit connector 18a, and outputs the inter-unit OK signal (second specified determination signal) resulting from the logic operation to the second unit connector 18b. The signal line of the inter-unit OK signal input from the first unit connector 18a is pulled up by a pull-up resistor 1304 in such a manner that the input to the AND gate circuit 1303 assumes a high level in the case where the first unit connector 18a is not connected with other sensor controllers. The inter-unit OK signal output from the AND gate circuit 1303 is also branched and connected to the CPU 141 and also one of the parallel signal lines in the external connection cord. As a result, the CPU 141 and an external party receiving the signal are informed that a local unit and all the units connected to the portions nearer to the first unit connector 18a than the local unit in the sensing system including a plurality of sensor controllers connected in series are in specified determination state. In the case where the local unit is located at the downstream end of the inter-unit OK signal (on the side nearer to the second unit connector 18b in this case) in the sensing system, the inter-unit OK signal output to the external connection cord constitutes an overall determination signal (an overall OK signal in this embodiment) indicating that the determination result of all the sensor controllers of the sensing system are the specified result (a success in this embodiment).

Figure 35:
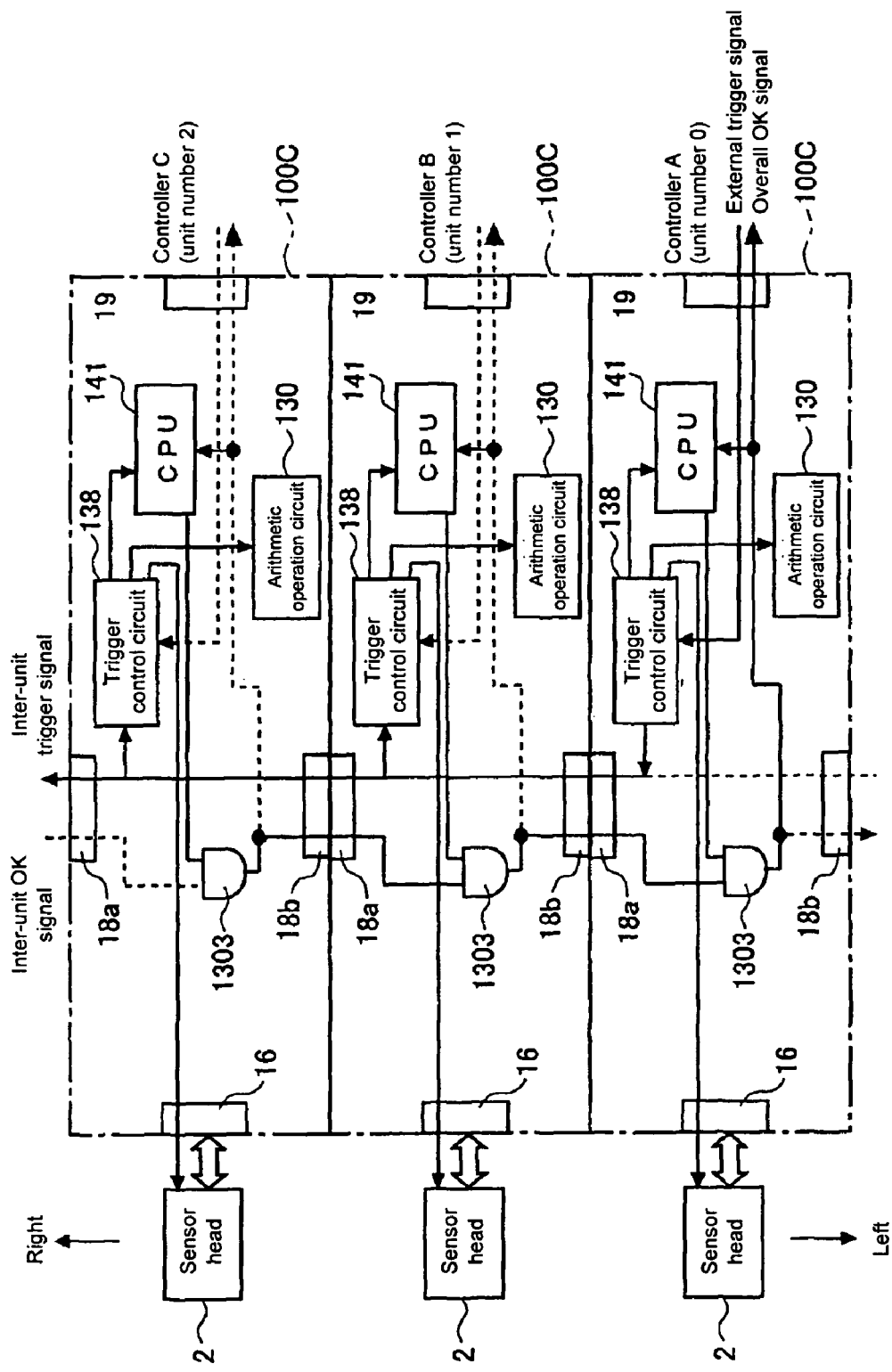
FIG. 35 shows a diagram showing the configuration of a sensing system C.

The configuration of a sensing system C including three sensor controllers connected in series is shown in FIG. 35. Unlike the configuration of the sensing system A shown in FIG. 16, only the configuration involving the trigger signal and the OK signal is shown in FIG. 35. In this system, the unit number is attached to each sensor controller by a similar operation to the sensing system A.

The sensor head 2 providing a camera is connected to each sensor controller, which in turn processes the image input from the sensor head 2 connected thereto. The result of this processing is compared with a preset reference to determine a success or a failure. In the sensing system as a whole, for example, the images of a single work are picked up from different angles or the images of different points of a single work are picked up by the sensor heads 2, and only in the case where the determination result of all the images picked up are a success, the overall determination result is regarded as a success.

The sensor head 2 may be connected to only a part of the sensor controllers, and the sensor controllers not connected with the sensor head 2 may receive the sensing data to be processed from other sensor controllers. For example, the sensor head 2 is connected only to the sensor controller A, and the image is transferred to the sensor controllers B, C from the sensor controller A. Each sensor controller processes a different portion of the same image or processes the same image in a different way. The processing result is compared with a preset reference to determine a success or a failure. In the sensing system as a whole, the overall determination result is considered a success in the case where the determination result of all the sensor controllers are a success.

In FIG. 35, the signal lines indicated by solid lines are transmitting the signal effectively used for the system operation. On the other hand, the signal lines indicated by dashed lines, though present, are transmitting no signal effectively used for system operation.

The external trigger signal is input to the controller A. The trigger control circuit 138 of the controller A selects an external trigger signal, and based on the external trigger signal, outputs an inter-unit trigger signal. In the case where the external trigger signal is input while any of the sensor controllers of the sensing system C is in the in-process state (busy mode), however, the controller A regards the particular external trigger signal as ineffective and outputs no inter-unit trigger signal. The ineffectiveness of the external trigger signal may be notified by the CPU 141 to an external device. The trigger control circuit 138 of the controllers B, C selects the inter-unit trigger signal. As a result, the external trigger signal triggers the sensing process for the whole sensing system C. The external trigger signal may be applied individually to each controller without using the inter-unit trigger signal.

As understood from the wiring related to the AND gate circuit 1303 of each sensor controller, the overall OK signal is output when all the CPUs 141 output an OK signal.

Though not shown, a wiring similar to that of the OK signal is laid for the enable signal, and when all the CPUs 141 output the enable signal, the inter-unit enable signal is output to an external device from the controller A.

The time required for each sensor controller to execute the sensing process is not necessarily equal, and the delay time of the internal trigger signal may be varied from one sensor controller to another, or each sensor controller may be supplied with an external trigger signal at a different timing. The time point at which each sensor controller completes the sensing process and enters the process completion state, therefore, may be different from each other. Until the sensor controller reaches the process completion state, on the other hand, the OK signal output upon completion of the previous sensing process is maintained. In the transition period during which the sensing process based on one external trigger signal for the whole sensing system or a group of external trigger signals input individually to each sensor controller at timings related to each other is completed for some sensor controllers but not for all the sensor controllers, therefore, the overall OK signal fails to indicate the correct determination result of the whole sensing system. In view of this, the inter-unit enable signal output to an external device from the controller A is monitored, and only after confirmation that all the sensor controllers have entered the process completion state, the prevailing overall OK signal is used. Then, the determination result of the sensing system as a whole can be used correctly. As an alternative, the overall OK signal may be used upon the lapse of a sufficient length of time to complete the sensing process after application of the external trigger signal to the sensing system. Also in this way, the determination result of the whole sensing system can be correctly used.

According to this embodiment, however, the overall OK signal is output only in the case where all the sensor controllers are in the process completion state in order to facilitate the use of the sensing system further. By doing so, the overall OK signal always indicates the correct determination result of the whole sensing system. Specifically, the CPU 141 of the controller A with unit number 0 monitors the inter-unit enable signal (the output of the AND gate circuit 1301 in FIG. 34) input to the CPU 141, and outputs the OK signal in accordance with the determination result only in the case where the particular signal is at high level.

A similar function can be implemented also by changing the internal circuit configuration of the FPGA 130 in such a manner the AND gate circuit 1303 of the controller A is replaced with a gate of three-input type, and in addition to the OK signal from the CPU 141 and the inter-unit OK signal from the first unit connector 18*a*, the output signal of the AND gate circuit 1301 is input to the AND gate circuit 1303. This circuit configuration change can be realized by giving an instruction to change the circuit from the CPU 141 through the register 134 on condition that the unit number is zero. In this case, regardless of the state of the inter-unit enable signal input to the monitor, the CPU 141 outputs the OK signal input to the AND gate circuit 1303 in accordance with the determination result, immediately after completion of the sensing process.

Figure 36:
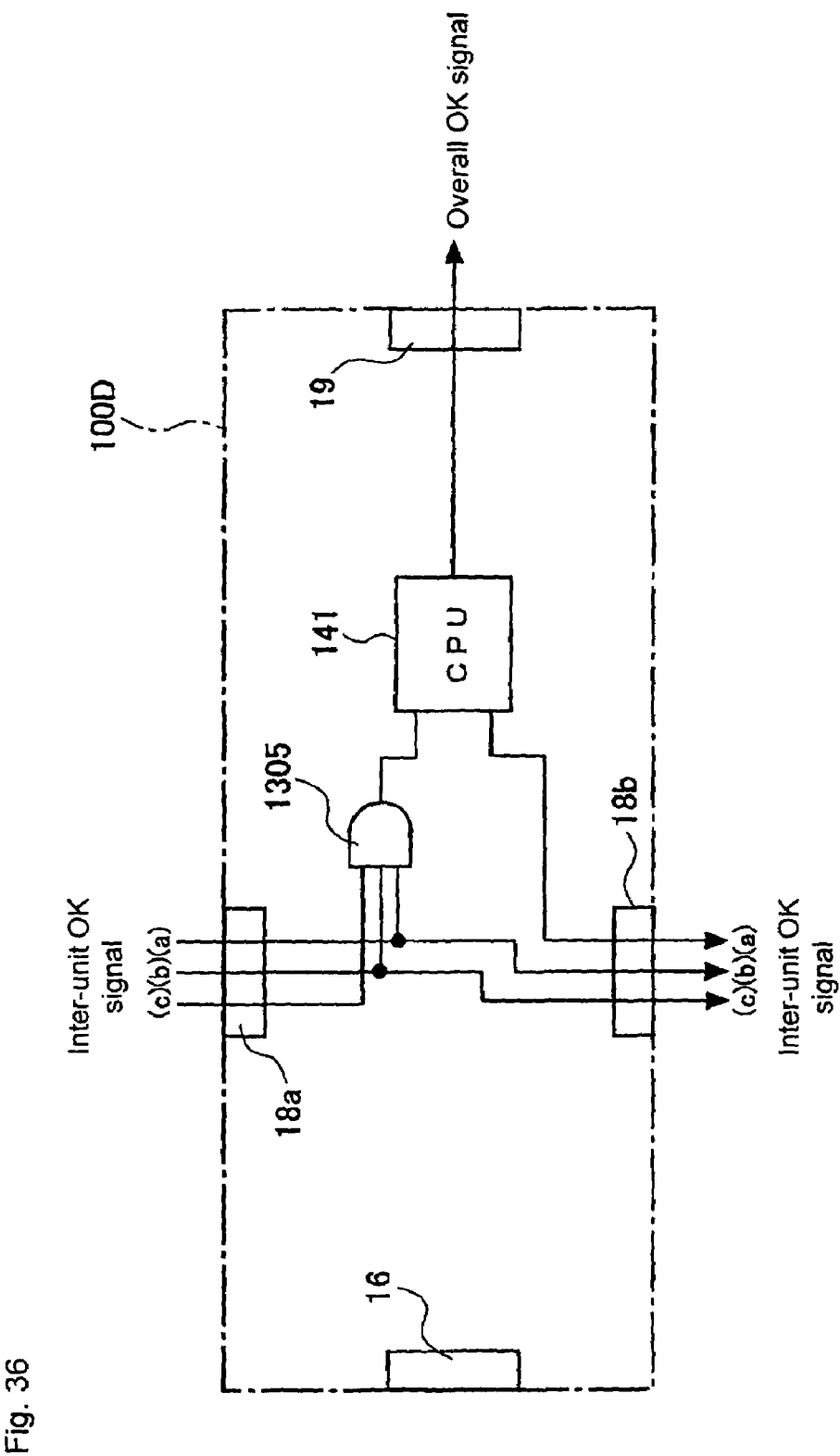
FIG. 36 shows a block diagram showing the OK signals of the sensor controller circuit according to another embodiment.

The sensor controller circuit with the OK signal according to another embodiment are shown in the block diagram of FIG. 36. According to this embodiment, the inter-unit OK signals are transmitted along parallel signal lines. The signal lines from the first unit connector 18*a* to the second unit connector 18*b*, however, are each displaced by one terminal, e.g. from terminal (a) to terminal (b) or from terminal (b) to terminal (c), etc. An OK signal output from the CPU 141 is applied to the terminal (a) of the second unit connector 18*b*. According to this embodiment, a sensing system can be configured of sensor controllers in the number not more than the parallel signal lines of the inter-unit OK signal in addition to a specified sensor controller to output the overall OK signal. Also, according to this embodiment having the three parallel lines for the inter-unit OK signal, an arbitrary number of signal lines can be employed.

All the inter-unit OK signals input from the first unit connector 18*a* are processed by AND operation in the AND gate circuit 1305 to output a logic product, which is input to the CPU 141. The CPU 141 outputs an overall OK signal externally on condition that the output of the AND gate circuit 1305 is at high level (the OK signal is input) and that the determination result of the local unit is a success. Also according to this embodiment, the enable signal is processed the same way as in the aforementioned embodiment, and only in the case where the inter-unit enable signal is high in level, the CPU 141 can output the overall OK signal. In this way, an erroneous overall OK signal is prevented from being output during the transition period before the determination result of all the sensor controllers are output.

Without providing the AND gate circuit 1305, all the inter-unit OK signals input from the first unit connector 18*a* may be directly input to the CPU 141 and processed by AND operation according to a program. By doing so, the specified sensor controller outputting the overall OK signal can be informed of the individual determination result of each sensor controller, and utilizing the particular information, can output more detailed information on the determination result in addition to the overall OK signal.

The configuration to produce an overall determination signal is not limited to the one using the logic gate circuit described above. Instead, a similar function may be implemented by the program processing in the CPU 141. In such a case, the process completion state or the specified determination state can be transmitted by communication between the CPUs. Nevertheless, the configuration having the logic gate circuit is more advantageous in that it can output an overall determination signal earlier.

The specified sensor controller to output the overall determination signal can be located at other than the ends of the sensing system. This can be realized by transmitting the process completion state and the specified determination state from the sensor controllers at the ends of the sensing system toward the specified sensor controller both in the case where the logic gate circuit is used and in the case where the program is processed.

The additional aspects of the invention described below are applicable to a sensor controller having various configurations of the control circuit as well as to a sensor controller including a control circuit having a programmable logic circuit and a CPU. The control circuit may include a CPU but not a programmable logic circuit, or an integrated circuit having a dedicated design.

(1) A sensor controller is configured as a single unit, and comprises a control circuit to execute the sensing process, a first unit connector and a second unit connector usable for connection with other sensor controllers, an oscillator to output a first clock signal, a first clock path to transmit a second clock signal input from the first unit connector, a clock switching circuit to select one of the first clock signal and the second clock signal and apply the selected clock signal to at least the portion of the control circuit involved in data transmission, and a second clock path to output the selected clock signal to the second unit connector.

This configuration solves the problem of the conventional sensor controller that a sufficiently high-speed data transmission is impossible with other sensor controllers. With this configuration, at least the portion of the control circuit involved in data transmission can be operated using either the clock signal output by the oscillator of the local unit or the clock signal obtained from another sensor controller connected thereto. In the case where the clock signal obtained from another sensor controller is used, the clock synchronism with the control circuit of such another sensor controller facilitates the high-speed transmission of the sensing data. By using this sensor controller, a sensing system including three or more sensor controllers connected in series with each other can be configured in which a common clock signal is applied to at least the portion of the control circuit of each sensor controller involved in data transmission.

(2) A sensor controller is configured as a single unit, and comprises a control circuit to execute the sensing process and a connector to connect a sensing head, wherein the control circuit acquires, from the sensor head, the information to specify the sensor head such as the type data or the information to define the function or performance of the sensor controller such as the circuit data or the setting parameter, and in accordance with the information thus acquired, changes the function or performance of the control circuit for processing the sensing data.

This configuration solves the problem of the conventional sensor controller that the setting operation is required with an operating switch or by connecting an external computer or the like to change or set the function or performance of the sensor controller, so that the function or performance of the sensor controller can be set more easily. Incidentally, the correction of the sensor head output by acquisition of information to correct the individual differences from the outputs of the sensor head is not included in the concept of changing the function or performance of the sensor controller used herein. In this aspect of invention (2), the unit connector constitutes no essential part of the invention.

(3) A sensing system comprises a plurality of sensor controllers each configured as a single unit and connected in series with each other, wherein each sensor controller includes a control circuit to execute the sensing process and a unit connector usable for connection with another sensor controller, wherein the control circuit of each sensor controller executes the sensing process in response to a trigger signal applied thereto and assumes the process completion state upon completion of the sensing process, while the control circuit assumes the specified determination state in the case where the determination result of the object to be sensed is a specified one, wherein each sensor controller can transmit and receive, to and from other sensor controllers connected thereto, a signal indicating whether the process completion state or the specified determination state is prevailing, so that at least one specified sensor controller can detect that all the sensor controllers are in the process completion state and that all the sensor controllers are in the specified determination state, and upon detection of the specified determination state, the specified sensor controller outputs an overall determination signal.

This configuration solves the problem of the conventional sensing system that the specified determination state of all the sensor controllers included in the sensing system cannot be easily known from an external device. In this configuration, after each sensor controller is supplied with a trigger signal and the determination result of all the sensor controllers become available, and in the case where the determination result of all the sensor controllers are the specified result, then the specified sensor controller outputs an overall determination signal. Therefore, the overall determination result can be obtained from the sensing system. Further, even in the case where timing of obtaining the determination result varies from one sensor controller to another during the transition period before all the determination results become available, the instability of the overall determination signal is avoided. Typically, the determination result is either a success or a failure, and the specified determination state is a success. In this case, the output of the overall determination signal indicates that all the sensor controllers are determined as a success. The trigger signal may be applied as a common signal to all the sensor controllers or individually to each of them. Each sensor controller, upon completion of a given sensing process, may enter a standby mode ready to receive the trigger signal for the next sensing process. In this case, the standby mode can be regarded as the process completion state.

A sensor controller making up this sensing system may comprise a first unit connector and a second unit connector and have the feature described below.

The feature shared by the sensor controllers regardless of the position thereof in the sensing system is that the control circuit of each sensor controller executes the sensing process in response to a trigger signal-applied thereto, and assumes the process completion state upon completion of the sensing process and the specified determination state in the case where the determination result on the object to be sensed is s specified result.

Further, a sensor controller having the following-described feature is arranged at an end of a sensing system and can be used as a specified sensor controller to output an overall determination signal. Specifically, the control circuit of the sensor controller executes the process of outputting an overall determination signal on condition that it is supplied with a completion signal indicating that the other sensor controllers are in the process completion state, through the first unit connector, that the local unit is in the process completion state, that it is supplied with a specified determination signal indicating that the other sensor controllers are in the specified determination state, through the first unit connector, and that the local unit is in the specified determination state. As an alternative, the sensor controller includes a means to set the control circuit to execute such processes.

Furthermore, a sensor controller having the following-described feature can be used as a sensor controller arranged at other than the ends of the sensing system. Specifically, the control circuit of the sensor controller executes the process of outputting a second completion signal through the second unit connector on condition that it is supplied with a first completion signal through the first unit connector and that the local unit is in the process completion state on the one hand, and executes the process of outputting a second specified determination signal through the second unit connector on condition that it is supplied with a first specified determination signal through the first unit connector and that the local unit is in the specified determination state on the other hand. As an alternative, the sensor controller includes a means to set the control circuit to execute such processes.

Further, a sensor controller having the following-described feature can be used as a sensor controller arranged at the end of the sensing system far from the specified sensor controller. Specifically, the control circuit of the sensor controller executes the process of outputting a completion signal through the second unit connector in the process completion state, and executes the process of outputting a specified determination signal through the second unit connector in the specified determination state. As an alternative, the sensor controller includes a means to set the control circuit to execute such processes.

(4) A sensor controller is configured as a single unit and comprises a control circuit to execute the sensing process, and a first unit connector and a second unit connector usable for connection with other sensor controllers, wherein the control circuit executes the sensing process in response to a trigger signal applied thereto, and in the case where the determination result for the object to be sensed is a specified result, assumes the specified determination state, and wherein the control circuit executes the process of outputting a second specified determination signal through the second unit connector on condition that a first specified determination signal is input through the first unit connector and that the local unit assumes the specified determination state. As an alternative, the sensor controller includes a means to set the control circuit to execute such processes.

The use of the sensor controller having this configuration solves the problem of the conventional sensor controller that in the case where three or more sensor controllers are connected in series with each other, it is not easy to know from outside that all the sensor controllers are in the specified determination state, and a sensing system can be easily constructed in which in the case where all the sensor controllers connected in series assume the specified determination state, one overall determination signal is output.

Figure 37:
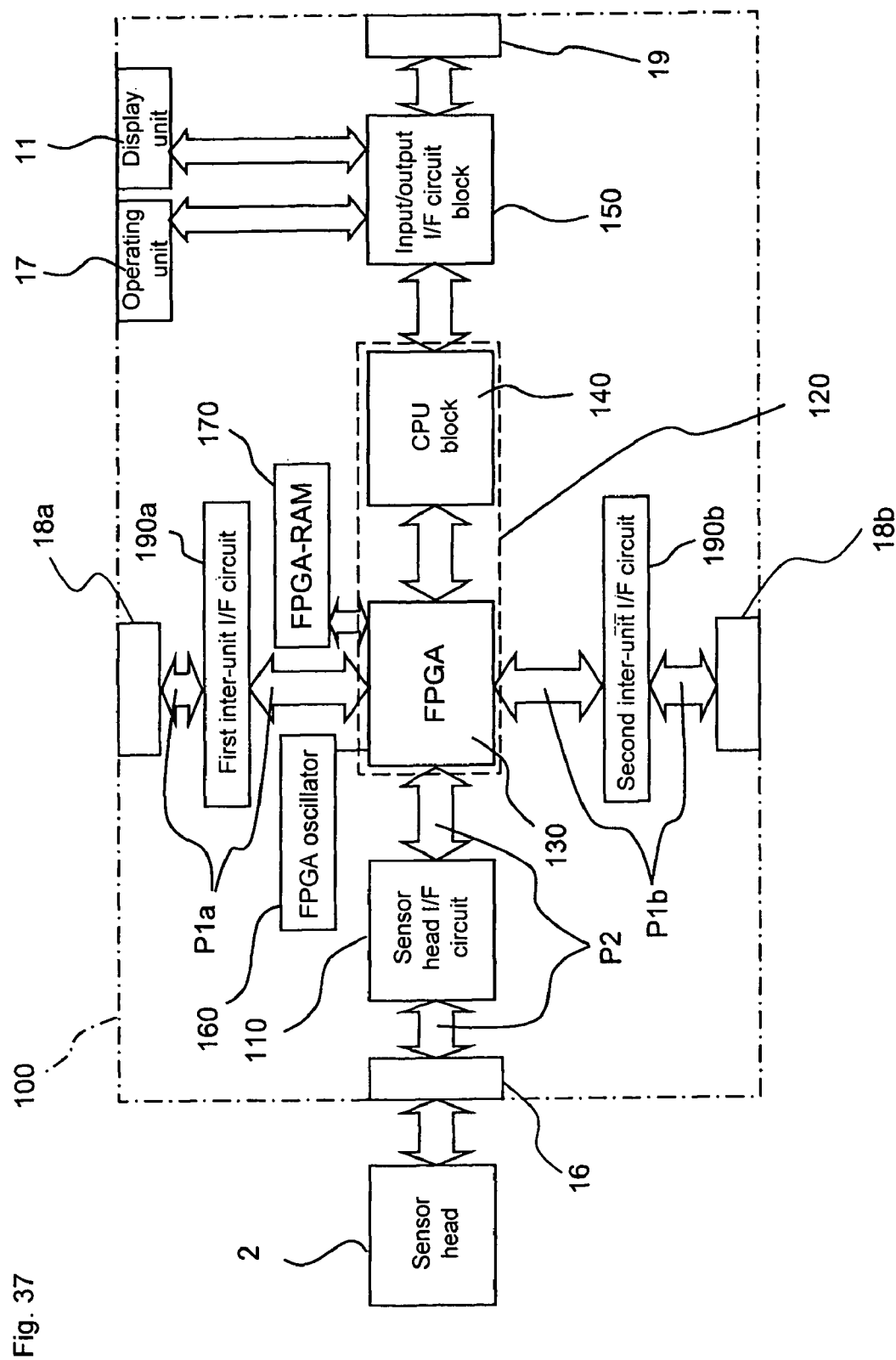
FIG. 37 shows a block diagram showing the internal configuration of the sensor controller circuit having an inter-unit I/F circuit.

In the sensor controller shown in FIG. 4, as explained with reference to FIG. 8, the sensing data transmission path between the units is constituted of eight parallel data lines to connect the FPGA 130 directly to the unit connectors 180a, 180b. The sensing data transmission path between the units, however, is not limited to such a construction, but may alternatively be configured as shown in FIG. 37. In the configuration shown in FIG. 37, unlike in the configuration shown in FIG. 4, a first inter-unit I/F circuit 190a is inserted midway of the first inter-unit path P1a, and a second inter-unit I/F circuit 190b is inserted midway of the second inter-unit path P1b. The inter-unit I/F circuits 190a, 190b, like the sensor head I/F circuit shown in FIG. 6, include a serial/parallel conversion circuit and a parallel/serial conversion circuit, and the sensing data are transmitted in parallel to and from the FPGA 130, while the sensing data are transmitted serially to and from other sensor controllers connected through the unit connector 180a or 180b. By doing so, the sensor controllers can be connected not directly through a unit connector, but easily through a cable to transmit the sensing data at high speed. Also in the case where the sensing data are transmitted in parallel between sensor controllers without any inter-unit I/F circuit as shown in FIG. 4, the sensor controllers can of course be connected to each other through a cable.

Figure 38:
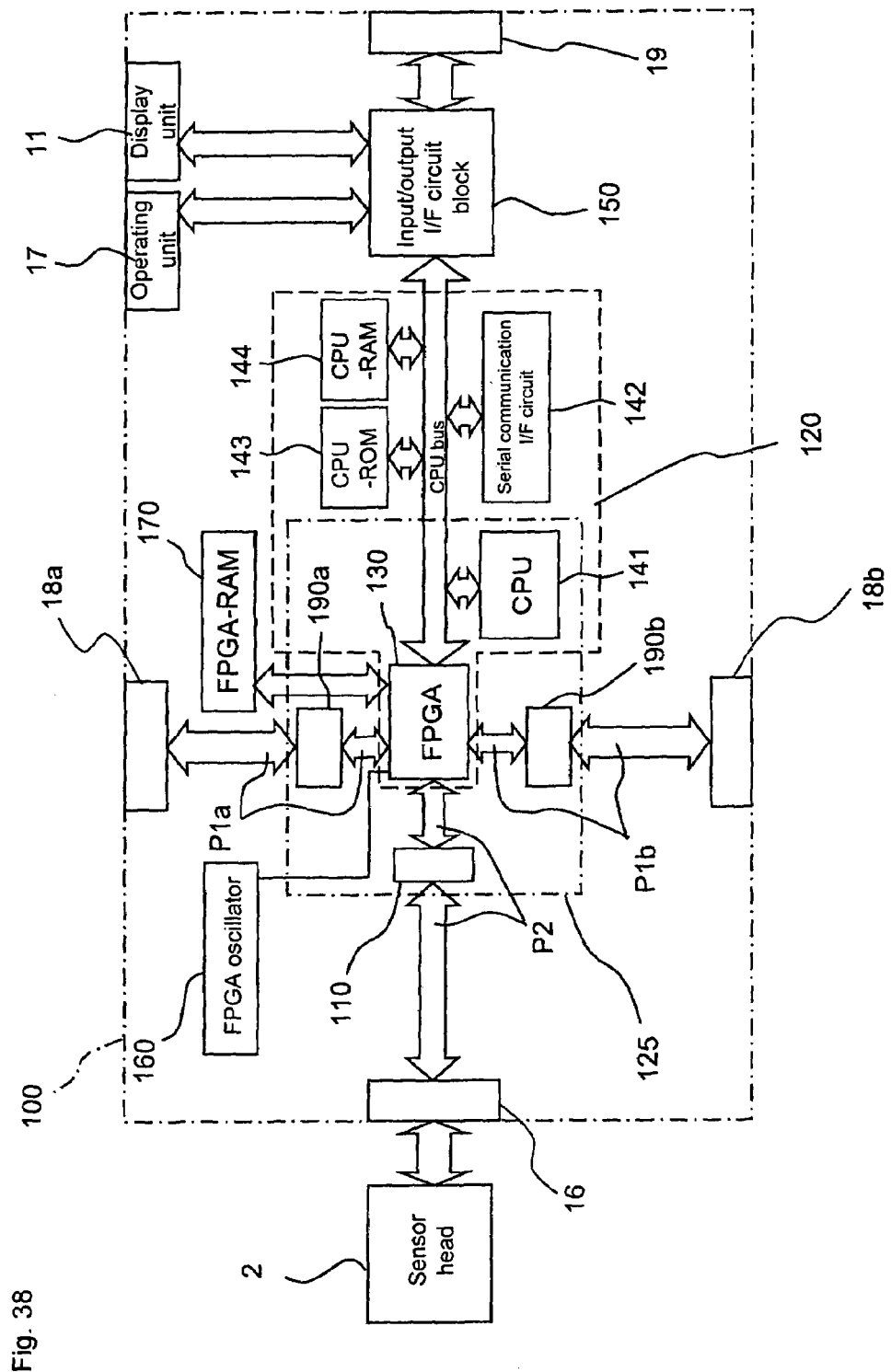
FIG. 38 shows a block diagram showing the internal configuration of the sensor controller circuit having an integrated circuit in which the FPGA and other circuit blocks are integrated.

A particular portion of the sensor controller circuit which should be formed as a single integrated circuit is varied depending on various cases. FIG. 38 shows an example in which the FPGA and other circuit blocks are integrated. In this case, the sensor controller circuit 100 as a whole has the same block configuration as in FIG. 37, in which the FPGA 130, the CPU 141, the sensor head I/F circuit 110 and the inter-unit I/F circuits 190a, 190b are accommodated in a one-chip integrated circuit 125. In the configuration shown in FIG. 38, of all the circuits included in the CPU block 140 of FIG. 37, the CPU 141 is accommodated in the integrated circuit 125 while the other circuits including the serial communication I/F circuit 142, the CPU-ROM 143 and the CPU-RAM 144 are arranged outside of the integrated circuit 125. The circuit blocks other than the FPGA 130 in the integrated circuit 125 are formed fixedly in the process of producing the integrated circuit and not a programmable or reconfigurable circuit. Nevertheless, a part or the whole of these circuit blocks can be temporarily or permanently implemented as circuits programmed in the FPGA. A sensor controller having a CPU as a programmed circuit and a programmable logic circuit not used as a CPU is also an embodiment of the sensor controller in which the control unit has a programmable logic circuit and a CPU.

What is claimed is:

1. A sensor controller configured as a single unit, comprising:
    a control unit having a programmable logic circuit and a CPU to control the operation of the sensor controller;
    a unit connector usable for connection with other sensor controllers; and
    an inter-unit path including a sensing data transmission path between the programmable logic circuit and the unit connector and constituting a signal transmission path between the control unit and the unit connector;
    wherein the inter-unit path is arranged such that in the case where another sensor controller is connected to the unit connector, the sensing data can be transmitted between a programmable logic circuit and the programmable logic circuit of the another sensor controller.

2. A sensor controller according to claim 1,
    wherein the unit connector includes a first unit connector and a second unit connector;
    wherein the inter-unit path includes a first inter-unit path connected to the first unit connector and a second inter-unit path connected to the second unit connector; and
    wherein the sensing data transmission path included in the first inter-unit path and the sensing data transmission path included in the second inter-unit path are separated from each other outside the programmable logic circuit.

3. A sensor controller according to claim 1, further comprising selected one of a device to change at least a part of the circuit data of the programmable logic circuit and a device to change the parameter set in the programmable logic circuit in such a manner as to change the contents of the sensing data to be processed.

4. A sensor controller according to claim 1, further comprising:
    an oscillator to output a first clock signal;
    a clock path to transmit a second clock signal input from the unit connector; and
    a clock switching circuit to apply selected one of the first clock signal and the second clock signal to a programmable logic circuit.

5. A sensor controller according to claim 2, further comprising:
    an oscillator to output a first clock signal;
    a first clock path to transmit a second clock signal input from the first unit connector;
    a clock switching circuit to apply selected one of the first clock signal and the second clock signal to a programmable logic circuit; and
    a second clock path to output the selected clock signal to the second unit connector.

6. A sensor controller according to claim 1, further comprising a data transmission path connected with a CPU in the inter-unit path,
    wherein in the case where another sensor controller is connected to the unit connector, the data can be transmitted between the CPU and the CPU of the another sensor controller.

7. A sensor controller according to claim 1, further comprising:
    a sensor head connecting portion used to connect a sensor head; and
    a sensor head path for connecting a programmable logic circuit and the sensor head connecting portion to transmit the sensing data.

8. A sensor controller according to claim 7,
    wherein the circuit programmed in a programmable logic circuit includes an arithmetic operation circuit to carry out the arithmetic operation on the sensing data acquired through selected one of the inter-unit path and the sensor head path, and a data path switching circuit to connect selected one of the inter-unit path and the sensor head circuit to the arithmetic operation circuit.

9. A sensor controller according to claim 1,
    wherein the circuit programmed to a programmable logic circuit includes an arithmetic operation circuit to conduct the arithmetic operation on the sensing data acquired through the inter-unit path, and
    wherein in the case where another sensor controller is connected to the unit connector, the arithmetic operation can be conducted on the sensing data acquired from the another sensor controller.

10. A sensor controller according to claim 1, further comprising a storage device connected to the programmable logic circuit;
  wherein the circuit programmed to the programmable logic circuit includes a data path to store the sensing data acquired through the inter-unit path in the storage device; and
  wherein in the case where another sensor controller is connected to the unit connector, the sensing data acquired from the another sensor controller can be stored.

11. A sensing system comprising a plurality of series-connected sensor controllers each configured as a unit, each sensor controller including:
  a control unit having a programmable logic circuit and a CPU to control the operation of the sensor controller;
  a unit connector usable for connection with another sensor controller; and
  an inter-unit path constituting a signal transmission path between the control unit and the unit connector including a sensing data transmission path between the programmable logic circuit and the unit connector;
  wherein the inter-unit path is arranged such that in the case where another sensor controller is connected to the unit connector, the sensing data can be transmitted between the first programmable logic circuit and the programmable logic circuit of the another sensor controller;
  wherein at least one sensor controller further includes a sensor head connecting portion usable for connection with the sensor head and a sensor head path to transmit the sensing data by connecting the programmable logic circuit and the sensor head connecting portion, the at least one sensor controller being connected with the sensor head; and p1 wherein the sensing data is transmitted from a first sensor controller making up one of the sensor controllers connected with the sensor head to a second sensor controller making up one of the other sensor controllers.

12. A sensing system according to claim 11,
  wherein the unit connector of each sensor controller includes a first unit connector and a second unit connector;
  wherein the inter-unit path of each sensor controller includes a first inter-unit path to connect the first unit connector and a second inter-unit path to connect the second unit connector; and
  wherein the sensing data transmission path included in the first inter-unit path and the sensing data transmission path included in the second inter-unit path are separated from each other outside the programmable logic circuit.

13. A sensing system according to claim 11,
  wherein the sensing data transmitted from the first sensor controller to the second sensor controller is output from the sensor head connected to the first sensor controller.

14. A sensing system according to claim 13,
  wherein the first sensor controller further includes a sensor head connecting portion usable for connection with the sensor head and a sensor head path for connecting the programmable logic circuit and the sensor head connecting portion to transmit the sensing data,
  wherein the programmable logic circuit includes an arithmetic operation circuit to perform the arithmetic operation on the sensing data and a data path to apply the sensing data acquired through the sensor head path dividedly between the arithmetic operation circuit and the inter-unit path, and
  wherein the circuit programmed in the programmable logic circuit of the second sensor controller includes an arithmetic operation circuit to perform the arithmetic operation on the sensing data acquired through the inter-unit path, thereby making possible the parallel arithmetic operation on the same sensing data.

15. A sensor system according to claim 11,
  wherein the first sensor controller further comprises a sensor head connecting portion usable for connecting with the sensor head and a sensor head path for connecting the programmable logic circuit and the sensor head connecting portion to transmit the sensing data,
  wherein the programmable logic circuit includes an arithmetic operation circuit to conduct the arithmetic operation on the sensing data, and
  wherein the sensing data transmitted from the first sensor controller to the second sensor controller is the one output from the sensor head connected to the first sensor controller and arithmetically processed by the first sensor controller.

16. A sensing system according to claim 11,
  wherein the circuit programmed in the programmable logic circuit of the second sensor controller includes an arithmetic operation circuit to conduct the arithmetic operation on the sensing data acquired through the inter-unit path.

17. A sensing system according to claim 11,
  wherein a storage device is connected to the programmable logic circuit of the second sensor controller and the circuit programmed in the programmable logic circuit of the second sensor controller includes a data path to store the sensing data acquired through the inter-unit path in the storage device.

18. A sensing system according to claim 11,
  wherein at least one of the sensor controllers includes an oscillator to output a clock signal and a transmission path of the clock signal in the inter-unit path,
  wherein the clock signal can be output to the programmable logic circuit and the clock signal transmission path in the inter-unit path at the same time,
  wherein all the other sensor controllers each include a clock signal transmission path connectable to the programmable logic circuit in the inter-unit path, and
  wherein all the sensor controllers in the sensing system can drive the programmable logic circuit by a common clock signal.

19. A sensing system according to claim 12,
  wherein each sensor controller further includes an oscillator to output a first clock signal, a first clock path to transmit a second clock signal input from the first unit connector, a clock switching circuit to select one of the first clock signal and the second clock signal and apply the selected clock signal to the programmable logic circuit, and a second clock path to output the selected clock signal to the second unit connector,
  wherein the clock switching circuit of the sensor controller, which is located at an end of the series-connected sensor controllers and only the second unit connector thereof is connected with another sensor controller, selects the first clock signal, while the clock switching circuit of all the other sensor controllers selects the second clock signal, so that all the sensor controllers in the sensing system can drive the programmable logic circuit with a common clock signal.

20. A sensing system according to claim 11,
wherein all the sensor controllers each include a data transmission path connected to a CPU in the inter-unit path, so that the data can be transmitted between the CPUs of the sensor controllers directly connected with each other.

21. A sensing system comprising a plurality of series-connected sensor controllers each configured as a unit, each sensor controller including
a control unit having a programmable logic circuit and a CPU to control the operation of the sensor controller;
a unit connector usable for connection with another sensor controller; and
an inter-unit path constituting a signal transmission path between the control unit and the unit connector and including a sensing data transmission path arranged between the programmable logic circuit and the unit connector,
wherein the inter-unit path is arranged such that in the case where another sensor controller is connected to the unit connector, the sensing data can be transmitted between the programmable logic circuit of the local unit and the programmable logic circuit of the another sensor controller,
wherein at least one of the sensor controllers further includes a sensor head connecting portion usable for connection with a sensor head and a sensor head path connecting the programmable logic circuit and the sensor head connecting portion to transmit the sensing data, at least one of the sensor controllers being connected with the sensor head,
wherein the control unit of each sensor controller conducts the sensing operation on the sensing data output from any of the sensor heads in response to a trigger signal applied thereto, the control unit being in a process completion state upon completion of the sensing process, and in the case where a result of determination on the object to be sensed is a specified one, being in a specified determination state,
wherein each sensor controller can transmit and receive the signal indicating whether the process completion state and the specified determination state prevail, to and from other sensor controllers connected thereto,
wherein at least one specified sensor controller can detect that all the sensor controllers are in the process completion state and all the sensor controllers are in the specified determination state, and
wherein the specified sensor controller, upon the detection of the state, outputs an overall determination signal.

22. A sensing system according to claim 21,
wherein the trigger signal is input to one of the sensor controllers from outside the sensing system, and through the unit connector, input to each of the other sensor controllers.

23. A sensing system according to claim 21, comprising a sensor controller located at a first end of the series-connected sensor controllers and a specified sensor controller located at a second end to output an overall determination signal,
wherein the sensor controller located at the first end of the series-connected sensor controllers outputs a completion signal to the sensor controller connected at the second end when in the process completion state, and a specified determination signal when in the specified determination state; and
wherein the specified sensor controller located at the second end of the series-connected sensor controllers outputs an overall determination signal on condition that the completion signal is received from the sensor controller connected at the first end, the local unit is in the process completion state, the specified determination signal is input from the sensor controller connected at the first end and that the local unit is in the specified determination state.

24. A sensing system according to claim 23, further comprising a sensor controller located at other than the first and second ends of the series-connected sensor controllers,
wherein the sensor controller located at other than the first and second ends outputs a completion signal to the sensor controller connected at the second end on condition that the completion signal is input from the sensor controller connected at the first end and that the local unit is in the process completion state on the one hand, and outputs a specified determination signal to the sensor controller located at the second end on condition that the specified determination signal is received from the sensor controller connected at the first end and the local unit is in the specified determination state on the other hand.

25. A sensing system according to claim 21, further comprising a sensor controller located at the first end of the series-connected sensor controllers, a specified sensor controller located at the second end to output an overall determination signal and a sensor controller located at other than the first and second ends,
wherein the sensor controller located at the first end outputs the specified determination signal to the sensor controller connected at the second end in the case where the specified determination state prevails, and outputs a completion signal to the sensor controller connected at the second end in the case where the process completion state prevails,
wherein the sensor controller located at other than the first and second ends of the sensor controller string is supplied with the completion signal from the sensor controller connected at the first end, outputs the completion signal to the sensor controller connected at the second end in the case where the local unit is in the process completion state, and relays and outputs one or a plurality of specified determination signals input from the sensor controller connected at the first end to the sensor controller connected at the second end, while at the same time outputting the specified determination signal to the sensor controller connected at the second end in the case where the local unit is in the specified determination state, and
wherein the specified sensor controller located at the second end of the sensor controller string outputs the overall determination signal on condition that the completion signal is input from the sensor controller connected at the first end, the local unit is in the process completion state, the specified determination signal for all the sensor controllers other than the local unit is input from the sensor controller connected at the first end and that the local unit is in the specified determination state.

26. A sensor controller according to claim 2,
wherein the control unit executes the sensing process in response to a trigger signal applied thereto, and enters a process completion state upon completion of the sensing process and a specified determination state in the case where the determination result of the object to be sensed is a specified result, and wherein the control unit executes the process of outputting an overall determination signal on condition that a completion signal indicating that the other sensor controllers are in the process completion state is input thereto through the first unit connector, the local unit is in the process completion state, a specified determination signal indicating that the other sensor controllers are in the specified determination state is input thereto through the first unit connector and that the local unit is in the specified determination state, the sensor controller alternatively including a device to set the control unit to execute the process.

27. A sensor controller according to claim 2, wherein the control unit executes the sensing process in response to a trigger signal applied thereto and is in the process completion state upon completion of the sensing process, while being in the specified determination state in the case where the determination result on the object to be sensed is the specified result, and wherein the control unit executes the process of outputting a second completion signal through the second unit connector on condition that a first completion signal is input thereto through the first unit connector and that the local unit is in the process completion state, and wherein the control unit executes the process of outputting a second specified determination signal through the second unit connector on condition that a first specified determination signal is input thereto through the first unit connector and the local unit is in the specified determination state, the sensor controller alternatively including a device to set the control unit to execute the process.

28. A sensor controller according to claim 2, wherein the control unit executes the sensing process in response to a trigger signal applied thereto, and enters a process completion state upon completion of the sensing process, while entering a specified determination state in the case where the determination result of the object to be sensed is a specified result, wherein the control unit executes the process of outputting a completion signal through the second unit connector on condition that the local unit is in the process completion state, and wherein the control unit executes the process of outputting a specified determination signal through the second unit connector on condition that the local unit is in the specified determination state, the sensor controller alternatively including a device to set the control unit to execute the processes.

29. A sensor controller according to claim 21, wherein an external trigger signal can be input without passing through the unit connector from an external source and an inter-unit trigger signal can be input through the unit connector, and the sensor controller further comprising a trigger control circuit to select one of the external trigger signal and the inter-unit trigger signal, and based on the selected trigger signal, output an internal trigger signal to the control unit.

30. A sensor controller according to claim 29, further comprising an internal signal path to transmit the inter-unit trigger signal input to one of the unit connectors to the other unit connector.

31. A sensor controller according to claim 29, wherein the trigger control circuit outputs an inter-unit trigger signal based on an external trigger signal which may be selected.

32. A sensor controller according to claim 2, wherein the control unit executes the sensing process in response to a trigger signal applied thereto and is in a specified determination state in the case where the determination result for the object to be sensed is a specified result, and wherein the control unit executes the process of outputting a second specified determination signal through the second unit connector on condition that a first specified determination signal is input thereto through the first unit connector and the local unit is in the specified determination state, the sensor controller alternatively including a device to set the control unit to execute the process.

* * * * *